US012628096B2

(12) United States Patent
Zhou et al.

(10) Patent No.: US 12,628,096 B2
(45) Date of Patent: May 12, 2026

(54) POWER CONTROL AND RETRANSMISSION

(71) Applicant: Ofinno, LLC, Reston, VA (US)

(72) Inventors: Hua Zhou, Vienna, VA (US); Esmael Hejazi Dinan, McLean, VA (US); Ali Cagatay Cirik, Chantilly, VA (US); Alireza Babaei, Fairfax, VA (US); Hyoungsuk Jeon, Centreville, VA (US); Kyungmin Park, Vienna, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 363 days.

(21) Appl. No.: 18/499,804

(22) Filed: Nov. 1, 2023

(65) Prior Publication Data

US 2024/0064661 A1    Feb. 22, 2024

Related U.S. Application Data

(63) Continuation of application No. 17/729,625, filed on Apr. 26, 2022, now Pat. No. 11,844,032, which is a
(Continued)

(51) Int. Cl.
$H04W$ $52/42$      (2009.01)
$H04W$ $52/14$      (2009.01)
(Continued)

(52) U.S. Cl.
CPC ......... *H04W 52/42* (2013.01); *H04W 52/146* (2013.01); *H04W 72/0446* (2013.01); *H04W 72/0473* (2013.01)

(58) Field of Classification Search
CPC ............... H04W 52/42; H04W 52/146; H04W 72/0446; H04W 72/0473; H04W 52/228;
(Continued)

(56) References Cited

U.S. PATENT DOCUMENTS

2018/0175420 A1*  6/2018  Lee .......................... F28D 20/02
2018/0279376 A1*  9/2018  Dinan ................... H04W 52/50
(Continued)

FOREIGN PATENT DOCUMENTS

WO      2018175420 A1    9/2018
WO      2019158587 A1    8/2019

OTHER PUBLICATIONS

3GPP TS 38.213 V15.4. (Dec. 2018) 3rd Generation Partnership Project; Technical Specification Group Radio Access Network; NR; Physical layer procedures for control (Release 15).
(Continued)

*Primary Examiner* — Ankur Jain
(74) *Attorney, Agent, or Firm* — Patrick Moon; Kavon Nasabzadeh; Jacob L. Mangan

(57)          ABSTRACT

Wireless communications are described for controlling a transmission. A base station may cancel, delay, and/or request a retransmission of a message. The base station may send a control message to control a transmission in a communication network. A wireless device may cancel a transmission (e.g., based on a pre-emption indication), determine a transmission power for a transmission (e.g., based on a power control message), and/or determine a retransmission of a message (e.g., based on a repetition indication).

20 Claims, 39 Drawing Sheets

Related U.S. Application Data continuation of application No. 16/788,079, filed on Feb. 11, 2020, now Pat. No. 11,405,874.

(60) Provisional application No. 62/803,999, filed on Feb. 11, 2019.

(51) Int. Cl.
*H04W 72/044* (2023.01)
*H04W 72/0446* (2023.01)

(58) Field of Classification Search
CPC . H04W 52/248; H04W 52/281; H04W 52/48; H04L 1/189; H04L 1/1896; H04L 1/1819
See application file for complete search history.

(56) References Cited

U.S. PATENT DOCUMENTS

2019/0158587 A1* 5/2019 Jolly ....................... G06Q 10/02
2019/0165984 A1* 5/2019 Shapin ................... H04W 72/53

OTHER PUBLICATIONS

R1-1808213 3GPP TSG RAN WG1 Meeting #94, Gothenburg, Sweden, Aug. 20-24, 2018, Source: ZTE, Title: Enhanced UL grant-free transmissions.

R1-1808250 3GPP TSG RAN WG1 Meeting #94, Gothenburg, Sweden, Aug. 20-24, 2018, Source: vivo, Title: Enhanced UL grant-free transmission for URLLC.

R1-1808412 3GPP TSG RAN WG1 Meeting #94, Gothenburg, Sweden, Aug. 20-24, 2018, Source: CATT, Title: On enhancements to configured UL grant operation.

R1-1808570 3GPP TSG WG1 Meeting #94, Gothenburg, Sweden, Aug. 20-24, 2018, Source: Nokia, Nokia Shanghai Bell, Title: On Configured Grant enhancements for NR URLLC.

R1-1812161 3GPP TSG RAN WG1 Meeting #95, Spokane, USA, Nov. 12-16, 2018, Source: Ericsson, Title: Inter-UE Prioritization and Multiplexing of UL Transmissions.

R1-1812318 3GPP TSG RAN WG1 Meeting #95, Spokane, USA, Nov. 12-16, 2018, Source: vivo, Title: UL inter-UE Tx prioritization for URLLC.

R1-1812389 3GPP TSG RAN WG1 Meeting #95, Spokane, USA, Nov. 12-16, 2018, Source: ZTE, Title: On UL inter UE Tx prioritization/multiplexing.

R1-1812415 3GPP TSG RAN WG1 Meeting #95, Spokane, USA, Nov. 12-16, 2018, Source: Fujitsu, Title: Discussion on uplink preemption indication.

R1-1812577 3GPP TSG RAN WG1 Meeting #95, Spokane, USA, Nov. 12-16, 2018, Source: LG Electronics, Title: Discussion on UL inter UE Tx prioritization.

R1-1812745 3GPP TSG RAN WG1 Meeting #95, Spokane, USA, Nov. 12-16, 2018, Source: Sony, Title: Inter-UE uplink multiplexing of URLLC & eMBB traffics.

R1-1812819 3GPP TSG RAN WG1 Meeting #95, Spokane, USA, Nov. 12-16, 2018, Source: OPPO, Title: Consideration on UL inter UE Tx prioritization and multiplexing.

R1-1812998 3GPP TSG RAN WG1 Meeting #95, Spokane, USA, Nov. 12-16, 2018, Source: Samsung, Title: Uplink inter UE multiplexing/prioritization for enhanced URLLC.

R1-1813117 3GPP TSG RAN WG1 Meeting #95, Spokane, USA, Nov. 12-16, 2018, Source: Nokia, Nokia Shanghai Bell, Title: Solution for UL inter-UE multiplexing between eMBB and URLLC.

R1-1813328 3GPP TSG RAN WG1 Meeting #95, Spokane, USA, Nov. 12-18, 2018, Source: NTT Docomo, Inc., Title: UL inter UE transmission multiplexing.

R1-1813385 3GPP TSG RAN WG1 Meeting #95, Spokane, USA, Nov. 12-16, 2018, Source: Mitsubishi Electric, Title: Views on pre-emption for UL inter UE Tx multiplexing.

R1-1813437 3GPP TSG RAN WG1 Meeting #95, Spokane, USA, Nov. 12-16, 2018, Source: Qualcomm Incorporated, Title: UL inter UE Tx prioritization/multiplexing.

R1-1900048 3GPP TSG RAN WG1 Ad-Hoc Meeting 1901, Taipei, Taiwan, Jan. 21-25, 2019, Source: Huawei, HiSilicon, Title: UL inter-UE transmission prioritization and multiplexing.

R1-1900074 3GPP TSG RAN WG1 Ad-Hoc Meeting 1901, Taipei, Taiwan, Jan. 21-25, 2019, Source: ZTE, Title: UL inter-UE multiplexing between eMBB and URLLC.

R1-1900131 3GPP TSG RAN WG1 Ad-Hoc Meeting 1901, Taipei, Taiwan, Jan. 21-25, 2019, Source: vivo, Title: UL inter-UE Tx prioritization for URLLC.

R1-1900165 3GPP TSG RAN WG1 Ad-Hoc Meeting 1901, Taipei, Taiwan, Jan. 21-25, 2019, Source: Ericsson. Title: Inter-UE Prioritization and Multiplexing of UL Transmissions.

R1-1900212 3GPP TSG RAN WG1 Ad-Hoc Meeting 1901, Taipei, Taiwan, Jan. 21-25, 2019, Source: MediaTek Inc., Title: Inter-UE uplink Tx prioritization and multiplexing.

R1-1900256 3GPP TSG RAN WG1 Ad-Hoc Meeting 1901, Taipei, Taiwan, Jan. 21-25, 2019, Source: Fujitsu, Title: Discussion on uplink preemption indication.

R1-1900286 3GPP TSG RAN WG1 Ad-Hoc Meeting 1901, Taipei, Taiwan, Jan. 21-25, 2019, Source: OPPO, Title: Consideration on UL inter UE Tx prioritization and multiplexing.

R1-1900335 3GPP TSG RAN WG1 Ad-Hoc Meeting 1901, Taipei, Taiwan, Jan. 21-25, 2019, Source: CATT, Title: Considerations on inter-UE UL multiplexing.

R1-1900351 3GPP TSG RAN WG1 Ad-Hoc Meeting 1901, Taipei, Taiwan, Jan. 21-25, 2019, Source: NEC, Title: UL inter-UE Tx prioritization and multiplexing.

R1-1900352 3GPP TSG RAN WG1 Ad-Hoc Meeting 1901, Taipei, Taiwan, Jan. 21-25, 2019, Source: TCL Communication, Title: Multiplexing eMBB over URLLC Resources.

R1-1900374 3GPP TSG RAN WG1 Ad-Hoc Meeting 1901, Taipei, Taiwan, Jan. 21-25, 2019, Source: Sony, Title: Considerations on inter-UE transmission multiplexing & prioritization.

R1-1900417 3GPP TSG RAN WG1 Ad-Hoc Meeting 1901, Taipei, Taiwan, Jan. 21-25, 2019, Source: CMCC, Title: Discussion on UL inter UE Tx prioritization/multiplexing.

R1-1900497 3GPP TSG RAN WG1 Ad-Hoc Meeting 1901, Taipei, Taiwan, Jan. 21-25, 2019, Source: Intel Corporation, Title: On enhancements to inter-UE UL Multiplexing.

R1-1900595 3GPP TSG RAN WG1 Ad-Hoc Meeting 1901, Taipei, Taiwan, Jan. 21-25, 2019, Source: LG Elections, Title: Discussion on UL inter UE Tx prioritization.

R1-1900636 3GPP TSG RAN WG1 Ad-Hoc Meeting 1901, Taipei, Taiwan, Jan. 21-25, 2019, Source: China Telecom, title: Dynamic resource sharing for UL inter-UE multiplexing between eMBB and URLLC.

R1-1900639 3GPP TSG RAN WG1 Ad-Hoc Meeting 1901, Taipei, Taiwan, Jan. 21-25, 2019, Source: Mitsubishi Electric, Title: Views on pre-emption for UL inter/intra UE Tx multiplexing.

R1-1900676 3GPP TSG RAN WG1 Ad-Hoc Meeting 1901, Taipei, Taiwan, Jan. 21-25, 2019, Source: Panasonic, Title: On NR URLLC UL inter UE Tx prioritization/multiplexing.

R1-1900683 3GPP TSG RAN WG1 Ad-Hoc Meeting 1901, Taipei, Taiwan, Jan. 21-25, 2019, Source: Sequans, Title: Considerations on UL inter-UE multiplexing for URLLC.

R1-1900689 3GPP TSG RAN WG1 Ad-Hoc Meeting 1901, Taipei, Taiwan, Jan. 21-25, 2019, Source: ETRI, Title: UL inter UE Tx prioritization/multiplexing.

R1-1900710 3GPP TSG RAN WG1 Ad-Hoc Meeting 1901, Taipei, Taiwan, Jan. 21-25, 2019, Source: Spreadtrum Communications, Title: Discussion on UL inter UE tx prioritization/multiplexing.

R1-1900806 3GPP TSG RAN WG1 Ad-Hoc Meeting 1901, Taipei, Taiwan, Jan. 21-25, 2019, Source: InterDigital Inc., Title: Potential enhancements for UL inter-UE multiplexing.

R1-1900815 3GPP TSG RAN WG1 Ad-Hoc Meeting 1901, Taipei, Taiwan, Jan. 21-25, 2019, Source: ASUSTek, Title: Discussion on power control mechanism for UL inter UE Tx multiplexing.

R1-1900900 3GPP TSG RAN WG1 Ad-Hoc Meeting 1901, Taipei, Taiwan, Jan. 21-25, 2019, Source: Qualcomm Incorporated, Title: UL Inter-UE Multiplexing and Prioritization.

(56) References Cited

OTHER PUBLICATIONS

R1-1900931 3GPP TSG RAN WG1 Ad-Hoc Meeting 1901, Taipei, Taiwan, Jan. 21-25, 2019, Source: Nokia, Nokia Shanghai Bell, Title: Solution for UL inter-UE multiplexing between eMBB and URLLC.

R1-1900941 3GPP TSG RAN WG1 Ad-Hoc Meeting 1901, Taipei, Taiwan, Jan. 21-25, 2019, Source: Motorola Mobility, Lenovo, Title: UL inter UE Tx prioritization/multiplexing for URLLC operation.

R1-1900973 3GPP TSG RAN WG1 Ad-Hoc Meeting 1901, Taipei, Taiwan, Jan. 21-215, 2019, Source: NTT Docomo, Inc. Title: UL inter-UE transmission prioritization/multiplexing.

R1-1901012 3GPP TSG RAN WG1 Ad-Hoc Meeting 1901, Taipei, Taiwan, Jan. 21-25, 2019, Source: WILUS Inc. Title: On UL inter-UE multiplexing for eURLLC.

R1-1901070 3GPP TSG RAN WG1 Ad-Hoc Meeting 1901, Taipei, Taiwan, Jan. 21-25, 2019, Source: Samsung, Title: Uplink inter UE multiplexing/prioritization for enhanced URLLC.

R1-1901099 3GPP TSG RAN WG1 Ad-Hoc Meeting 1901, Taipei, Taiwan, Jan. 21-25, 2019, Source: Institute for Information Industry (III) Title: Discussion UL Inter UE Tx multiplexing.

R2-162430 3GPP TSG RAN WG2 Meeting #93bis, Dubrovnik, Croatia, Apr. 11-15, 2016, Source: Huwawei, HiSilicon, Title: UL HARQ handling for LAA SCells.

R2-162744 3GPP TSG RAN WG2 Meeting #93bis, Dubrovnik, Croatia, Apr. 11-15, 2016, Source: Ericsson, Title: Dropping of initial UL HARQ transmission in LAA.

R2-164238 3GPP TSG RAN WG2 Meeting #94, Nanjing, China, May 23-27, 2016, Source: Qualcomm Incorporated, Title: Clarification of UL HARQ Handling.

R2-164253 3GPP TSG RAN WG1 Meeting #94, Nanjing, China, May 23-27, 2016, Source: Huawei, HiSilicon, Title: The UE handling on the dropped UL HARQ transmission.

R1-1813098 3GPP TSG RAN WG1 Meeting 95, Spokane, USA, Nov. 12-16, 2018, Source: ETRI, Title: UL inter US Tx prioritization/multiplexing.

Jul. 7, 2020—European Extended Search Report—EP 20156689.0.

R1-1806030 3GPP TSG-RAN WG1 #93, Busan, Korea, May 21-25, 2018, Source: ZTE, Title: Remaining issues for UL data transmission procedure.

R1-1813884 3GPP TSG-RAN WG1 #95, Spokane, USA, Nov. 12-16, 2018, Source: ZTE, Title: Enhancement for UL grant-free transmissions.

R1-1716250 3GPP TSG-RAN WG1 Meeting NR#3, Nagoya, Japan, Sep. 18-21, 2017, Source: Sony, Title: Discussion on the pre-emption and HARQ of UL transmission without grant.

Sep. 20, 2022—European Office Action—EP App. No. 20156689.0.

* cited by examiner

User Plane Protocol Stack

Control Plane Protocol Stack

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

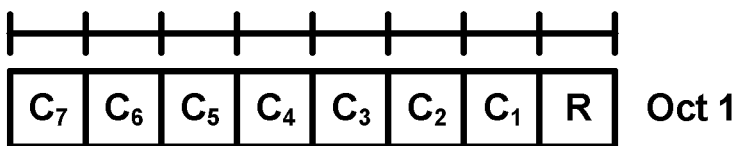
| $C_7$ | $C_6$ | $C_5$ | $C_4$ | $C_3$ | $C_2$ | $C_1$ | R | Oct 1 |
FIG. 21A
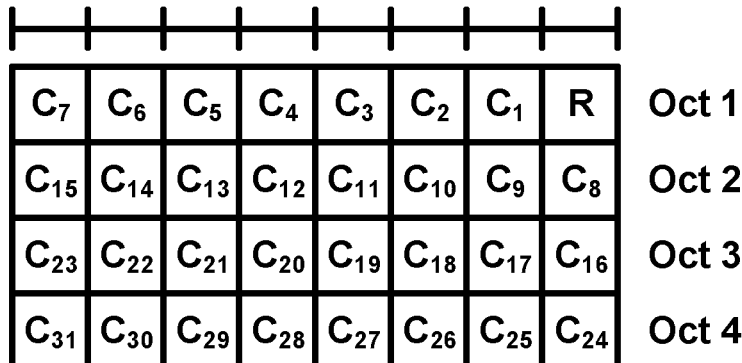
| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
FIG. 21B
| Hibernation MAC CE $C_i$ | Activation/ Deactivation MAC CE $C_i$ | SCell may be |
| --- | --- | --- |
| 0 | 0 | Deactivated |
| 0 | 1 | Activated |
| 1 | 0 | Reserved MAC CE combination |
| 1 | 1 | Dormant |
FIG. 21C

| | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| | | | |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| | | | |
| Special | 3, 3A | 45 | Power control commands |
| | 5 | | Sidelink operation |
| | 6-2 | | Paging/direct indication for eMTC devices |

FIG. 22

| TPC Command Field | Accumulated $\delta_{PUSCH,b,f,c}$ [dB] | Absolute $\delta_{PUSCH,b,f,c}$ [dB] |
|:---:|:---:|:---:|
| 0 | -1 | -4 |
| 1 | 0 | -1 |
| 2 | 1 | 1 |
| 3 | 3 | 4 |

POWER CONTROL AND RETRANSMISSION

CROSS-REFERENCE TO RELATED APPLICATIONS

This application is a continuation of and claims priority to U.S. patent application Ser. No. 17/729,625 filed on Apr. 26, 2022, which is a continuation of U.S. patent application Ser. No. 16/788,079 filed on Feb. 11, 2020 (now U.S. Pat. No. 11,405,874), which claims the benefit of U.S. Provisional Application No. 62/803,999 filed on Feb. 11, 2019, each of which is hereby incorporated by reference in its entirety.

BACKGROUND

A base station sends a message to a wireless device to indicate an uplink grant for the wireless device. The wireless device uses the uplink grant to send uplink transmissions to the base station.

SUMMARY

The following summary presents a simplified summary of certain features. The summary is not an extensive overview and is not intended to identify key or critical elements.

Systems, methods, and apparatuses for wireless communications are described. Transmissions from a wireless device may be cancelled/delayed to enable a wireless device to send another transmission (e.g., for more urgent communications, higher priority service, etc.). A base station may send one or more control messages, such as a pre-emption message and/or a power control message, to the wireless device. The wireless device may pre-empt (e.g., based on a pre-emption message) transmission of one or more repetitions (e.g., redundancy versions) of a message (e.g., one or more transport blocks (TB s)) among a plurality of repetitions of the message. The wireless device may determine/ assume that a pre-empted message has been transmitted, transmit the pre-empted message in/via another time slot or other time duration, re-arrange an order of non-pre-empted messages, and/or cancel transmissions of the plurality of repetitions of the message. The wireless device may determine not to use one or more power control messages to determine a transmission power of the wireless device, for example, based on receiving a pre-emption message. Pre-empting transmission of one or more repetitions of the message and/or not using the one or more power control messages may result in advantages such as reduced power consumption, reduced transmission latency, more efficient use of scheduled resources in a network, reduced interference between multiple wireless devices, and/or higher network throughput.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 17A and FIG. 17B show example MAC data unit formats.

FIG. 18 shows example logical channel identifier (LCID) values.

FIG. 19 shows example LCID values.

FIG. 21A shows an example of an SCell hibernation MAC CE.

FIG. 21B shows an example of an SCell hibernation MAC CE.

FIG. 21C shows example MAC CEs for SCell state transitions.

FIG. 22 shows example downlink control information (DCI) formats.

FIG. 30 shows an example of power control using uplink pre-emption.

FIG. 31 shows an example of power control using uplink pre-emption.

3

Figure 36:
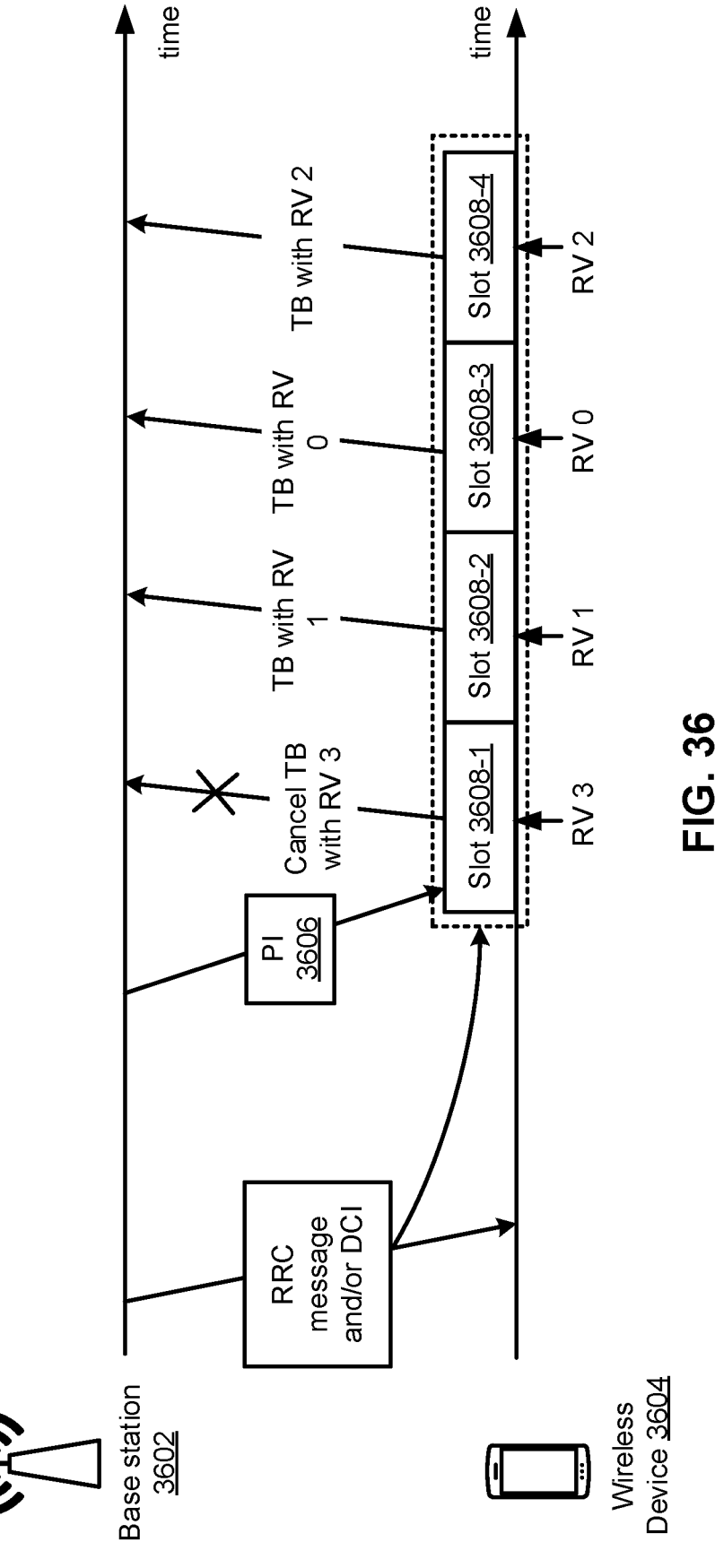

FIG. 36 shows an example of uplink transmission using uplink pre-emption.

Figure 37:
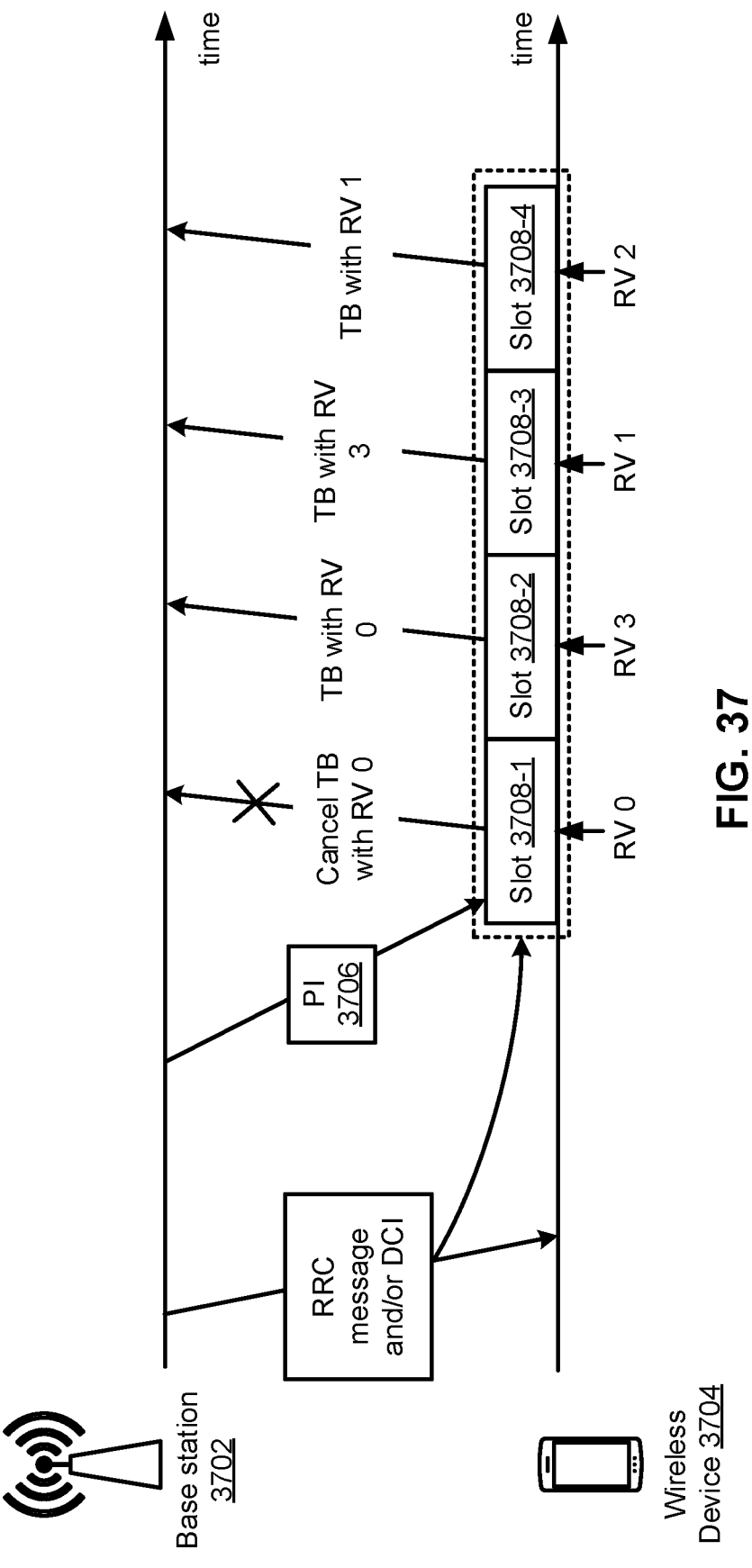

FIG. 37 shows an example of uplink transmission using uplink pre-emption.

Figure 38:
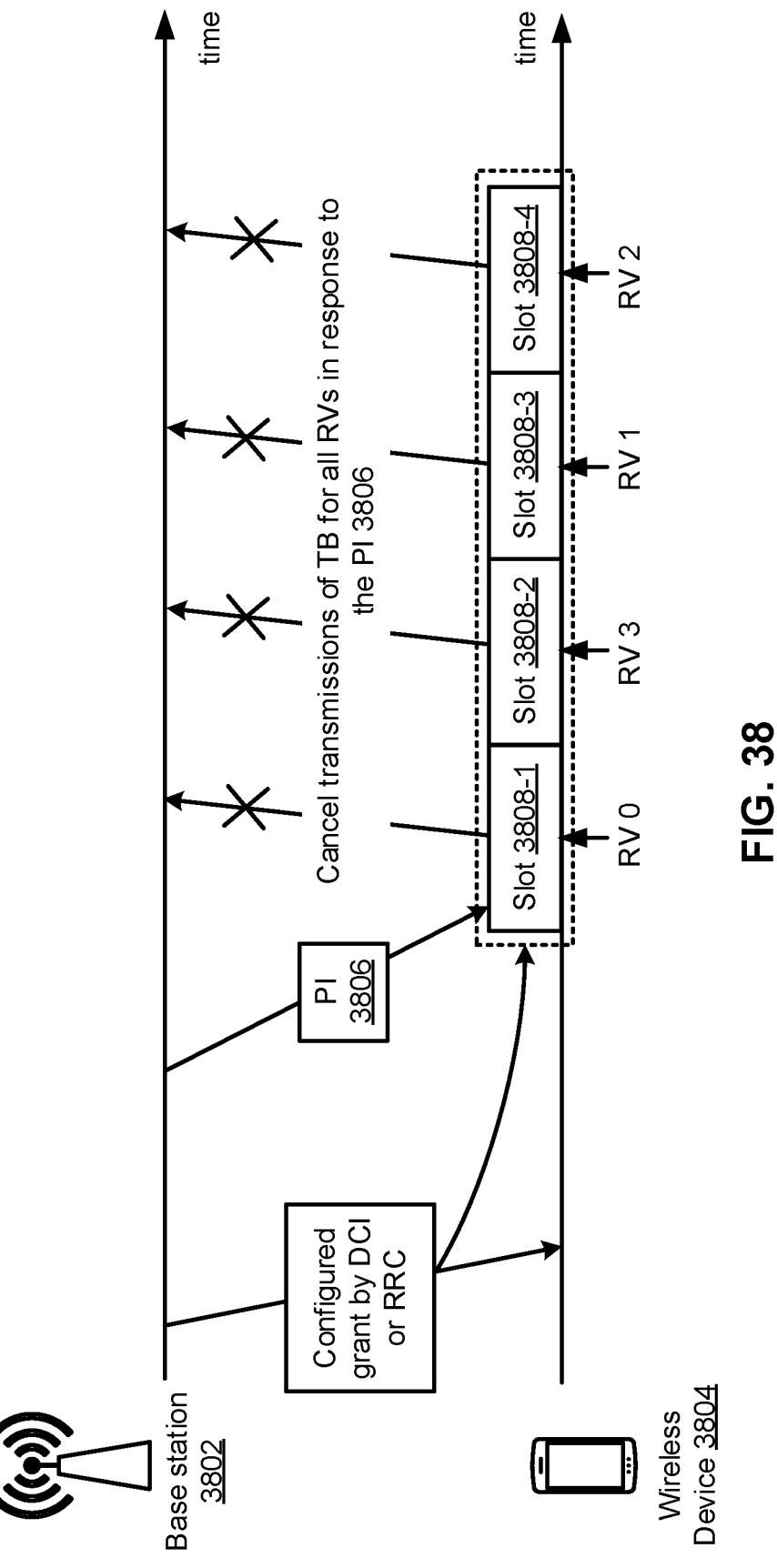

FIG. 38 shows an example of uplink transmission using uplink pre-emption.

Figure 39:
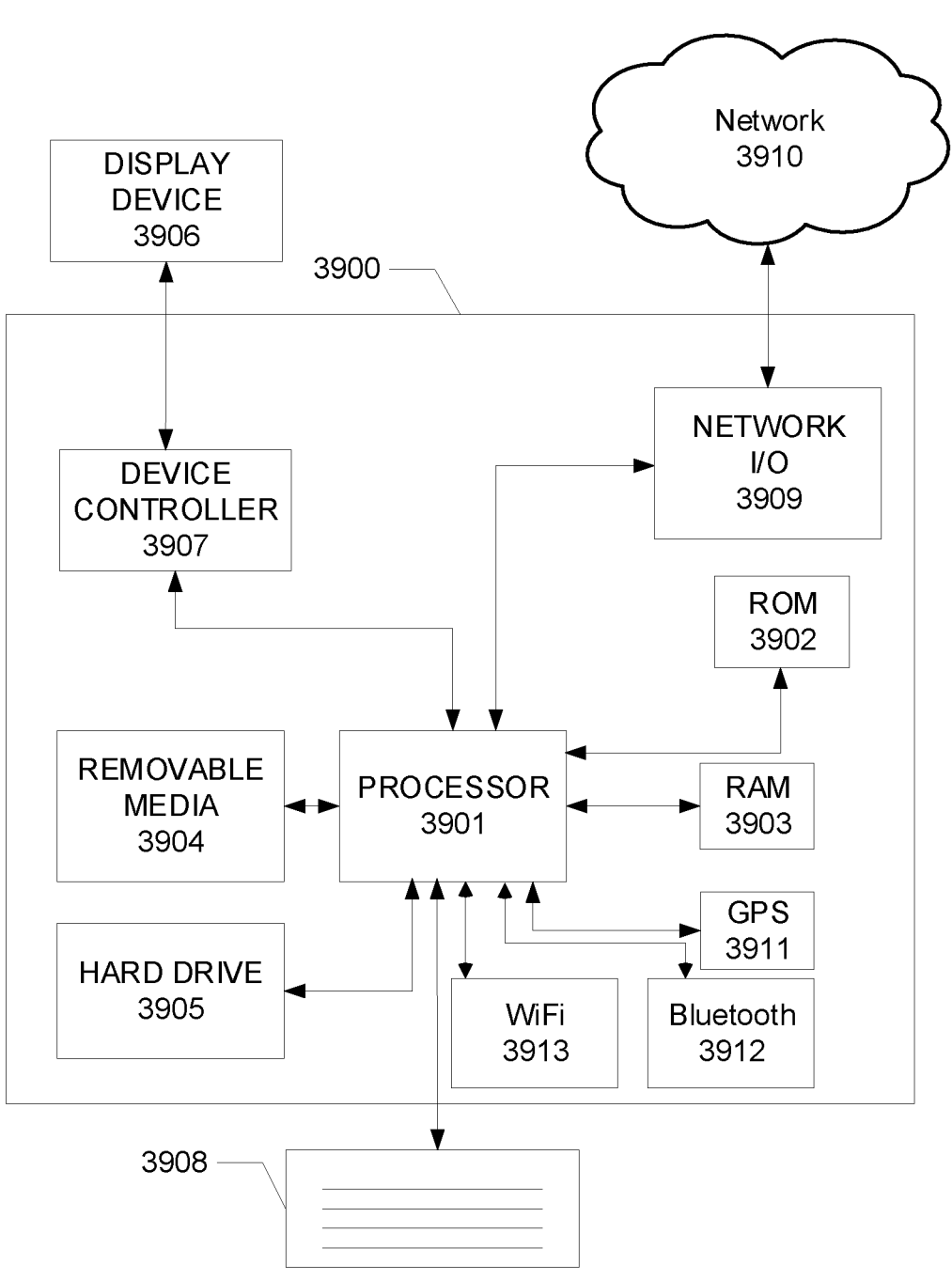

FIG. 39 shows example elements of a computing device that may be used to implement any of the various devices described herein.

DETAILED DESCRIPTION

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to various mechanisms used for pre-empting transmissions and/or transmission power control in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel

4

DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying RA Random Access
RACH Random Access CHannel
RAN Radio Access Network
RAT Radio Access Technology
RA-RNTI Random Access-Radio Network Temporary
   Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple
   Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary
   Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

Figure 1:
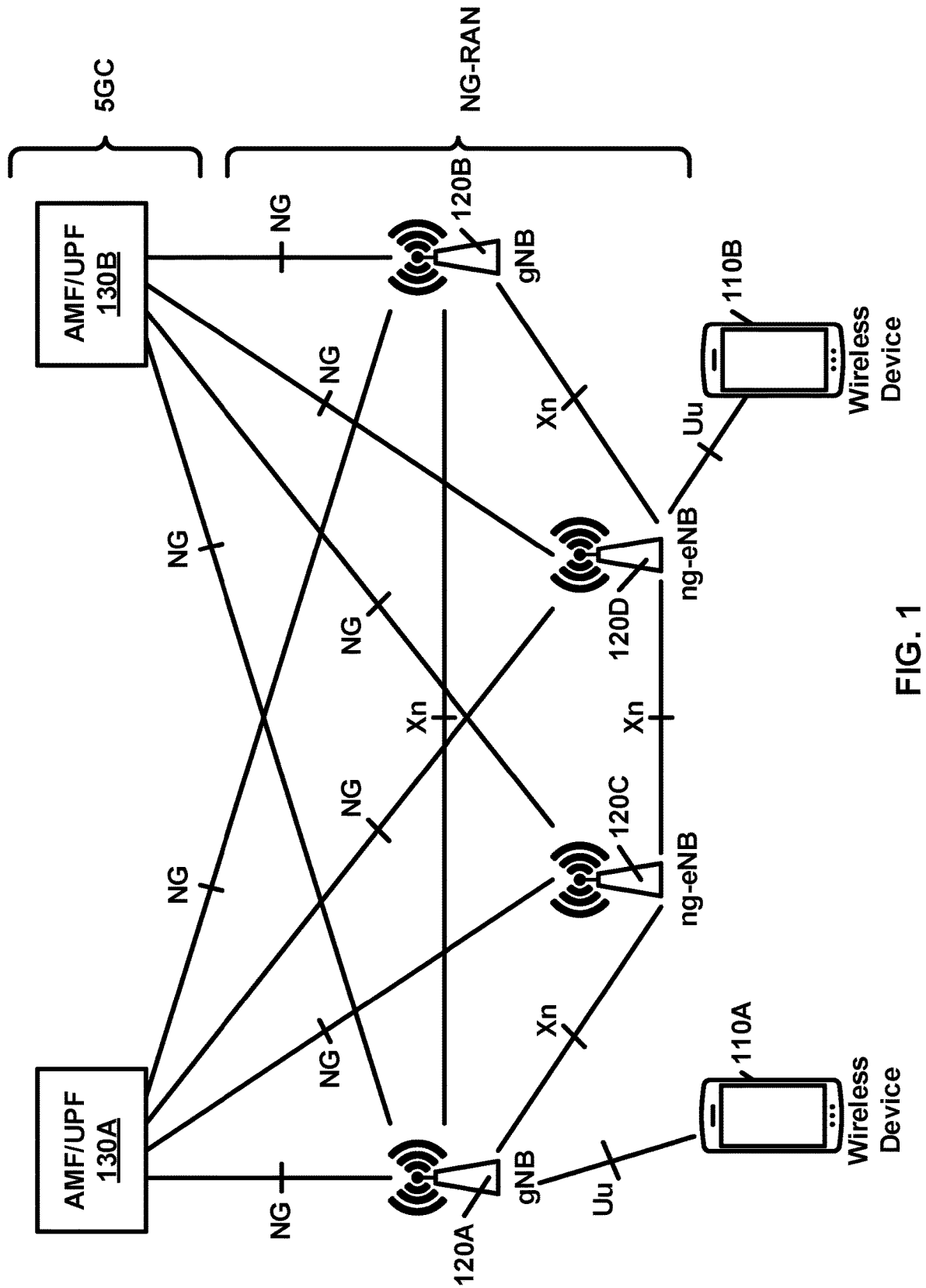
FIG. 1 shows an example radio access network (RAN) architecture.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
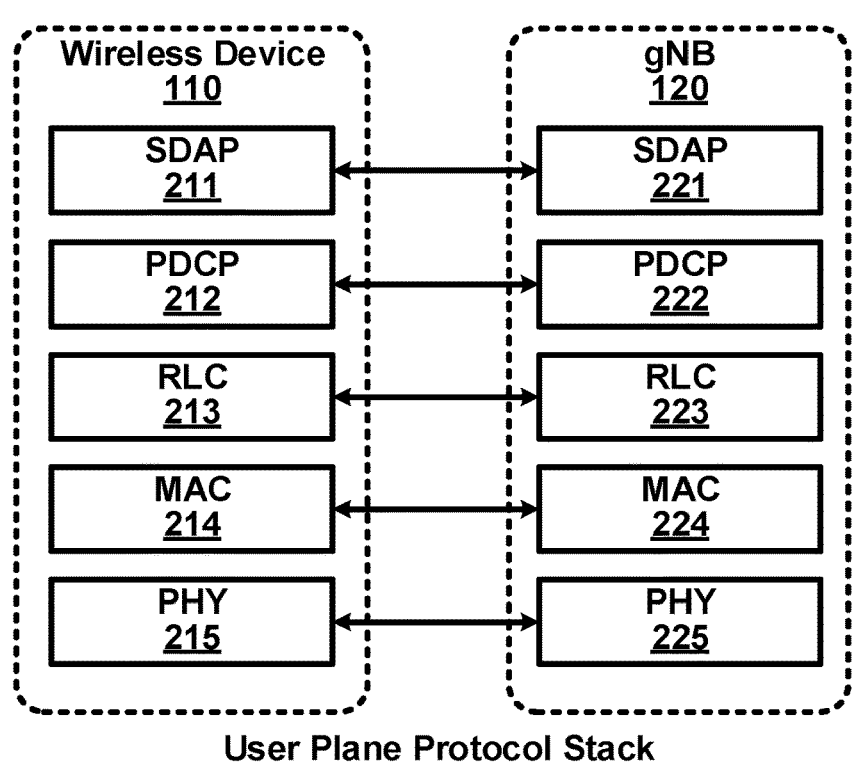
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TB s) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
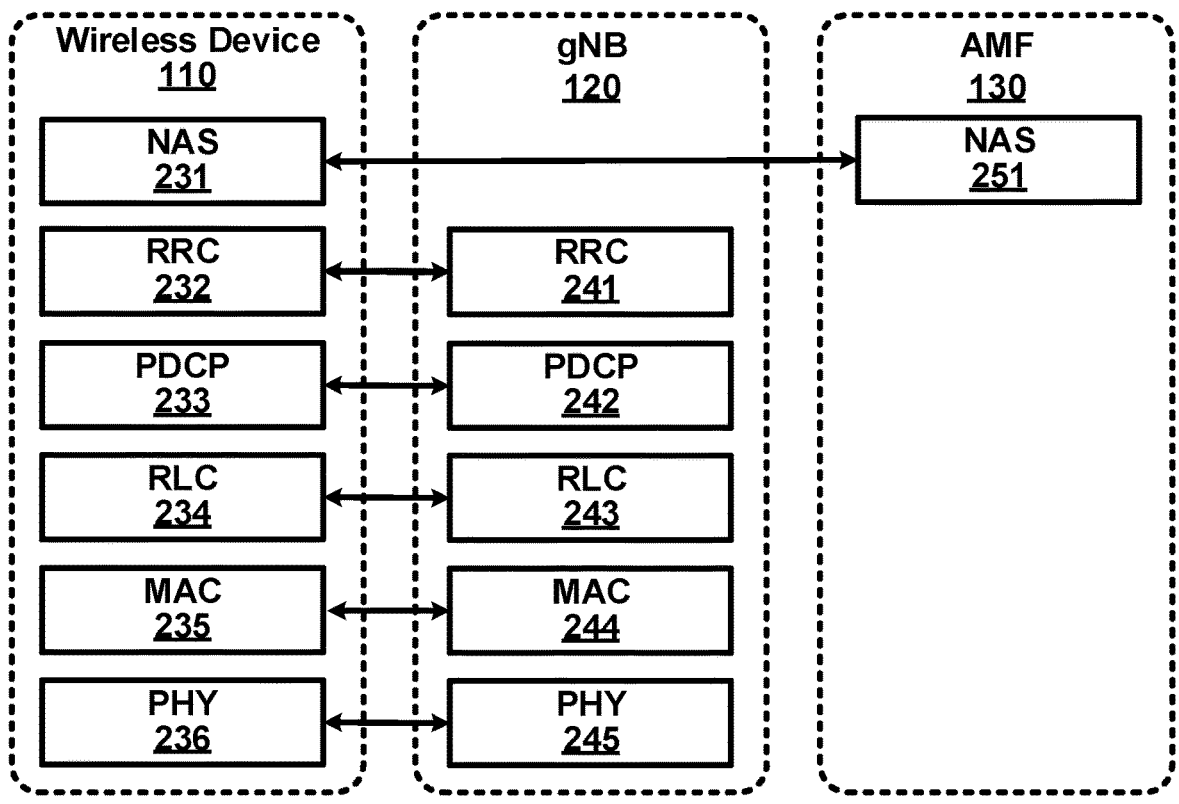
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be config-ured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
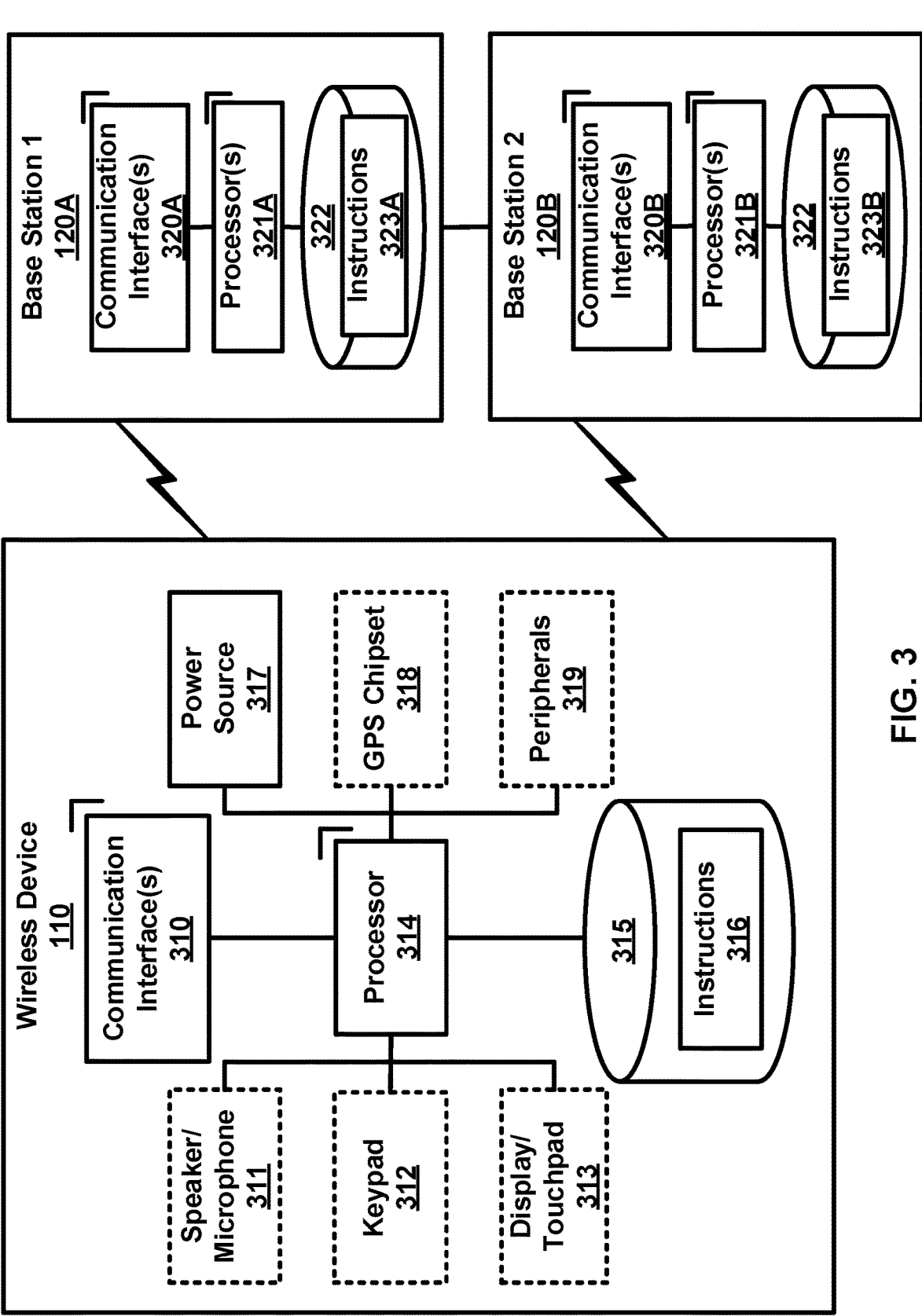
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points (TRPs), or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any quantity/number of sectors, for example: 1, 2, 3, 4, or 6 sectors. A base station may comprise any quantity/number of transmission and reception points (TRPs) (e.g., two TRPs, or any quantity of TRPs). A base station may comprise any quantity/number of cells, for example, ranging from 1 to 50 cells or more. A cell may be categorized, for example, as a primary cell or secondary cell. At Radio Resource Control (RRC) connec-tion establishment, re-establishment, handover, etc., a serv-ing cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC mes-sages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) com-prising a plurality of configuration parameters for one or more cells. One or more cells may comprise at least one primary cell and at least one secondary cell. An RRC message may be broadcasted and/or unicasted to the wire-less device. Configuration parameters may comprise com-mon parameters and dedicated parameters.

Services and/or functions of an RRC sublayer may com-prise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modi-fication, and/or release of carrier aggregation; and/or addi-tion, modification, and/or release of dual connectivity in NR or between E-UTRA and NR. Services and/or functions of an RRC sublayer may comprise at least one of security functions comprising key management; establishment, con-figuration, maintenance, and/or release of Signaling Radio Bearers (SRBs) and/or Data Radio Bearers (DRBs); mobil-ity functions which may comprise at least one of a handover (e.g., intra NR mobility or inter-RAT mobility) and/or a context transfer; and/or a wireless device cell selection and/or reselection and/or control of cell selection and rese-lection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system informa-tion; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 120B and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multicarrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figures 4A, 4B, 4C, 4D:
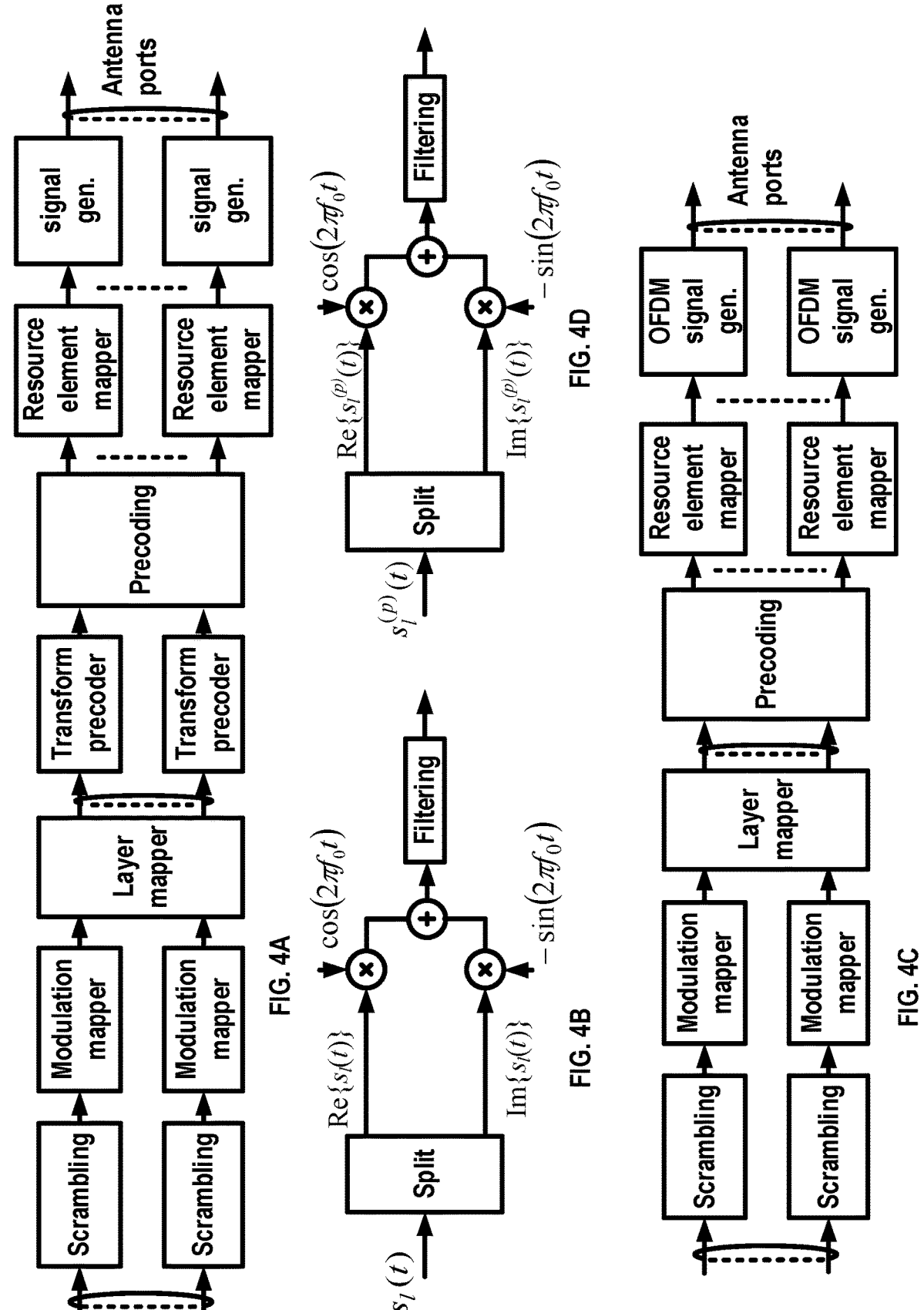
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
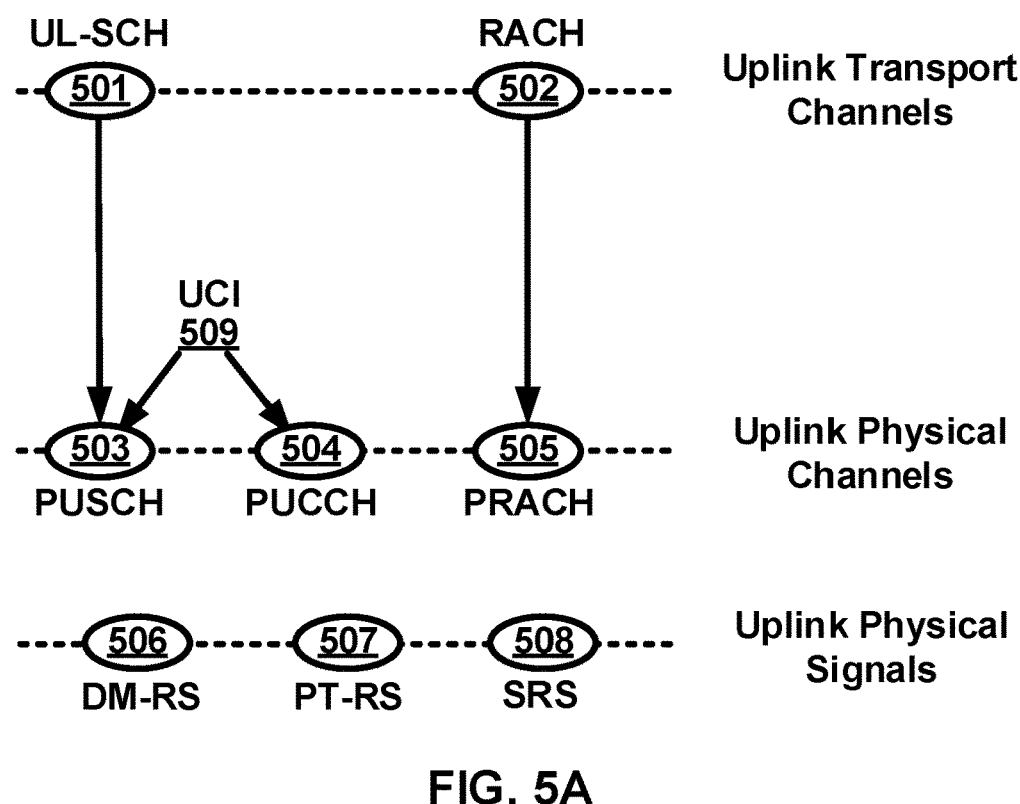
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum quantity/number of front-loaded DM-RS symbols for PUSCH and/or PUCCH. The wireless device may schedule a single-symbol DM-RS and/or double symbol DM-RS based on a maximum quantity/number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A quantity/number of PT-RS ports may be less than a quantity/number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a quantity/number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a quantity/number of OFDM symbols in a SRS resource, starting OFDM symbol of a SRS resource, an SRS bandwidth, a frequency hopping bandwidth, a cyclic shift, and/or an SRS sequence ID.

Figure 5B:
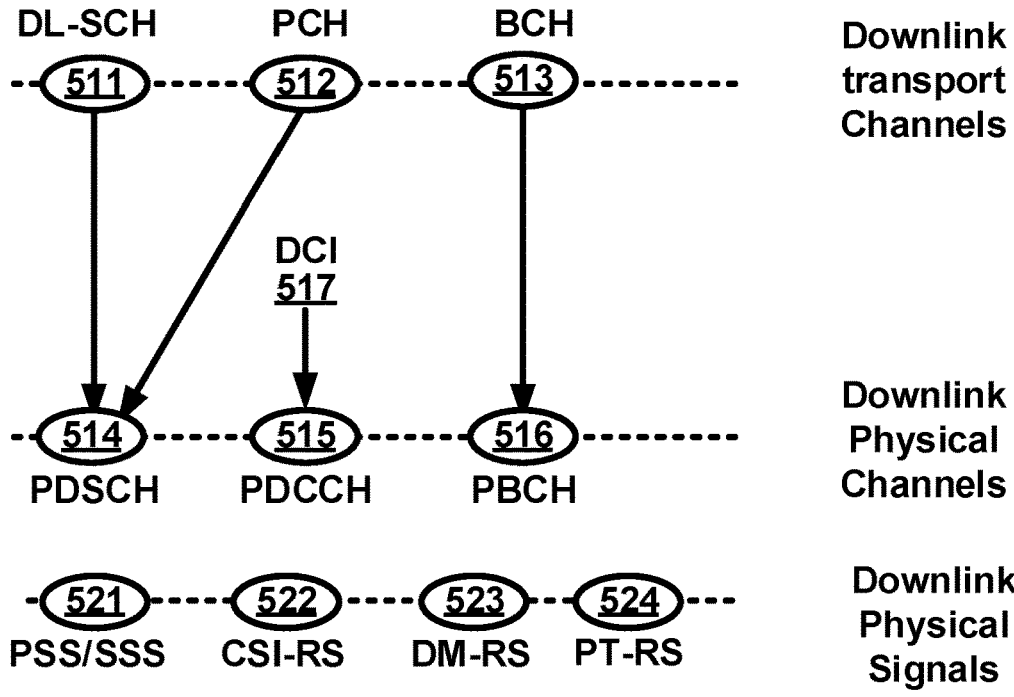
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a quantity/number of antenna ports. A base station may configure a wireless device with 32 ports, or any other quantity/number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum quantity/ number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A quantity/number of PT-RS ports may be less than a quantity/number of DM-RS ports in a scheduled resource. The downlink PT-RS 524 may be confined in the scheduled time/frequency duration for a wireless device.

Figure 6:
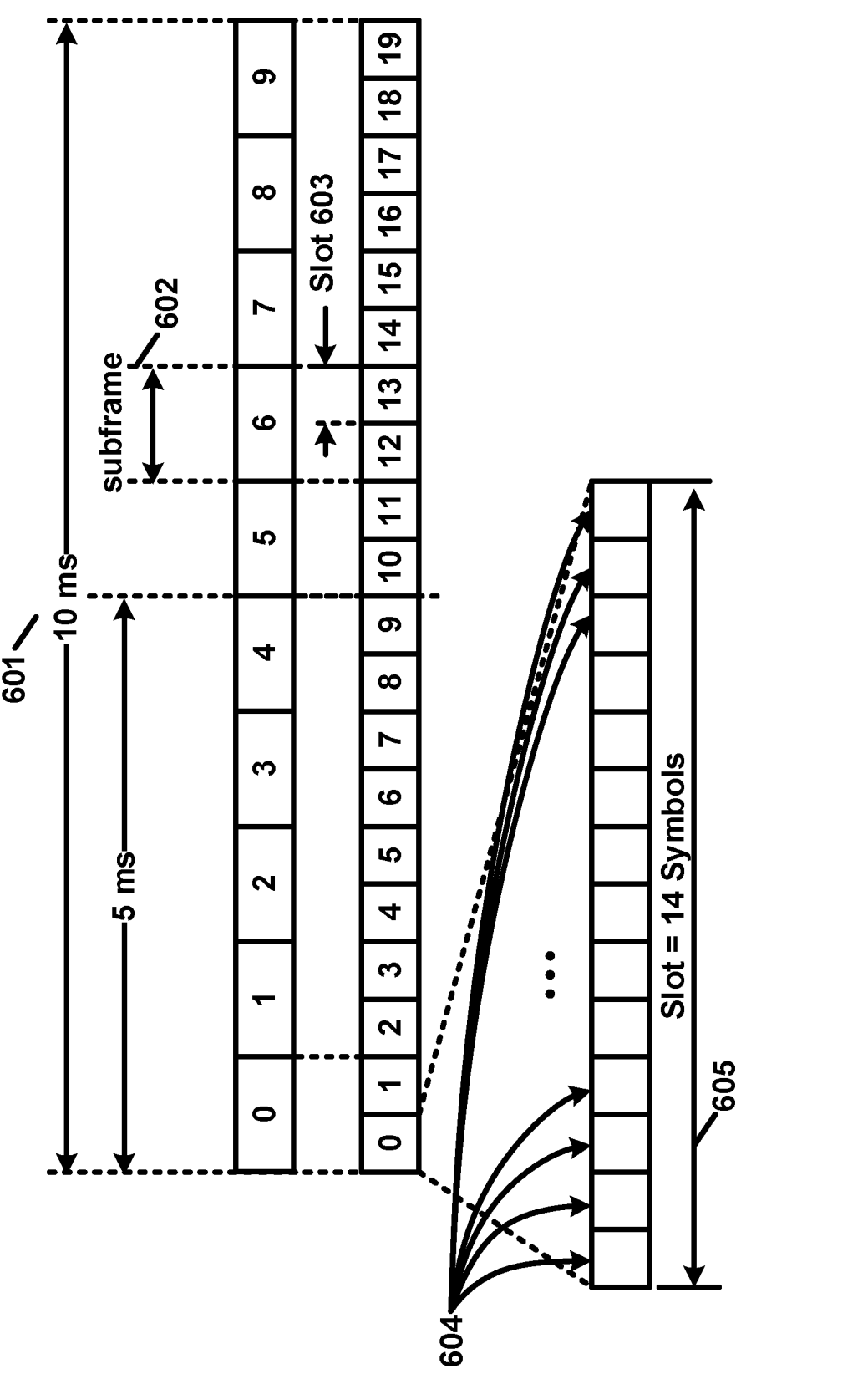
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The quantity/number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figures 7A, 7B:
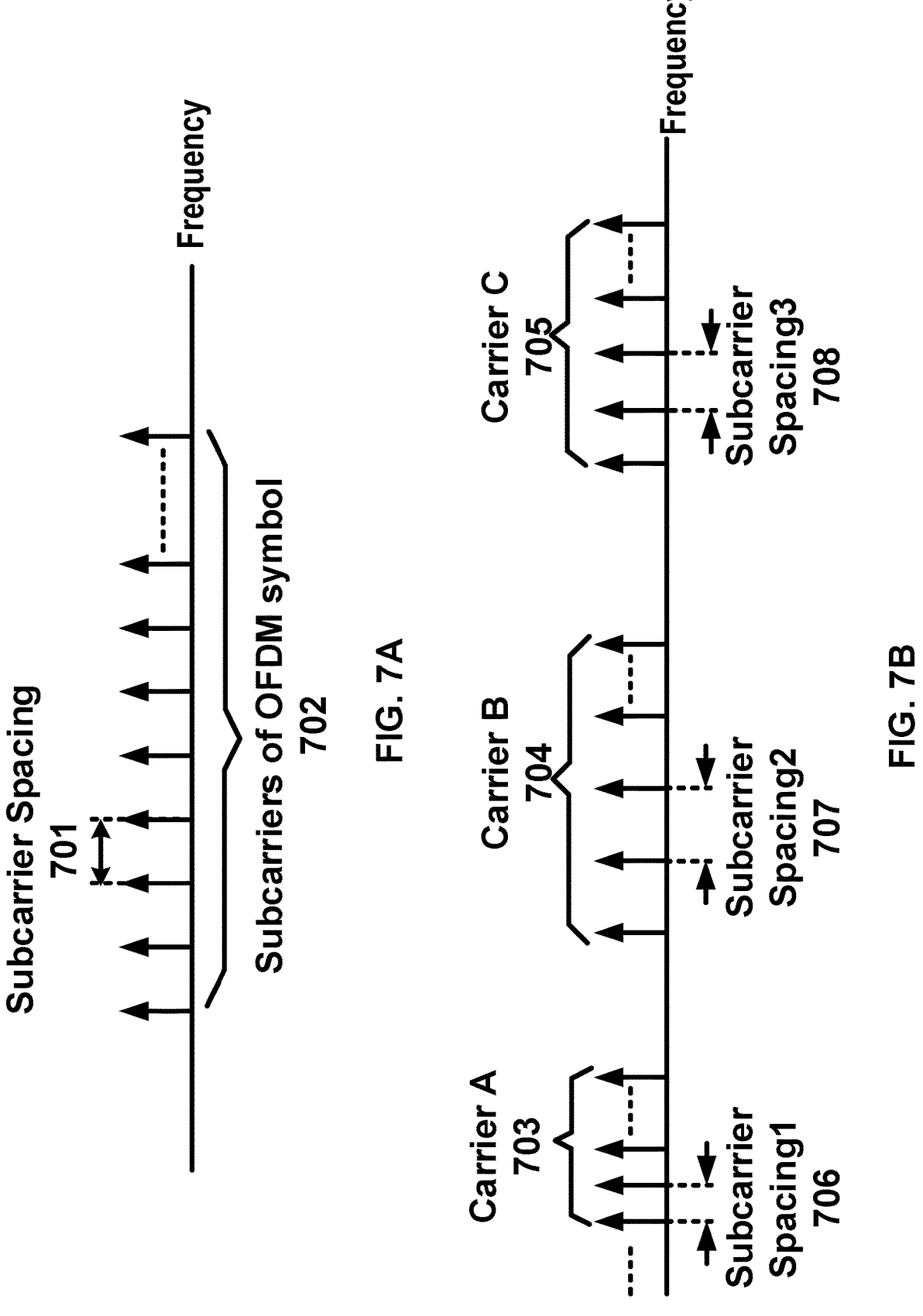
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s)

in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a quantity/number of subcarriers 703 in a carrier. A bandwidth occupied by a quantity/number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A quantity/number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in quantity/number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first quantity/number of subcarriers 706 having a first subcarrier spacing 709. A second component carrier may comprise a second quantity/ number of subcarriers 707 having a second subcarrier spacing 710. A third component carrier may comprise a third quantity/number of subcarriers 708 having a third subcarrier spacing 711. Carriers in a multicarrier OFDM communication system may be contiguous carriers, non-contiguous carriers, or a combination of both contiguous and noncontiguous carriers.

Figure 8:
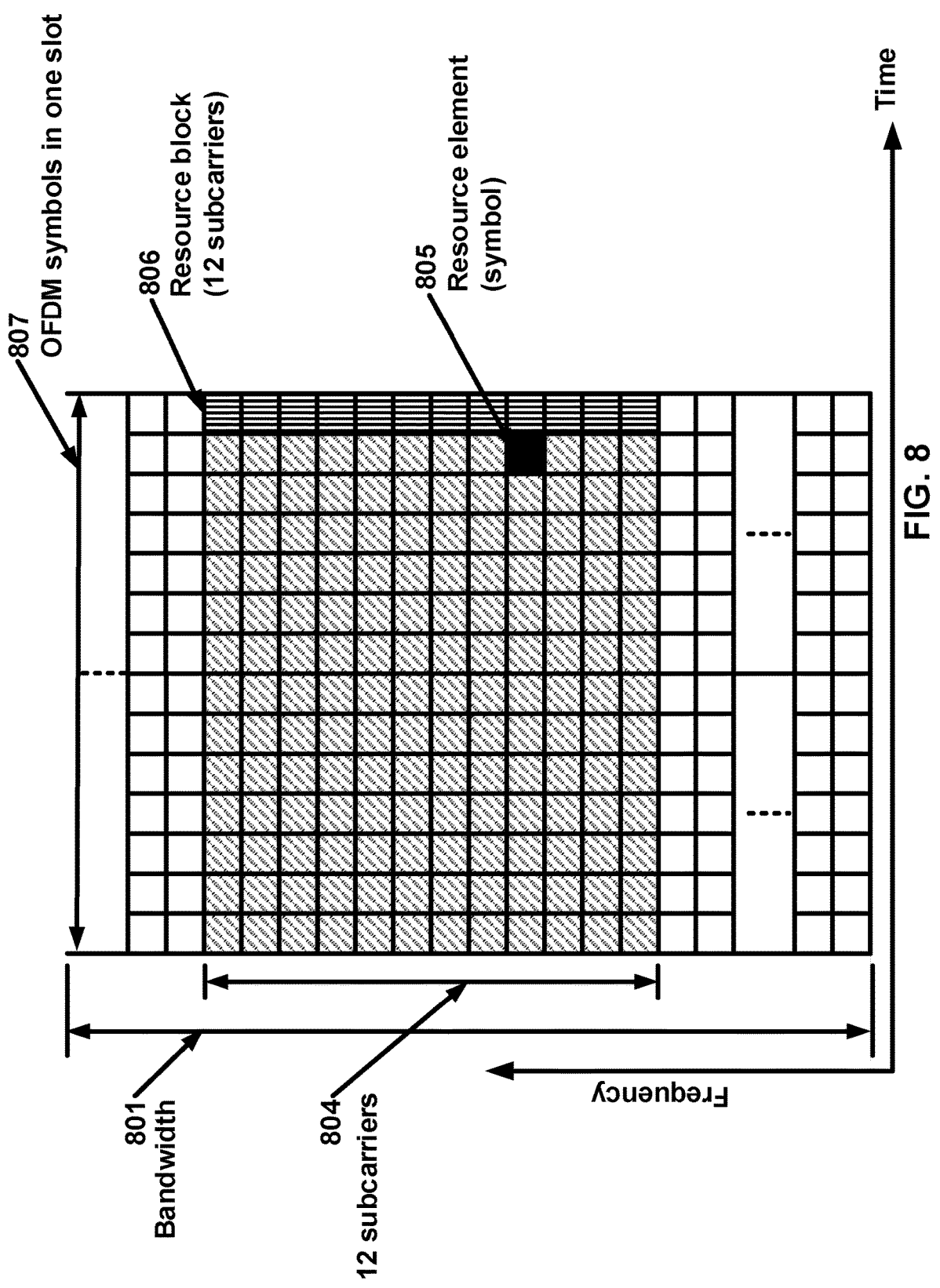
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first quantity/ number of OFDM symbols in a subframe and a second quantity/number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first quantity/number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second quantity/number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RS s. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figures 9A, 9B:
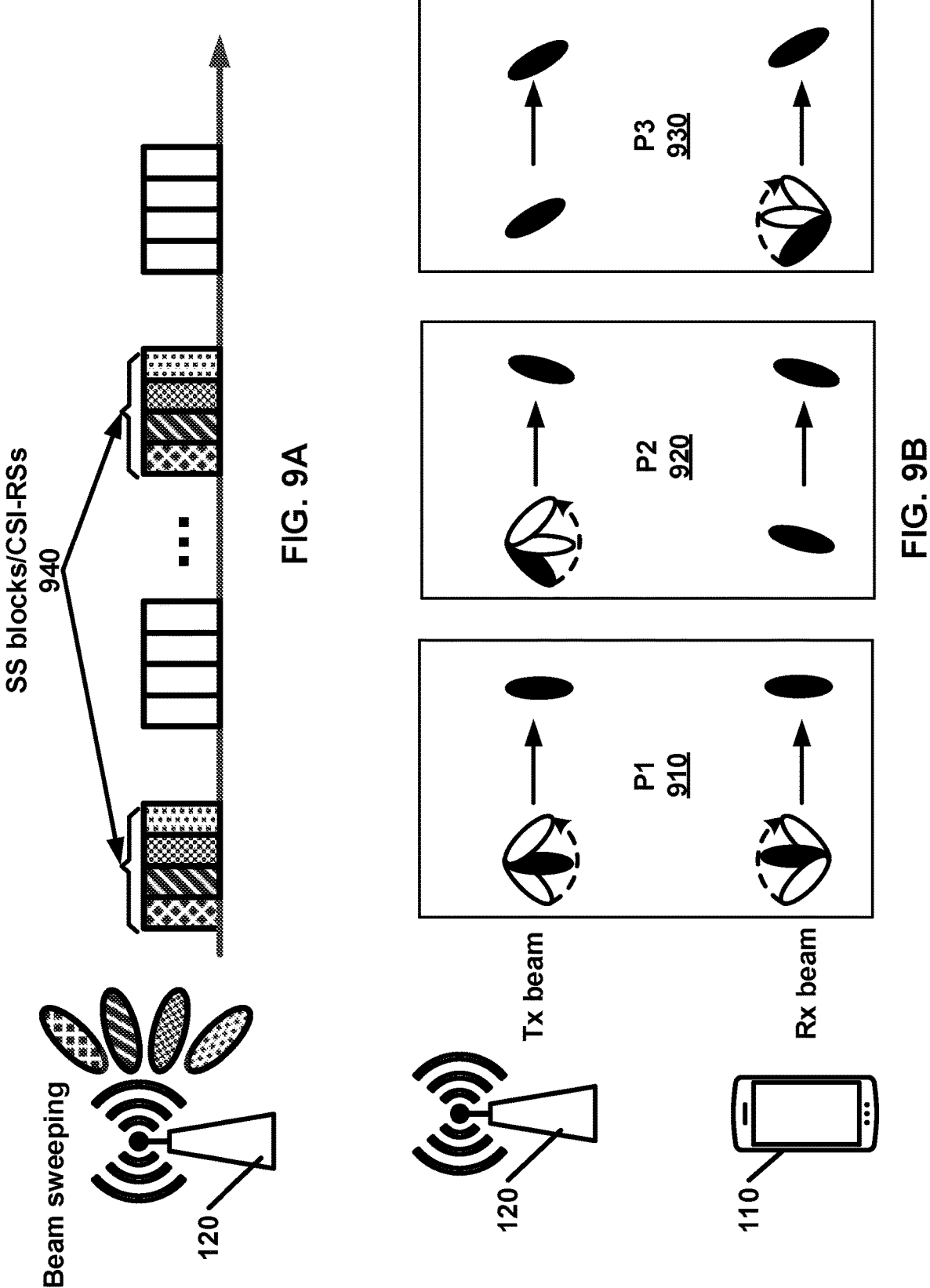
FIG. 9A shows an example channel state information reference signal (CSI-RS) and/or synchronization signal (SS) block transmission in a multi-beam system.
FIG. 9B shows an example downlink beam management procedure.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
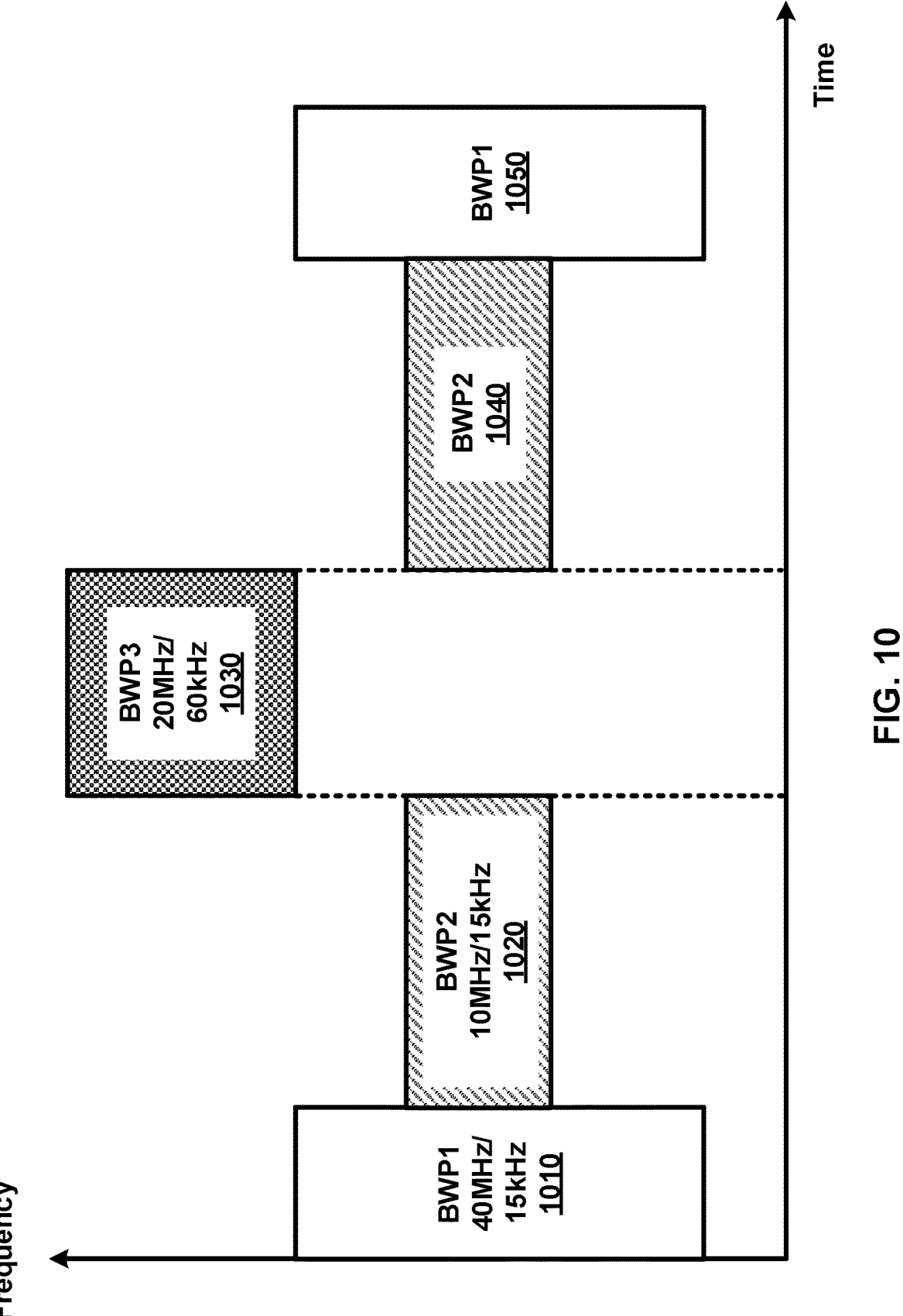
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any quantity/number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and quantity/number of contiguous PRBs, a subcarrier spacing, or a cyclic prefix, for example, for a CORE-SETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a quantity/number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
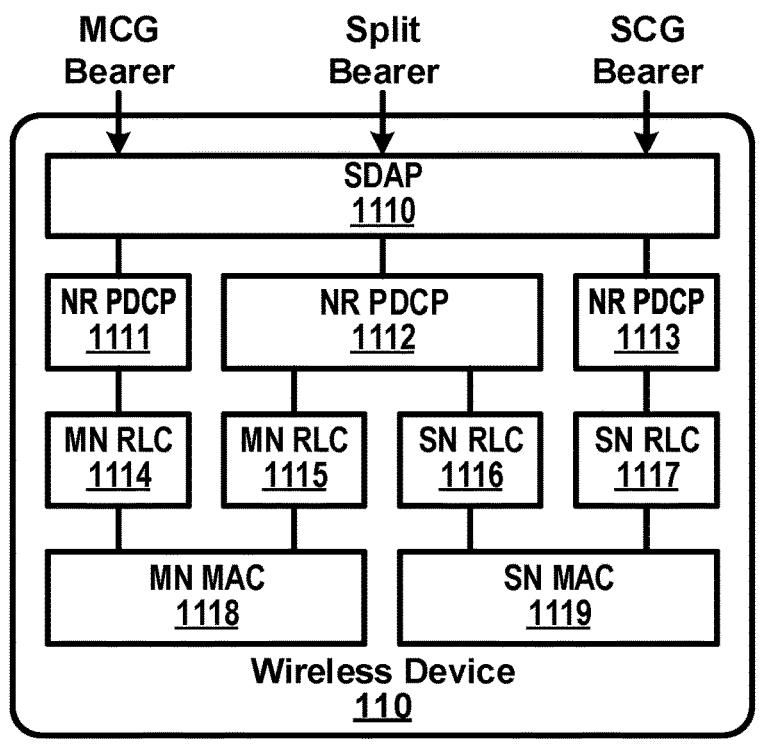
FIG. 11A and FIG. 11B show examples of multi connectivity.
Figure 11B:
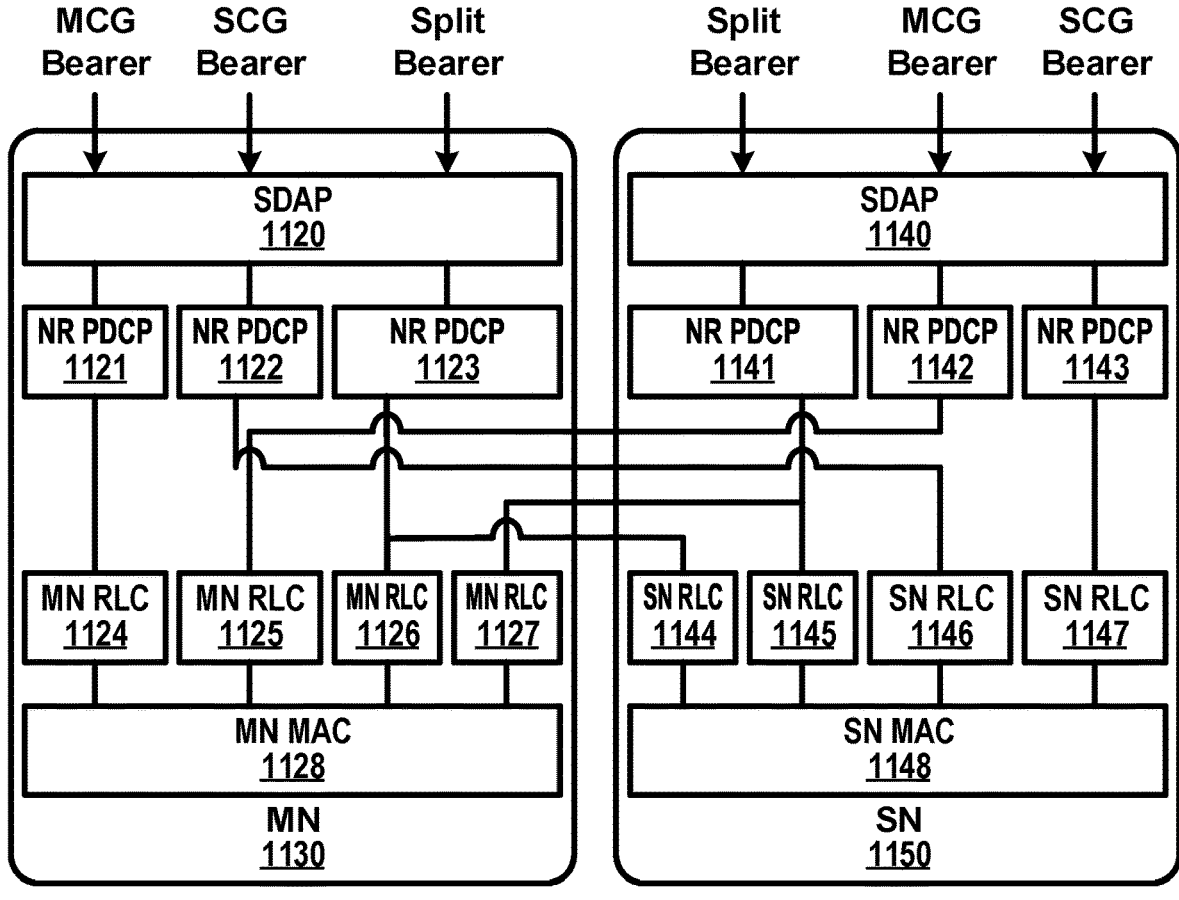

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a quantity/number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages.

A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
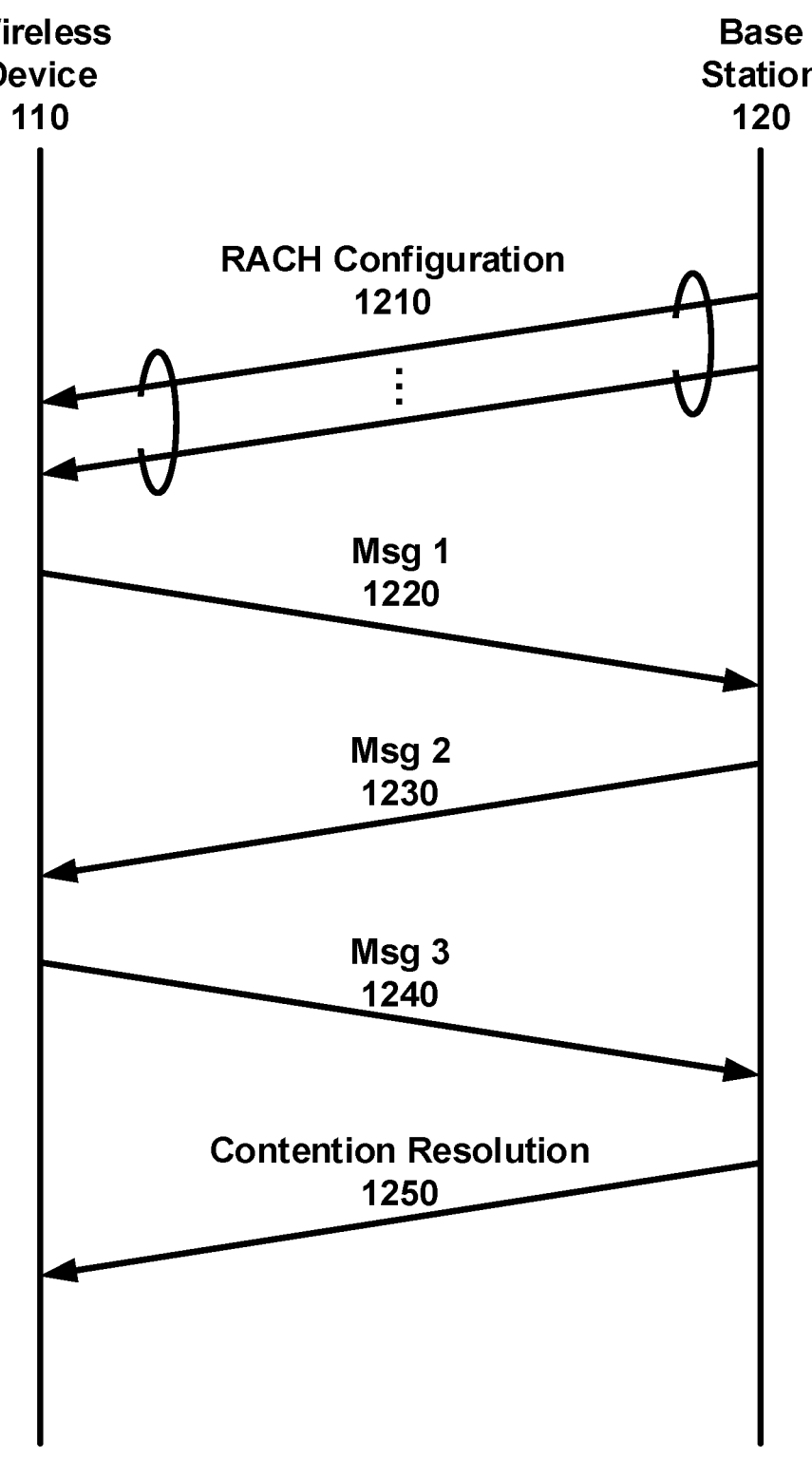
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg 1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum quantity/number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RS s. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSRP threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the random access procedure is successfully completed.

Figure 13:
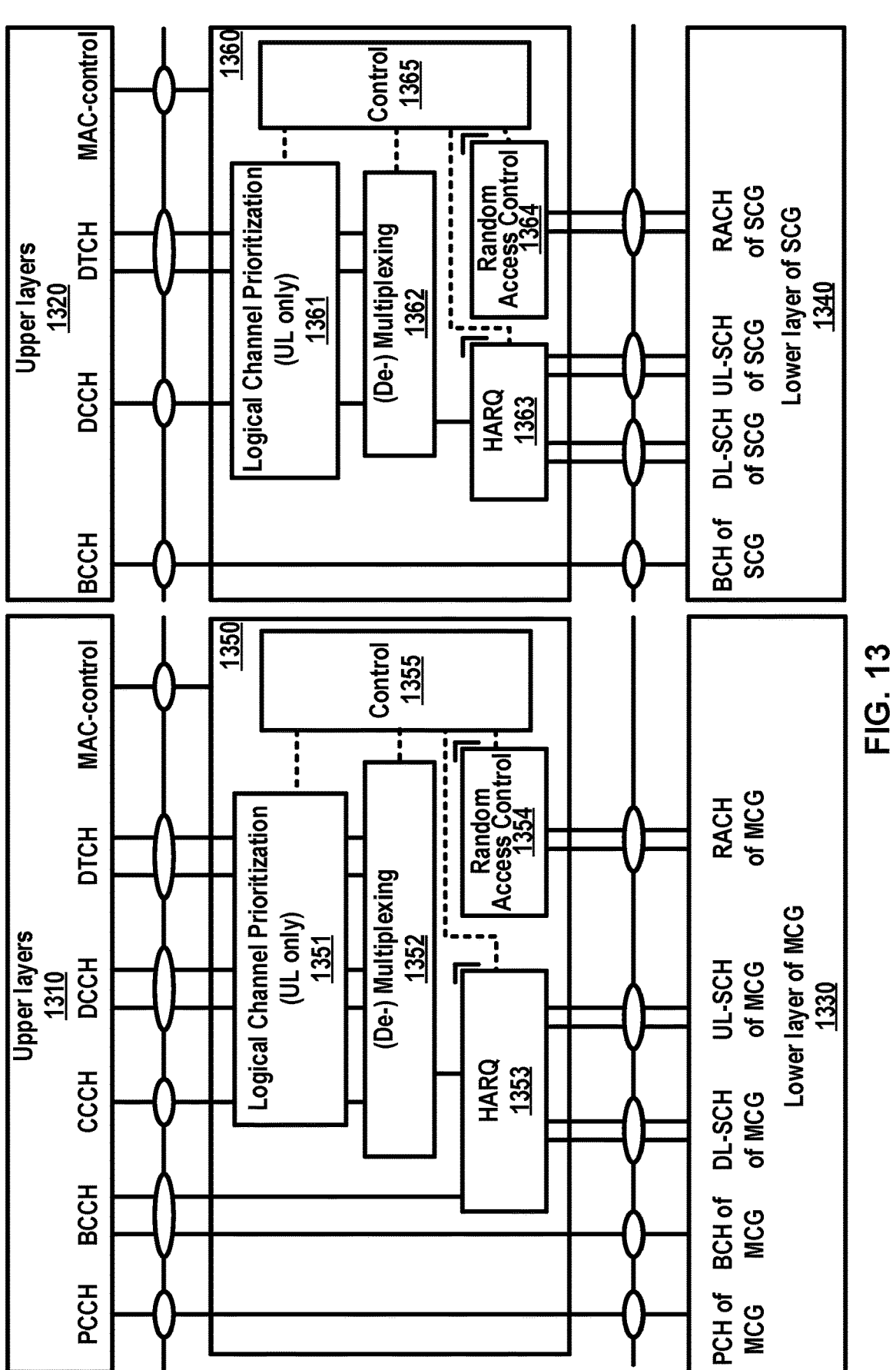
FIG. 13 shows example medium access control (MAC) entities.

FIG. 13 shows an example structure for MAC entities. A wireless device may be configured to operate in a multi-connectivity mode. A wireless device in RRC-CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a quantity/ number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
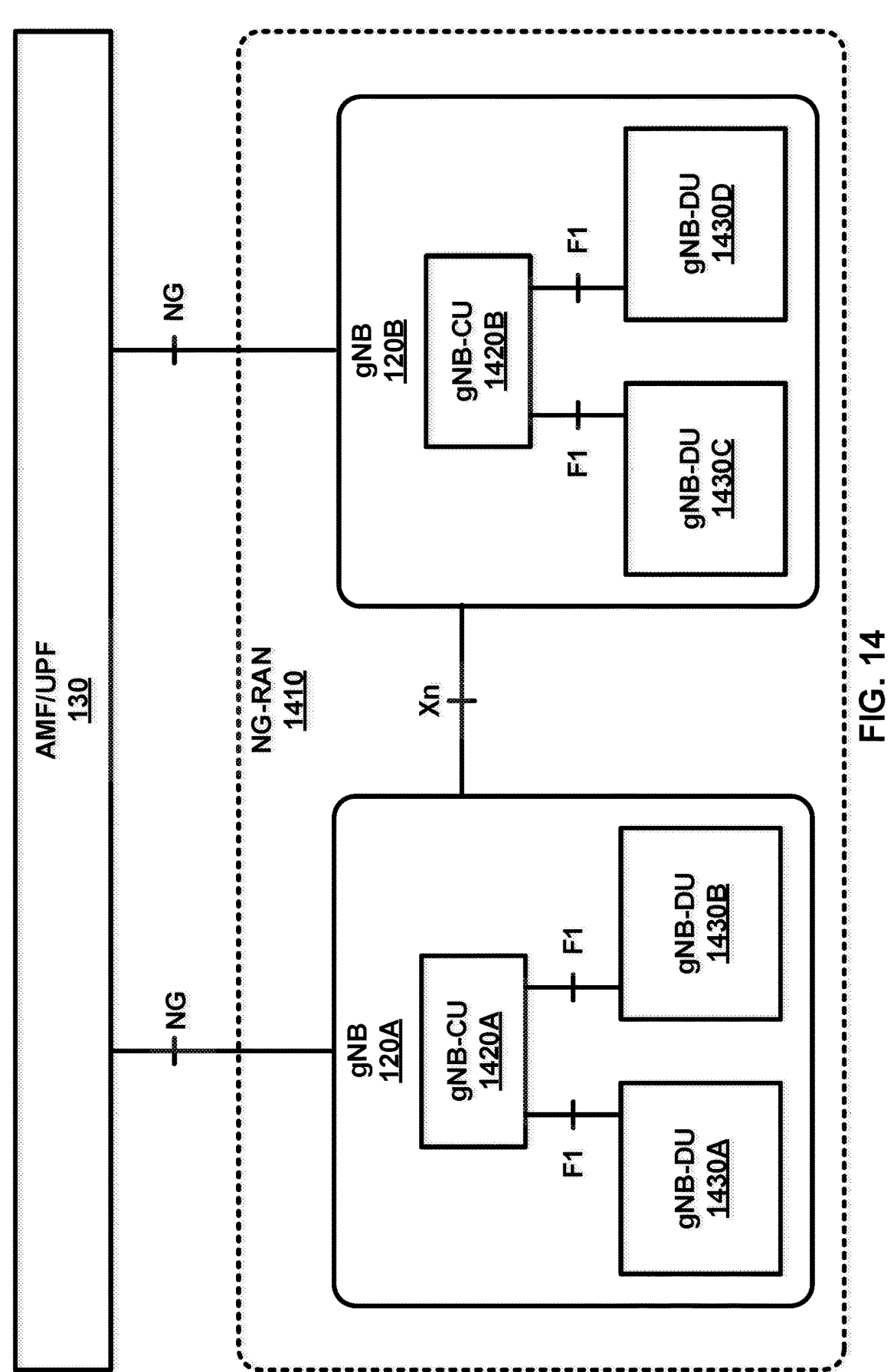
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
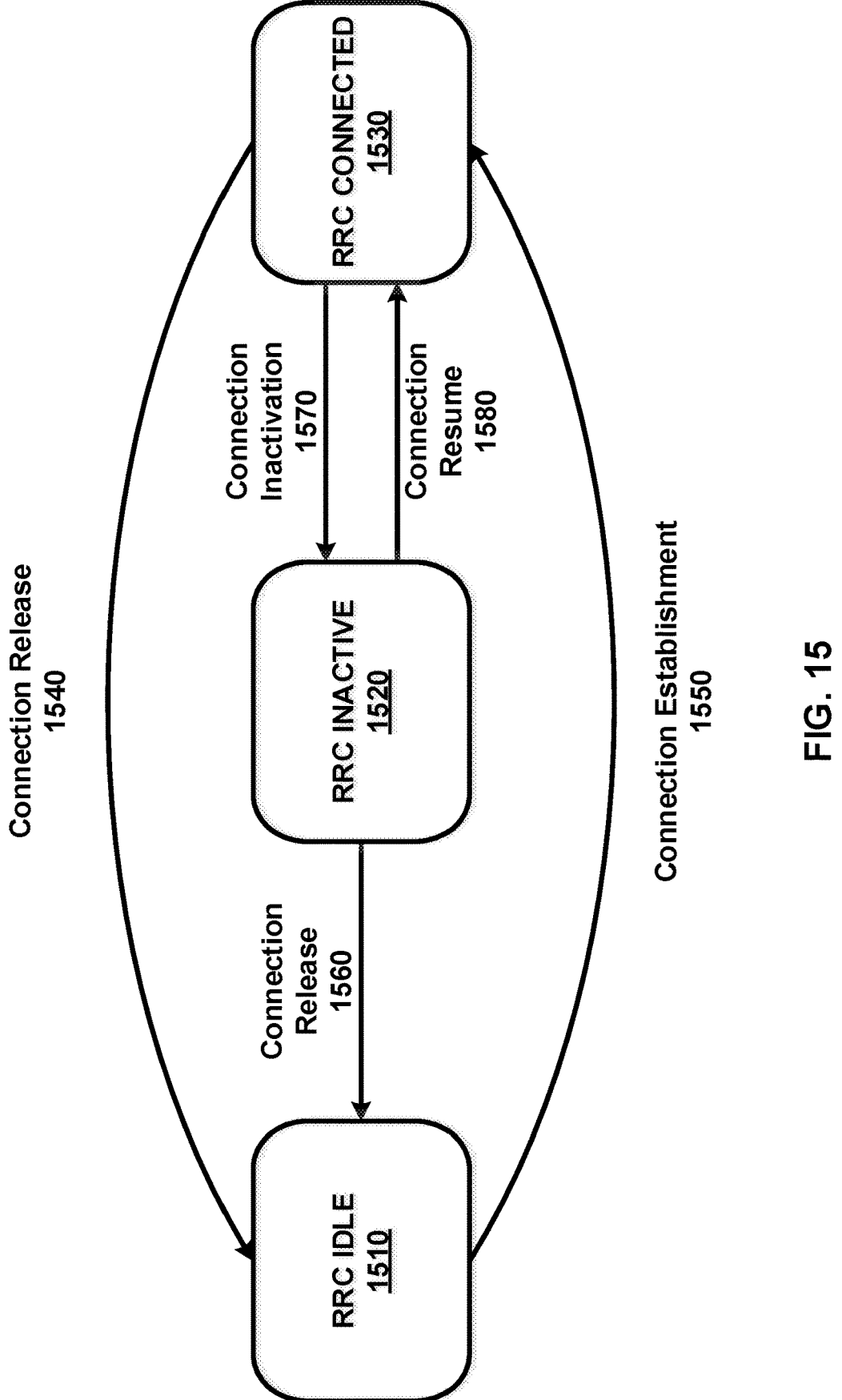
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/ MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; and/or an L field with multiple bits in length. The MAC subheader may correspond to a MAC SDU, a variable-sized MAC CE, and/or padding.

Figure 16A:
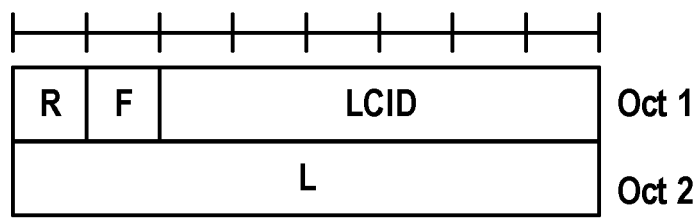
FIG. 16A, FIG. 16B and FIG. 16C show example MAC subheaders.

FIG. 16A shows an example of a MAC subheader comprising an eight-bit L field. The LCID field may have six bits in length (or any other quantity of bits). The L field may have eight bits in length (or any other quantity of bits).

Figure 16B:
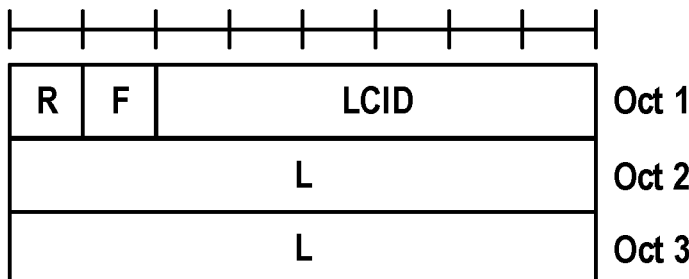

FIG. 16B shows an example of a MAC subheader with a sixteen-bit L field. The LCID field may have six bits in length (or any other quantity of bits). The L field may have sixteen bits in length (or any other quantity of bits). A MAC subheader may comprise: a R field comprising two bits in length (or any other quantity of bits); and an LCID field comprising multiple bits in length (e.g., if the MAC subheader corresponds to a fixed sized MAC CE), and/or padding.

Figure 16C:
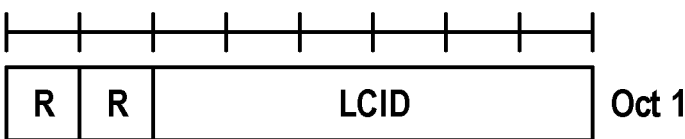

FIG. 16C shows an example of the MAC subheader. The LCID field may comprise six bits in length (or any other quantity of bits). The R field may comprise two bits in length (or any other quantity of bits).

Figures 17A, 17B:
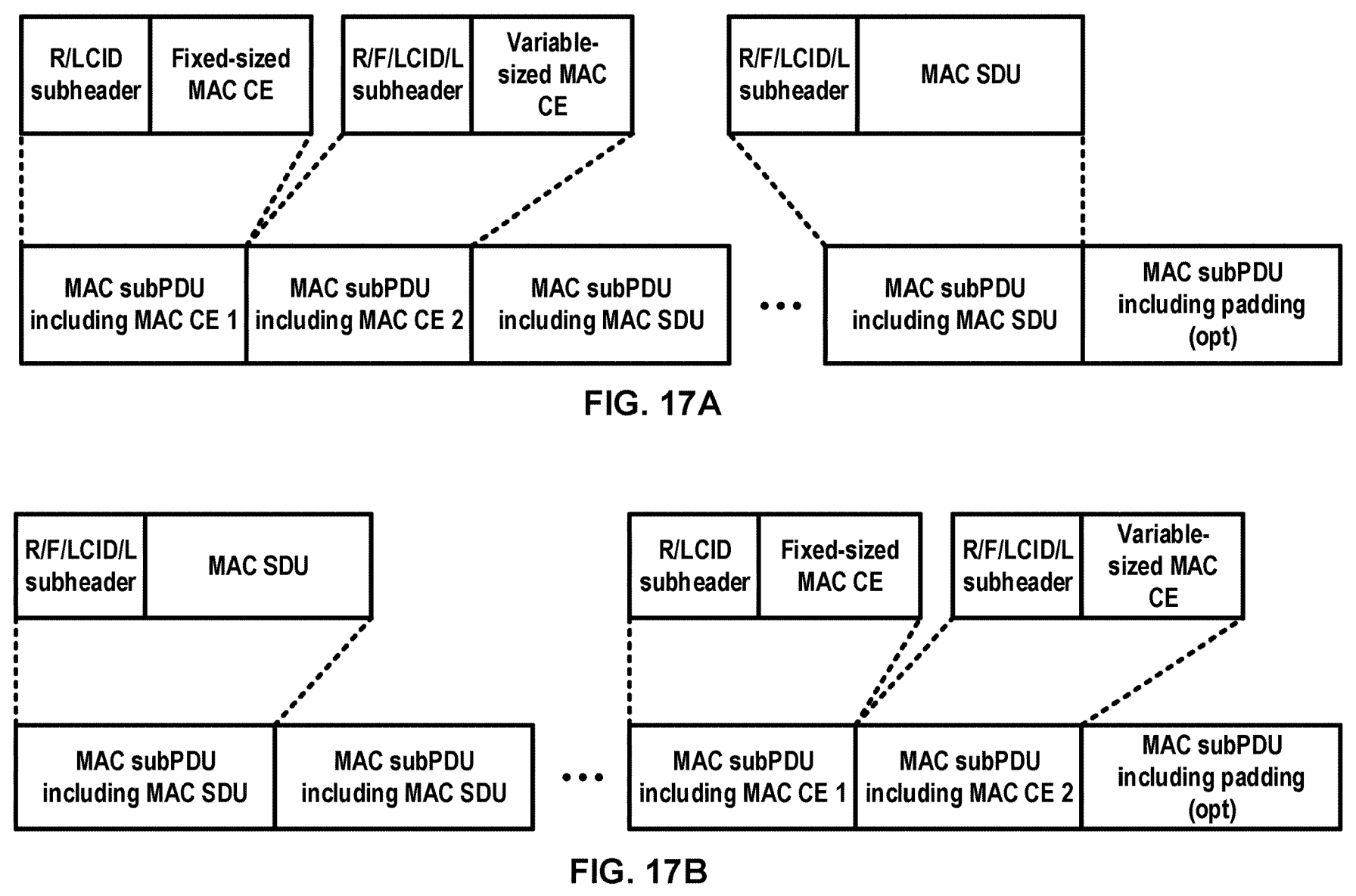

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate that a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate that a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, and/or flush HARQ buffers associated with the activated SCell, for example, after or in response to deactivating the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
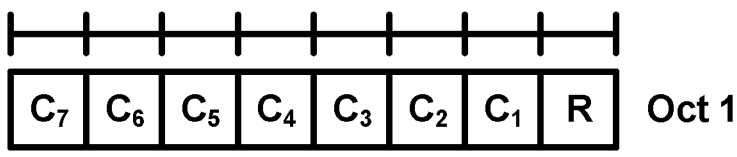
FIG. 20A and FIG. 20B show example secondary cell (SCell) activation/deactivation MAC (CE) formats.

FIG. 20A shows an example of an SCell activation/deactivation MAC CE that may comprise one octet. A first MAC PDU subheader comprising a first LCID (e.g., LCID 111010) may indicate/identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
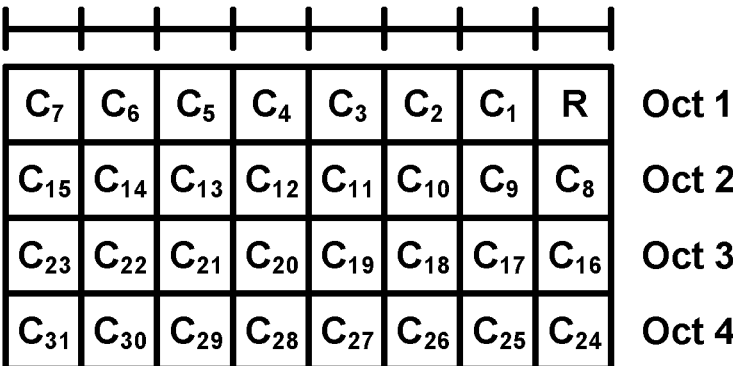

FIG. 20B shows an example of an SCell Activation/Deactivation MAC CE of four octets. A second MAC PDU subheader with a second LCID (e.g., LCID 111001) may indicate/identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) for an SCell, for example, if CA is configured. A power saving mechanism may improve battery performance (e.g., runtimes), reduce power consumption of the wireless device, and/or to improve latency of SCell activation and/or SCell addition. The SCell may be transitioned (e.g., switched and/or adjusted) to a dormant state if the wireless device initiates a power saving state for (e.g., hibernates) the SCell. The wireless device may, for example, if the SCell is transitioned to a dormant state: stop transmitting SRS on the SCell, report CQI/PMI/RI/PTI/CRI for the SCell according to or based on a periodicity configured for the SCell in a dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state.

A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in a dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may transmit a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 21A shows an example of a MAC CE (e.g., the second MAC CE referenced above) comprising a single octet. The second MAC CE may comprise four octets comprising 31 C-fields and one R-field. FIG. 21B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the MAC entity may ignore the $C_i$ field. A wireless device may transition an SCell associated with SCell index i into a dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in a dormant state. The wireless device may ignore the $C_i$ field of the second MAC CE, for example, if the $C_i$ field is set to "0" and the SCell with SCell index i is not in a dormant state.

FIG. 21C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

A base station may activate, hibernate, and/or deactivate at least one of one or more SCells, for example, if the base station is configured with the one or more SCells. A MAC entity of a base station and/or a wireless device may maintain an SCell deactivation timer (e.g., sCellDeactivationTimer), for example, per a configured SCell and/or except for an SCell configured with PUCCH/SPUCCH, if any. The MAC entity of the base station and/or the wireless device may deactivate an associated SCell, for example, if an SCell deactivation timer expires. A MAC entity of a base station and/or a wireless device may maintain dormant SCell deactivation timer (e.g., dormantSCellDeactivationTimer), for example, per a configured SCell and/or except for an SCell configured with PUCCH/SPUCCH, if any. The MAC entity of the base station and/or the wireless device may deactivate an associated SCell, for example, if the dormant SCell deactivation timer expires (e.g., if the SCell is in dormant state).

A base station (e.g., a MAC entity of the base station) and/or a wireless device (e.g., a MAC entity of the wireless device) may, for example, maintain an SCell hibernation timer (e.g., sCellHibernationTimer), for example, per a configured SCell and/or except for an SCell configured with PUCCH/SPUCCH, if any. The base station (e.g., the MAC entity of the base station) and/or the wireless device (e.g., the MAC entity of the wireless device) may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

A wireless device (e.g., MAC entity of a wireless device) may activate an SCell, for example, if the MAC entity is configured with an activated SCell at SCell configuration. A wireless device (e.g., MAC entity of a wireless device) may activate an SCell, for example, if the wireless device receives a MAC CE(s) activating the SCell. The wireless device (e.g., MAC entity of a wireless device) may start or restart an SCell deactivation timer associated with an SCell, for example, based on or in response to activating the SCell. The wireless device (e.g., MAC entity of a wireless device) may start or restart an SCell hibernation timer (e.g., if configured) associated with an SCell, for example, based on or in response to activating the SCell. A wireless device (e.g., MAC entity of a wireless device) may trigger a PHR procedure, for example, based on or in response to activating an SCell.

A wireless device (e.g., a MAC entity of the wireless device) may deactivate the SCell, for example, if the wireless device receives a MAC CE(s) indicating deactivation of an SCell. The wireless device (e.g., the MAC entity may): deactivate the SCell; stop an SCell deactivation timer associated with the SCell; and/or flush all HARQ buffers associated with the SCell, for example, if the wireless device receives a MAC CE(s) indicating deactivation of an SCell. The wireless device (e.g., the MAC entity) may: deactivate the SCell; stop the SCell deactivation timer associated with the SCell; and/or flush all HARQ buffers associated with the SCell, for example, if an SCell deactivation timer associated with an activated SCell expires and an SCell hibernation timer is not configured.

A wireless device (e.g., MAC entity of a wireless device) and/or a base station (e.g., a MAC entity of a base station) may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell. An ongoing random access (RA) procedure on an SCell may be aborted, for example, if, the SCell is deactivated.

A wireless device (e.g., MAC entity of a wireless device) and/or a base station (e.g., a MAC entity of a base station) may (e.g., if configured with an SCell associated with an SCell state set to dormant state upon the SCell configuration, or if receiving MAC CE(s) indicating transitioning the SCell to a dormant state): set (e.g., transition) the SCell to a dormant state, transmit one or more CSI reports for the SCell, stop an SCell deactivation timer associated with the SCell, stop an SCell hibernation timer (if configured) associated with the SCell, start or restart a dormant SCell deactivation timer associated with the SCell, and/or flush all HARQ buffers associated with the SCell. The wireless device (e.g., MAC entity of a wireless device) and/or a base station (e.g., a MAC entity of a base station) may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device (e.g., MAC entity of a wireless device) and/or a base station (e.g., a MAC entity of a base station) may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state.

FIG. 22 shows example DCI formats. The example DCI formats may correspond to an operation such as an FDD operation (e.g., 20 MHz bandwidth, or any other bandwidth). The example DCI formats may correspond to transmissions involving two transmission antennas (or any other number of antennas) at the base station. The example DCI formats may correspond to transmissions utilizing CA or not utilizing no carrier aggregation. The DCI formats may comprise at least one of: DCI format 0_0/0_1 indicating scheduling of PUSCH in a cell; DCI format 1_0/1_1 indicating scheduling of PDSCH in a cell; DCI format 2_0 indicating a slot format (e.g., to a group of wireless devices); DCI format 2_1 indicating PRB(s) and/or OFDM symbol(s) to a group of wireless devices (e.g., in a scenario where a wireless device may assume no transmission is intended for the wireless device); DCI format 2_2 indicating transmission of TPC commands for PUCCH and PUSCH; and/or DCI format 2_3 indicating transmission of a group of TPC commands for SRS transmission by one or more wireless devices. A base station may transmit DCI, via a PDCCH, for scheduling decisions and/or power-control commands. The DCI may comprise at least one of: downlink scheduling assignments, uplink scheduling grants, power-control commands. The downlink scheduling assignments may comprise at least one of: PDSCH resource indication, transport format, HARQ information, control information related to multiple antenna schemes, and/or a command for power control of the PUCCH used for transmission of ACK/NACK (e.g., based on downlink scheduling assignments). The uplink scheduling grants may comprise at least one of: PUSCH resource indication, transport format, and HARQ related information, and/or a power control command of the PUSCH.

The different types of control information correspond to different DCI message sizes. Supporting spatial multiplexing with non-contiguous allocation of RBs (e.g., in the frequency domain) may require a larger scheduling message, for example, in comparison with an uplink grant that allows only contiguous allocation of RBs. The DCI may be categorized into different DCI formats. A DCI format may correspond to a certain message size and may be associated with a particular application/usage.

A wireless device may monitor one or more PDCCH candidates to detect one or more DCI with one or more DCI format. One or more PDCCH transmissions may be transmitted in a common search space or a wireless device-specific search space. A wireless device may monitor PDCCH with only a limited set of DCI formats, for example, to reduce power consumption. A wireless device may not be required to detect DCI, for example, with DCI format 6 (e.g., as used for an eMTC wireless device), and/or any other DCI format. A wireless device with a capability for detection of a higher number of DCI formats may have a higher power consumption.

The one or more PDCCH candidates that a wireless device monitors may be defined in terms of PDCCH wireless device-specific search spaces. A PDCCH wireless device-specific search space at CCE aggregation level L (e.g., $L \in \{1,2,4,8\}$) may be defined by a set of PDCCH candidates for the CCE aggregation level L. A wireless device may be configured (e.g., by one or more higher layer parameters), for a DCI format per serving cell, a number of PDCCH candidates per CCE aggregation level L.

A wireless device may monitor one or more PDCCH candidate in control resource set q based on a periodicity of symbols (e.g., $W_{PDCCH,q}$ symbols) for control resource set q.

The periodicity of the symbols for the control resource set q may be configured, for example, by one or more higher layer parameters)

Information in the DCI formats used for downlink scheduling may be organized into different groups. Fields present in DCIs corresponding to different DCI formats may be different. The fields may comprise, for example, at least one of: resource information (e.g., comprising carrier indicator (e.g., 0 or 3 bits, or any other quantity of bits) and/or RB allocation); HARQ process number; MCS, new data indicator (NDI), and redundancy version (RV) (e.g., for a first TB); MCS, NDI and RV (e.g., for a second TB); MIMO related information; PDSCH resource-element mapping and QCI; downlink assignment index (DAI); TPC for PUCCH; SRS request (e.g., 1 bit, or any other quantity of bits), an indicator for triggering one-shot SRS transmission; ACK/NACK offset; DCI format 0/1A indication (e.g., used to differentiate between DCI format 1A and DCI format 0); and padding (e.g., if necessary). The MIMO related information may comprise, for example, at least one of: PMI, precoding information, transport block swap flag, power offset between PDSCH and reference signal, reference-signal scrambling sequence, number/quantity of layers, and/or antenna ports for transmission.

Information in the DCI formats used for uplink scheduling may be organized into different groups. Field present in DCIs corresponding to different DCI formats may be different. The fields may comprise, for example, at least one of: resource information (e.g., comprising carrier indicator, resource allocation type, and/or RB allocation); MCS, NDI (for a first TB); MCS, NDI (for a second TB); phase rotation of an uplink DMRS; precoding information; CSI request, an indicator requesting an aperiodic CSI report; SRS request (e.g., 2 bits, or any other quantity of bits) to trigger aperiodic SRS transmission (e.g., using one of up to three preconfigured settings); uplink index/DAI; TPC for PUSCH; DCI format 0/1A indication; and padding (e.g., if necessary).

A base station may perform cyclic redundancy check (CRC) scrambling for DCI, for example, before transmitting the DCI via a PDCCH. The base station may perform CRC scrambling, for example, by bit-wise addition (or Modulo-2 addition, exclusive OR (XOR) operation, or any other method) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, MCS-C-RNTI, and/or any other identifier) with the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may transmit one or more PDCCH in different control resource sets, for example, to support wide bandwidth operation. A base station may transmit one or more RRC message comprising configuration parameters of one or more control resource sets. At least one of the one or more control resource sets may comprise, for example, at least one of: a first OFDM symbol; a number/quantity of consecutive OFDM symbols; a set of resource blocks; a CCE-to-REG mapping; and/or a REG bundle size (e.g., for interleaved CCE-to-REG mapping).

A base station may configure a wireless device with BWPs (e.g., UL BWPs and/or DL BWPs) to enable BA on a PCell. The base station may configure the wireless device with at least DL BWP(s) (e.g., there may be no UL BWPs in the UL) to enable BA on an SCell (e.g., if CA is configured). An initial active BWP may be a first BWP used for initial access, for example, for the PCell. A first active BWP may be a second BWP configured for the wireless device to operate on the SCell (e.g., upon the SCell being activated). A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on DCI, a BWP inactivity timer, and/or any trigger. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and/or one DL BWP may be active at a time in an active serving cell, for example, for FDD systems that may be configured with BA. One DL/UL BWP pair may be active at a time in an active serving cell, for example, for TDD systems. Operating on the one UL BWP and/or the one DL BWP (or the one DL/UL BWP pair) may improve wireless device battery consumption. BWPs other than the one active UL BWP and/or the one active DL BWP that the wireless device may work on may be deactivated. On or for deactivated BWPs, the wireless device may not monitor PDCCH and/or may not transmit on a PUCCH, PRACH, and/or UL-SCH.

A serving cell may be configured with any quantity of BWPs (e.g., up to four, or up to any other quantity of BWPs). There may be, for example, one or any other quantity of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a base station (e.g., a MAC entity of a base station), a wireless device (e.g., a MAC entity of a wireless device), and/or a MAC entity, based on or in response to initiating an RA procedure. One or more BWPs may be initially active, without receiving a PDCCH indicating a downlink assignment or an uplink grant, for example, if an SpCell is added and/or if an SCell is activated. The active BWP for a serving cell may be indicated by RRC message and/or PDCCH. A DL BWP may be paired with an UL BWP. BWP switching may be common for both UL and DL, for example, for unpaired spectrum.

Figure 23:
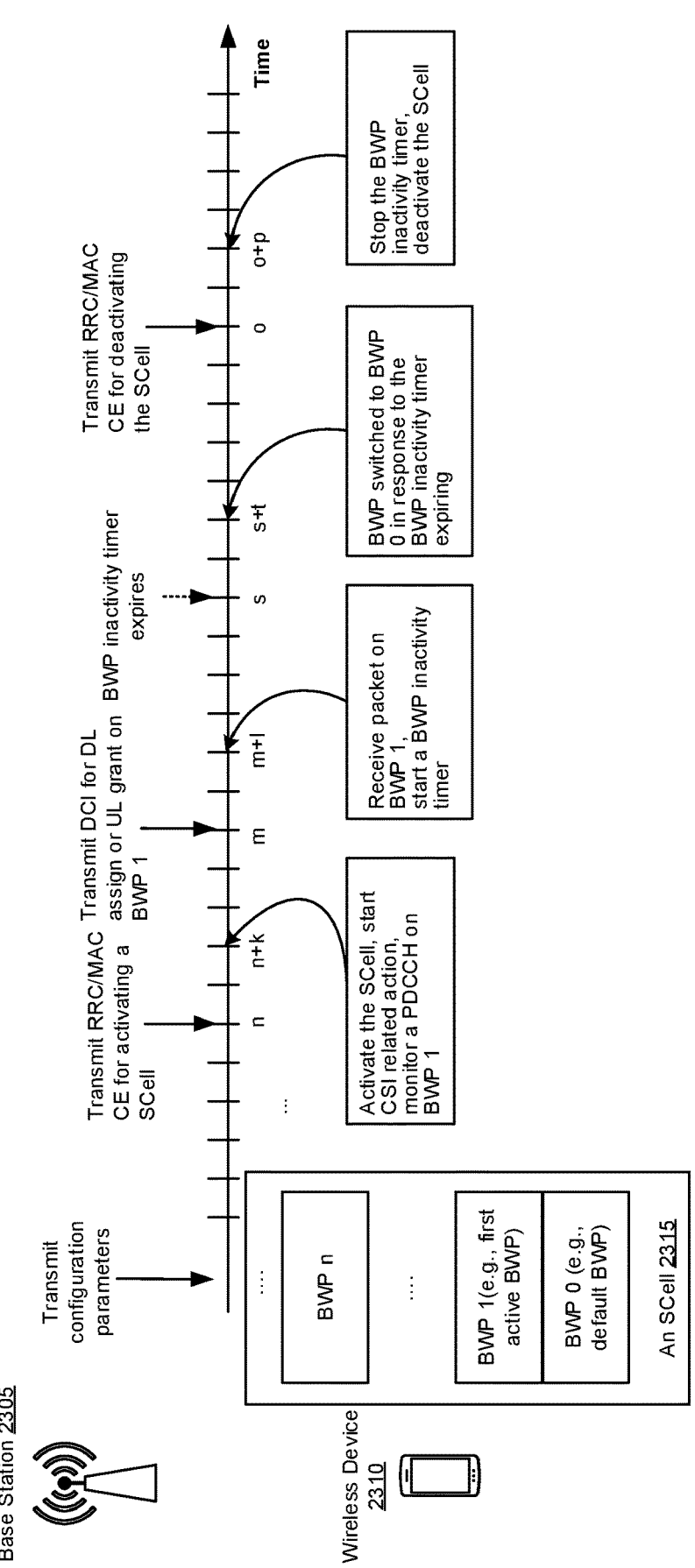
FIG. 23 shows an example of BWP management on an SCell.

FIG. 23 shows an example of BWP switching for an SCell. A base station 2305 may send (e.g., transmit) one or more messages, to a wireless device 2310. The one or more messages may be for configuring BWPs corresponding to the SCell 2315. The one or more messages may comprise, for example, one or more RRC messages (e.g., RRC connection reconfiguration message, and/or RRC connection reestablishment message, and/or RRC connection setup message). The configured BWPs may comprise BWP 0, BWP 1, . . . BWP n. The BWP 0 may be configured as a default BWP. The BWP 1 may be configured as a first active BWP. At time n, the base station 2305 may send (e.g., transmit) an RRC message and/or a MAC CE for activating the SCell. At or after time n+k, and based on the reception of the RRC message and/or the MAC CE, the wireless device 2310 may activate the SCell and start monitoring a PDCCH on the BWP 1 (e.g., the first active BWP). At or after time m, the base station 2305 may send (e.g., transmit) DCI for DL assignment or UL grant on the BWP 1. At or after time m+l, the wireless device 2310 may receive a packet on the BWP 1 and may start a BWP inactivity timer (e.g., bwp-InactivityTimer). At time s, the BWP inactivity timer may expire. At or after time s+t, a BWP may switch to BWP 0 based on expiration of the BWP inactivity timer. BWP switching may comprise, for example, activating the BWP 0 and deactivating the BWP 1. At time o, the base station 2305 may send (e.g., transmit) an RRC message and/or a MAC CE for deactivating an SCell. At or after time o+p, the wireless device 2310 may stop the BWP inactivity timer and deactivate the SCell 2315.

A wireless device may receive RRC message comprising parameters of a SCell and one or more BWP configuration associated with the SCell. The RRC message may comprise: RRC connection reconfiguration message (e.g., RRCRecon-figuration); RRC connection reestablishment message (e.g., RRCRestablishment); and/or RRC connection setup mes-sage (e.g., RRCSetup). Among the one or more BWPs, at least one BWP may be configured as the first active BWP (e.g., BWP 1 in FIG. 23), one BWP as the default BWP (e.g., BWP 0 in FIG. 23). The wireless device may receive a MAC CE to activate the SCell at $n^{th}$ slot. The wireless device may start a SCell deactivation timer (e.g., sCellDeactivation-Timer), and start CSI related actions for the SCell, and/or start CSI related actions for the first active BWP of the SCell. The wireless device may start monitoring a PDCCH on BWP 1 in response to activating the SCell.

The wireless device may start restart a BWP inactivity timer (e.g., bwp-InactivityTimer) at $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the SCell and/or stop the BWP inactivity timer when the SCell deactivation timer expires.

Using the BWP inactivity timer may reduce a wireless device's power consumption, for example, if the wireless device is configured with multiple cells with each cell having wide bandwidth (e.g., 1 GHz bandwidth, etc.). The wireless device may only transmit on or receive from a narrow-bandwidth BWP (e.g., 5 MHz) on the PCell or SCell if there is no activity on an active BWP.

A MAC entity may perform operations, on an active BWP for an activated serving cell (e.g., configured with a BWP), comprising: transmitting on an UL-SCH; transmitting on a RACH, monitoring a PDCCH, transmitting on a PUCCH, receiving DL-SCH, and/or (re-) initializing any suspended configured uplink grants of configured grant Type 1 accord-ing to a stored configuration, if any. On an inactive BWP for each activated serving cell configured with a BWP, a MAC entity may, for example: not transmit on an UL-SCH, not transmit on a RACH, not monitor a PDCCH, not transmit on a PUCCH, not transmit an SRS, not receive a DL-SCH transmission, clear configured downlink assignment(s) and/ or configured uplink grant(s) of configured grant Type 2, and/or suspend configured uplink grant(s) of configured Type 1. A wireless device may perform the BWP switching to a BWP indicated by the PDCCH, for example, if the wireless device (e.g., a MAC entity of the wireless device) receives a PDCCH for a BWP switching of a serving cell and a RA procedure associated with this serving cell is not ongoing.

A bandwidth part indicator field value may indicate an active DL BWP, from a configured DL BWP set, for DL receptions for example, if the bandwidth part indicator field is configured in DCI format 1_1. A bandwidth part indicator field value, may indicate an active UL BWP, from a con-figured UL BWP set, for UL transmissions, for example, if the bandwidth part indicator field is configured in DCI format 0_1.

A wireless device may be provided by a higher layer parameter a timer value corresponding to a BWP inactivity timer for the PCell (e.g., bwp-InactivityTimer). The wireless device may increment the timer, if running, for example, every interval of 1 millisecond (or any other first duration) for frequency range 1 (or any other first frequency range) or every 0.5 milliseconds (or any other second duration) for frequency range 2 (or any other second frequency range), for example, if: the wireless device does not detect DCI format 1_1 for paired spectrum operation, or the wireless device does not detect DCI format 1_1 or DCI format 0_1 for unpaired spectrum operation, in the interval.

Wireless device procedures on an SCell may be similar to or the same as procedures on a PCell, for example, if the wireless device is configured for the SCell with a higher layer parameter indicating a default DL BWP among con-figured DL BWPs (e.g., Default-DL-BWP), and/or if the wireless device is configured with a higher layer parameter indicating a timer value (e.g., bwp-InactivityTimer). The wireless device procedures on the SCell may use the timer value for the SCell and the default DL BWP for the SCell. The wireless device may use, as first active DL BWP and first active UL BWP on the SCell or secondary cell, an indicated DL BWP and an indicated UL BWP on the SCell, respectively, if a wireless device is configured, for example, by a higher layer parameter for the DL BWP (e.g., active-BWP-DL-SCell), and/or by a higher layer parameter for the UL BWP on the SCell or secondary cell (e.g., active-BWP-UL-SCell).

A wireless device may transmit uplink control informa-tion (UCI) via one or more PUCCH resources to a base station. The wireless device may transmit the one or more UCI, for example, as part of a DRX operation. The one or more UCI may comprise at least one of: HARQ-ACK information; scheduling request (SR); and/or CSI report. A PUCCH resource may be identified by at least: frequency location (e.g., starting PRB); and/or a PUCCH format asso-ciated with initial cyclic shift of a base sequence and time domain location (e.g., starting symbol index). A PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH formats 1, 2, 3, and/or 4 may comprise any other quantity of OFDM symbols and/or any other quantity of bits. The PUCCH resource may be configured on a PCell, or a PUCCH secondary cell.

A base station may transmit to a wireless device (e.g., if the wireless device is configured with multiple uplink BWPs), one or more RRC messages comprising configura-tion parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

A wireless device may select (e.g., if the wireless device is configured with multiple uplink BWPs) one of the one or more PUCCH resource sets based on a total bit length of UCI information bits (e.g., HARQ-ARQ bits, SR, and/or CSI) the wireless device will transmit. The wireless device may select a first PUCCH resource set (e.g., with the PUCCH resource set index equal to 0, or any other PUCCH resource set index), for example, if the total bit length of UCI information bits is less than or equal to 2 bits (or any other quantity of bits). The wireless device may select a second PUCCH resource set (e.g., with a PUCCH resource set index equal to 1), for example, if the total bit length of UCI information bits is greater than 2 (or any other quantity of bits) and less than or equal to a first configured value. The wireless device may select a third PUCCH resource set (e.g., with a PUCCH resource set index equal to 2), for example, if the total bit length of UCI information bits is greater than the first configured value and less than or equal to a second configured value. The wireless device may select a fourth PUCCH resource set (e.g., with a PUCCH resource set index equal to 3), for example, if the total bit length of UCI information bits is greater than the second configured value and less than or equal to a third value.

A wireless device may determine, for example, based on a quantity of uplink symbols of UCI transmission and a quantity of UCI bits, a PUCCH format from a plurality of PUCCH formats comprising PUCCH format 0, PUCCH format 1, PUCCH format 2, PUCCH format 3 and/or PUCCH format 4. The wireless device may transmit UCI in a PUCCH using PUCCH format 0, for example, if the transmission is during, greater than, or over 1 symbol or 2 symbols and/or the quantity of HARQ-ACK information bits with positive or negative SR (HARQ-ACK/SR bits) is 1 or 2. The wireless device may transmit UCI in a PUCCH using PUCCH format 1, for example, if the transmission is during, greater than, or over 4 or more symbols and the number of HARQ-ACK/SR bits is 1 or 2. The wireless device may transmit UCI in a PUCCH using PUCCH format 2, for example, if the transmission is during, greater than, or over 1 symbol or 2 symbols and the number of UCI bits is more than 2. The wireless device may transmit UCI in a PUCCH using PUCCH format 3, for example, if the transmission is during, greater than, or over 4 or more symbols, the quantity of UCI bits is more than 2 and a PUCCH resource does not include an orthogonal cover code. The wireless device may transmit UCI in a PUCCH using PUCCH format 4, for example, if the transmission is during, greater than, or over 4 or more symbols, the quantity of UCI bits is more than 2 and the PUCCH resource includes an orthogonal cover code.

A wireless device may determine a PUCCH resource from a PUCCH resource set, for example, to transmit HARQ-ACK information on the PUCCH resource. The PUCCH resource set may be determined as described herein. The wireless device may determine the PUCCH resource based on a PUCCH resource indicator field in a DCI (e.g., with a DCI format 1_0 or DCI for 1_1) received on a PDCCH. A PUCCH resource indicator field in the DCI may indicate one of eight PUCCH resources in the PUCCH resource set. The wireless device may transmit the HARQ-ACK information in a PUCCH resource indicated by the PUCCH resource indicator field in the DCI. The PUCCH resource indicator field may be 3-bits (e.g., or any other quantity of bits) in length.

The wireless device may transmit one or more UCI bits via a PUCCH resource of an active uplink BWP of a PCell or a PUCCH secondary cell. The PUCCH resource indicated in the DCI may be a PUCCH resource on the active uplink BWP of the cell, for example, if at most one active UL BWP in a cell is supported for a wireless device.

A wireless device may receive an uplink grant dynamically on a PDCCH or in a random-access response (RAR). The wireless device may receive an uplink grant configured semi-persistently by an RRC message. The wireless device may transmit, via the uplink grant, an uplink TB on a UL-SCH. A layer (e.g., medium access control (MAC) layer) of the wireless device may receive HARQ information from lower layers (e.g., physical layer) of the wireless device, for example, for transmission of the uplink TB. The HARQ information may comprise at least one of: HARQ process indicator/identifier (ID); new data indicator (NDI); redundancy version (RV); and/or transport block size (TBS).

A wireless device (e.g., a MAC entity of the wireless device) may be associated with a C-RNTI, a Temporary C-RNTI (TC-RNTI), or a configured scheduling RNTI (CS-RNTI). A wireless device may receive an uplink grant for a serving cell on a PDCCH for the MAC entity's C-RNTI or TC-RNTI. The MAC entity may deliver the uplink grant and one or more associated HARQ information to the HARQ entity, for example, for each PDCCH occasion and for each serving cell belonging to a time alignment group (TAG) that has a running timer (e.g., timeAlignmentTimer) and for each uplink grant received for a PDCCH occasion.

A wireless device (e.g., a MAC entity of the wireless device) may comprise a HARQ entity for each serving cell with configured uplink. The wireless device may be configured with a supplementary uplink. The HARQ entity may maintain a quantity of parallel HARQ processes. Each HARQ process of the quantity of parallel HARQ processes may support one TB, and the HARQ process may be associated with a HARQ process indicator/identifier (ID). A HARQ process indicator/identifier (e.g., identifier 0) may correspond to uplink transmission with uplink grant in an RAR process.

A PUSCH aggregation factor parameter (e.g., pusch-AggregationFactor) may provide a quantity of transmissions of a TB within a bundle of a dynamic grant. A wireless device (e.g., a MAC entity of the wireless device) may be configured with PUSCH repetition (e.g., pusch-AggregationFactor>1). (pusch-AggregationFactor−1) HARQ retransmissions may follow within a bundle, for example, based on/after an initial transmission. A parameter (e.g., repK) may provide a quantity of transmissions of a TB within a bundle of a configured uplink grant. A wireless device (e.g., a MAC entity of the wireless device) may be configured with a value of repK that is greater than 1. HARQ retransmissions may follow within a bundle, for example, based on/after the initial transmission. Bundling operation may rely on the HARQ entity for both dynamic grant and configured uplink grant. The bundling operation may rely on the HARQ entity for invoking the same HARQ process for each transmission that is part of the same bundle. HARQ retransmissions may be triggered within a bundle, for example, with or without waiting for feedback from previous transmission according to the PUSCH aggregation factor (e.g., for the dynamic grant) and/or the repK parameter (e.g., for the configured uplink grant). Each transmission within a bundle may be a separate uplink grant, for example, after the initial uplink grant within a bundle is delivered to the HARQ entity.

A sequence of redundancy versions, for each transmission within a bundle of a dynamic grant, may be determined based on one or more fields of a DCI carrying the dynamic grant. A sequence of redundancy versions, for each transmission within a bundle of a configured uplink grant, may be determined based on one or more configuration parameters in an RRC message.

A HARQ entity of a wireless device may indicate (e.g., identify) a HARQ process associated with an uplink grant. The HARQ entity may obtain, from a multiplexing and assembly entity, a MAC PDU to transmit, for example, if the received uplink grant is not addressed to a TC-RNTI on PDCCH, and an NDI provided in the associated HARQ information has been toggled compared to an NDI value in the previous transmission of the TB of the HARQ process. The HARQ entity may deliver the MAC PDU, the uplink grant, and the HARQ information of the TB to the indicated/identified HARQ process and instruct the identified HARQ process to trigger a new transmission, for example, based on obtaining the MAC PDU. The HARQ entity may deliver the uplink grant and the HARQ information (e.g., redundancy version) of the TB to the indicated/identified HARQ process, and instruct the indicated/identified HARQ process to trigger a retransmission, for example, if the received uplink grant is addressed to a TC-RNTI on PDCCH, or the NDI provided in the associated HARQ information has not been toggled compared to the NDI value in the previous transmission of the TB of the HARQ process.

A HARQ process may be associated with a HARQ buffer. A wireless device may perform a new transmission on a resource and with an MCS indicated on either a PDCCH, an RAR, or an RRC message. The wireless device may perform a retransmission on a resource and with an MCS (if provided) as indicated on PDCCH. The wireless device may perform a retransmission on a same resource and with a same MCS as was used for a last transmission attempt within a bundle.

The HARQ process may store the MAC PDU in the associated HARQ buffer, store the uplink grant received from the HARQ entity, and/or generate a transmission for a TB, for example, if the HARQ entity requests a new transmission of the TB. The HARQ process may store the uplink grant received from the HARQ entity and generate a transmission for a TB, for example, if the HARQ entity requests a retransmission for the TB. The HARQ process may instruct the physical layer to generate a transmission for a TB according to the stored uplink grant, for example, if the MAC PDU was obtained from a Msg3 buffer or if there is no measurement gap at the time of the transmission. The HARQ process may instruct the physical layer to generate a retransmission for a TB according to the stored uplink grant, for example, if the retransmission does not collide with a transmission for the MAC PDU obtained from the Msg3 buffer.

Figure 24:
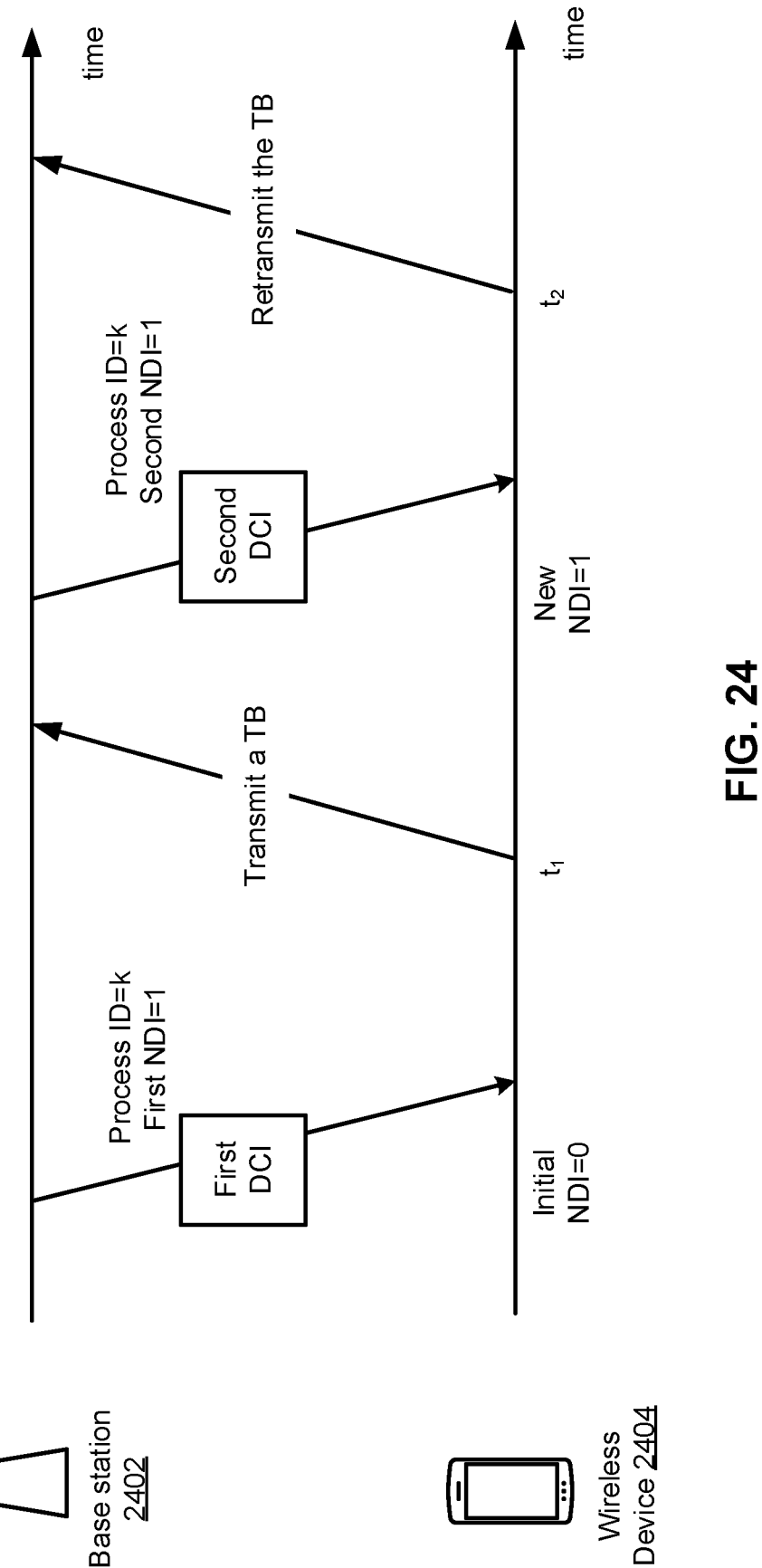
FIG. 24 shows an example a hybrid automatic repeat request (HARQ) procedure.

FIG. 24 shows an example of an uplink TB retransmission mechanism based on a HARQ procedure. A base station 2402 may send (e.g., transmit), to a wireless device 2404, first DCI comprising an uplink grant and HARQ information. The HARQ information may comprise a HARQ process indicator/identifier (ID) (e.g., process ID=k) and a first NDI value (e.g., 1).

The wireless device 2404 may store an NDI value (e.g., in a memory associated with the wireless device). The NDI value may be associated with a HARQ process identified by a HARQ process ID. The wireless device 2404 may have (e.g., store) an initial NDI value (e.g., 0), for example, before receiving the first DCI. The wireless device 2404 may receive the first DCI. The wireless device 2404 may determine that the first NDI value (e.g., 1) is different from the initial NDI value (e.g., 0). The wireless device 2404 may determine that the first NDI value is toggled with respect to the initial NDI value. The wireless device 2404 (e.g., a HARQ entity of the wireless device 2404) may determine/obtain a MAC PDU (e.g., from a multiplexing and assembly entity of the wireless device 2404), for example, based on the first NDI value being different from the initial NDI value. The HARQ entity may deliver the MAC PDU, the uplink grant, and the HARQ information to a HARQ process indicated/identified by the HARQ process ID (e.g., process ID=k). The HARQ entity may instruct the HARQ process to trigger a new transmission for a TB that comprises the MAC PDU. The HARQ process may store the MAC PDU in an associated HARQ buffer and store the uplink grant. The HARQ process may instruct the wireless device 2404 (e.g., a physical layer of the wireless device 2404) to generate a new transmission for the TB, for example, based on the stored uplink grant. At or after time $t_1$, the wireless device 2404 may send (e.g., transmit) the TB based on the stored uplink grant. The wireless device 2404 may set the first NDI value (e.g., 1) as a new NDI value, for example, based on the transmission of the TB.

The base station 2402 may provide a subsequent uplink grant, to the wireless device 2404, for a retransmission of the TB. The base station 2402 may provide the subsequent uplink grant, for example, if the base station 2402 does not successfully receive the TB transmitted by the wireless device 2404. The base station 2402 may transmit a second DCI indicating the retransmission of the TB. The second DCI may comprise a same HARQ process ID as the first HARQ process ID, a second uplink grant, a RV value, and a second NDI value (e.g., 1). The wireless device 2404 may determine the second NDI value is equal to/same as the first NDI value/the new NDI value. The wireless device 2404 may determine that the second NDI value is not toggled with respect to the new NDI value/the first NDI value. The HARQ entity may deliver, to the HARQ process, the second uplink grant and the RV value. The HARQ entity may instruct the HARQ process to trigger a retransmission of the TB, for example, based on the second NDI value being equal to the new NDI value. The HARQ process may store the second uplink grant. The HARQ process may instruct the wireless device 2404 (e.g., the physical layer of the wireless device 2404) to generate a retransmission for the TB according to the second uplink grant. At or after time $t_2$, the wireless device 2404 may resend (e.g., retransmit) the TB based on the second uplink grant.

Figure 25:
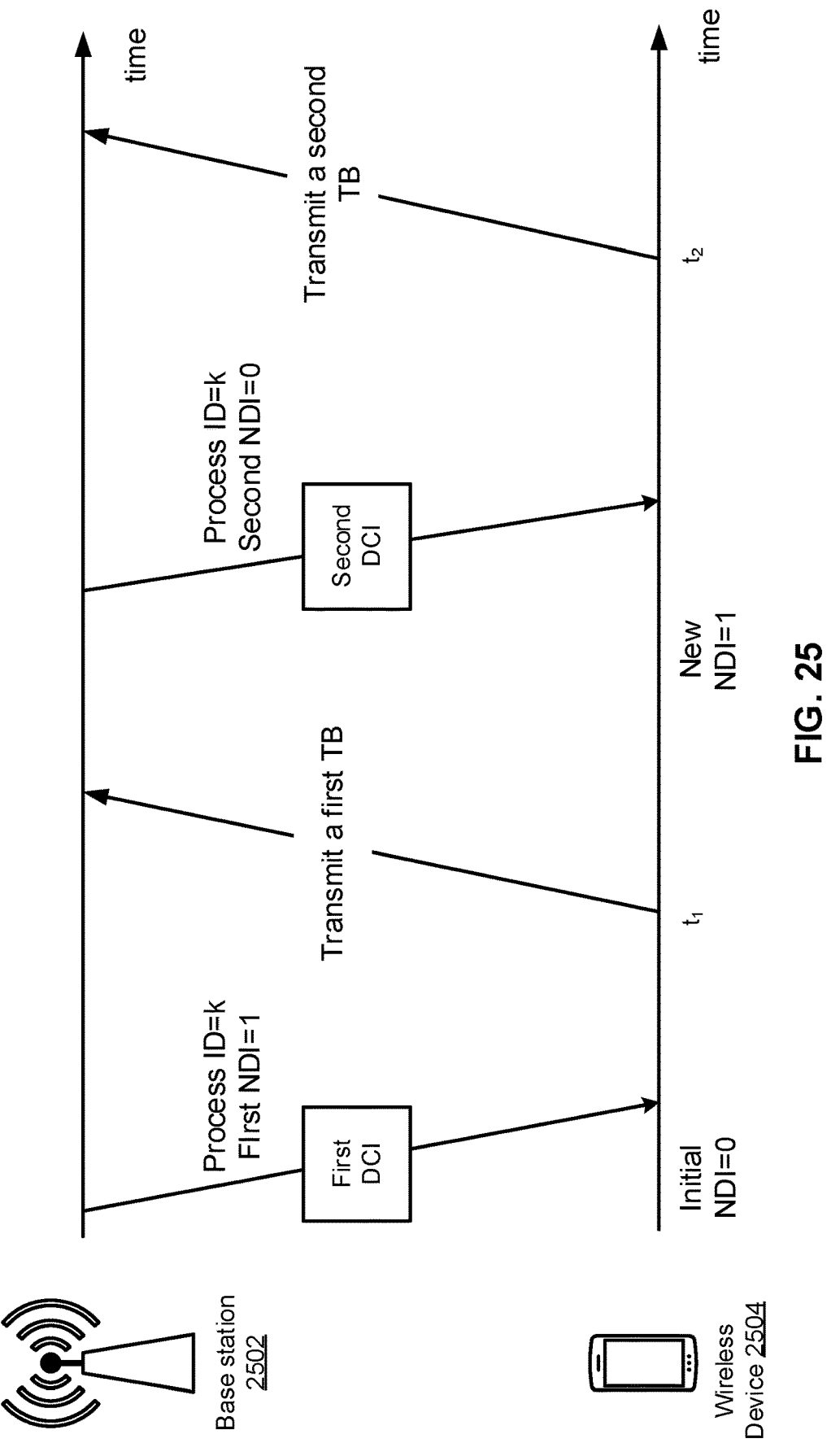
FIG. 25 shows an example a HARQ procedure.

FIG. 25 shows an example of an uplink TB transmission mechanism based on HARQ procedure. A base station 2502 may transmit to a wireless device 2504, first DCI (e.g., comprising an uplink grant) and HARQ information. The HARQ information may comprise a HARQ process indicator/ID (e.g., process ID=k) and a first NDI value (e.g., 1).

The wireless device 2504 may store an NDI value (e.g., in a memory associated with the wireless device). The NDI value may be associated with a HARQ process identified by the HARQ process ID. The wireless device 2504 may have an initial NDI value (e.g., 0), for example, prior to receiving the first DCI. The wireless device 2504 may receive the first DCI. The wireless device 2504 may determine that the first NDI has (e.g., 1) is different from the initial NDI value (e.g., 0). The wireless device 2504 may determine that the first NDI value is toggled with respect to the initial NDI value. The wireless device 2504 (e.g., a HARQ entity of the wireless device 2504) may obtain a MAC PDU (e.g., from a multiplexing and assembly entity of the wireless device), for example, based on the first NDI value being different from the initial NDI value. The HARQ entity may deliver the MAC PDU, the uplink grant and the HARQ information to a HARQ process identified by the HARQ process ID (e.g., process ID=k25). The HARQ entity may instruct the HARQ process to trigger a new transmission for a first TB comprising the MAC PDU. The HARQ process may store the MAC PDU in an associated HARQ buffer and store the uplink grant. The HARQ process may instruct the wireless device 2504 (e.g., a physical layer of the wireless device 2504) to generate a new transmission for the first TB, for example, based on the stored uplink grant. At or after time $t_1$, the wireless device 2504 (e.g., the physical layer of the wireless device 2504) may transmit the first TB based on the stored uplink grant. The wireless device may set the first NDI value (e.g., 1) as a new NDI value, for example, based on transmission of the first TB.

The base station 2502 may provide a subsequent uplink grant, to the wireless device 2504, for transmitting a second TB. The base station 2502 may provide the subsequent uplink grant, for example, after the base station 2502 successfully receives the first TB. The base station 2502 may transmit a second DCI indicating the new transmission. The second DCI may comprise a same HARQ process ID as the first HARQ process ID, a second uplink grant, a RV value, and a second NDI value (e.g., 0). The wireless device 2504 may determine that the second NDI value is different from the first NDI value (e.g., 1)/the new NDI value. The wireless device 2504 may determine that the second NDI value is toggled with respect to the new NDI value. A HARQ entity of the wireless device 2504 may determine/obtain a second MAC PDU (e.g., from the multiplexing and assembly entity), for example, based on the second NDI value being different from (e.g., toggled with respect to) first NDI value/new NDI value. The HARQ entity may deliver the second MAC PDU, the second uplink grant, and second HARQ information to the HARQ process (e.g., identified by process ID=k). The HARQ entity may instruct the HARQ process to trigger a new transmission for the second TB (e.g., comprising the second MAC PDU). The HARQ process may store the second MAC PDU in an associated HARQ buffer and store the second uplink grant. The HARQ process may instruct the wireless device 2504 (e.g., the physical layer of the wireless device 2504) to generate a new transmission for the second TB according to the second uplink grant. At or after time $t_2$, the wireless device 2504 may transmit the second TB according to the second uplink grant.

A wireless device may transmit a PUSCH transmission. The wireless device may transmit the PUSCH transmission on/via/using an active UL BWP b of a carrier f of a serving cell c, using parameter set configuration with index j, and/or using a PUSCH power control adjustment state with index l. The wireless device may determine a PUSCH transmission power, $P_{PUSCH,b,f,c}(i,j,q_d,l)$, in a PUSCH transmission occasion i as:

Equation (1)

$$P_{PUSCH,b,f,c}(i, j, q_d, l) =$$

$$\min\left\{\begin{array}{l} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\} dBm$$

$P_{CMAX,f,c}(i)$ may be a configured wireless device transmit power for carrier f of serving cell c in the PUSCH transmission occasion i. $P_{O\_PUSCH,b,f,c}(j)$ may be a parameter that is a sum of a component $P_{O\_NOMINAL\_PUSCH,f,c}(j)$ and a component $P_{O\_UE\_PUSCH,b,f,c}(j)$, where $j \in \{0, 1, \ldots, J-1\}$.

j may be equal to 0, $P_{O\_UE\_PUSCH,b,f,c}(0)$ may be equal to 0, and/or $P_{O\_NOMINAL\_PUSCH,f,c}(0)$ may be equal to $P_{O\_PRE} + \Delta_{PREAMBLE\_Msg3}$, for carrier f of serving cell c, for example, if the wireless device is not configured with parameter P0-PUSCH-AlphaSet, and/or for a PUSCH transmission that is scheduled by an RA response (RAR) UL grant. Parameters preambleReceivedTargetPower (for $P_{O\_PRE}$) and msg3-DeltaPreamble (for $\Delta_{PREAMBLE\_Msg3}$) may be configured by higher layers, or $\Delta_{PREAMBLE\_Msg3}$ may be equal to 0 dB, for example, if parameter msg3-DeltaPreamble is not provided.

j may be equal to 1 and $P_{O\_NOMINAL\_PUSCH,f,c}(1)$, for carrier f of serving cell c, may be configured by parameter p0-NominalWithoutGrant, for example, for a PUSCH (re) transmission that is configured by parameter ConfiguredGrantConfig. $P_{O\_NOMINAL\_PUSCH,f,c}(1)$, for carrier f of serving cell c, may be equal to $P_{O\_NOMINAL\_PUSCH,f,c}(0)$, for example, if p0-NominalWithoutGrant is not provided for a PUSCH (re)transmission that is configured by parameter ConfiguredGrantConfig. $P_{O\_UE\_PUSCH,b,f,c}(1)$, for active UL BWP b of carrier f of serving cell c, may be provided by parameter p0 in P0-PUSCH-AlphaSet. Parameter ConfiguredGrantConfig may comprise p0-PUSCH-Alpha that provides an indicator/index P0-PUSCH-AlphaSetId to the P0-PUSCH-AlphaSet.

For $j \in \{2, \ldots, J-1\}=S_j$, for each carrier f of serving cell c, a $P_{O\_NOMINAL\_PUSCH,f,c}(j)$ value, applicable for all $j \in S_j$, may be configured by parameter p0-NominalWithGrant. $P_{O\_NOMINAL\_PUSCH,f,c}(j)$, for each carrier f of serving cell c, may be equal to $P_{O\_NOMINAL\_PUSCH,f,c}(0)$, for example, if p0-NominalWithGrant is not provided. A set of $P_{O\_UE\_PUSCH,b,f,c}(j)$ values may be configured by a set of parameters p0 in P0-PUSCH-AlphaSet (e.g., indicated by a respective set of p0-PUSCH-AlphaSetId) for active UL BWP b of carrier f of serving cell c. $\alpha_{b,f,c}(0)$ may be a value of msg3-Alpha, for example, if configured; otherwise, $\alpha_{b,f,c}(0)$ may be equal to 1. $\alpha_{b,f,c}(1)$ may be configured by parameter alpha as determined from p0-PUSCH-Alpha in ConfiguredGrantConfig. A set of $\alpha_{b,f,c}(j)$ values may be configured by a set of parameters alpha in P0-PUSCH-AlphaSet for $j \in S_j$.

$$M_{RB,b,f,c}^{PUSCH}(i)$$

may be a bandwidth of the PUSCH resource assignment and $\mu$ may be an indication of an SCS configuration. $PL_{b,f,c}(q_d)$ may be a downlink pathloss estimate (e.g., in dB) determined/calculated by the wireless device using a RS with RS index $q_d$ for the active DL BWP of serving cell c. $PL_{f,c}(q_d)$ may be equal to (referenceSignalPower−higher layer filtered RSRP), where referenceSignalPower may be provided by higher layers.

$\Delta_{TF,b,f,c}(i)$ may be determined as:

$$\Delta_{TF,b,f,c}(i) = 10\log_{10}\left(\left(2^{BPRE \cdot K_S} - 1\right) \cdot \beta_{offset}^{PUSCH}\right) \text{ for } K_S = 1.25, \quad \text{Equation (2)}$$

$$\text{or } \Delta_{TF,b,f,c}(i) = 0 \text{ for } K_S = 0$$

where $K_S$ may be configured by parameter deltaMCS. $\Delta_{TF,b,f,c}(i)$ may be equal to 0, for example, if the PUSCH transmission is over more than one layer. BPRE may be equal to $$\sum_{r=0}^{C-1} K_r / N_{RE}$$

for a PUSCH with UL-SCH data. BPRE may be equal to $$Q_m \cdot R / \beta_{offset}^{PUSCH}$$

for a CSI transmission in a PUSCH without UL-SCH data, where c is a quantity/number of transmitted code blocks, $K_r$ is a size for code block r. $N_{RE}$ may be a quantity/number of resource elements and may be determined as:

$$N_{RE} = M_{RB,b,f,c}^{PUSCH}(i) \cdot \sum_{j=0}^{N_{symb,b,f,c}^{PUSCH}(i)-1} N_{sc,data}^{RB}(i, j) \qquad \text{Equation (3)}$$

where $$N_{symb,b,f,c}^{PUSCH}(i)$$

may be a quantity/number of symbols for a PUSCH transmission occasion i, $$N_{sc,data}^{RB}(i, j)$$

may be a quantity/number of subcarriers (e.g., excluding DM-RS subcarriers and phase-tracking RS samples) in PUSCH symbol j, where $$0 \le j < N_{symb,b,f,c}^{PUSCH}(i).$$

$$\beta_{offset}^{PUSCH}$$

may be equal to 1, for example, if the PUSCH transmission comprises UL-SCH data.

$$\beta_{offset}^{PUSCH}$$

may be equal to $$\beta_{offset}^{CSI,1},$$

for example, if the PUSCH transmission comprises CSI and does not include UL-SCH data. $Q_m$ may be a modulation order and R may be a target code rate. One or both of $Q_m$ and R may be configured by a DCI format of DCI scheduling the PUSCH transmission (e.g., that comprises CSI and does not comprise UL-SCH data).

$\delta_{PUSCH,b,f,c}(i,l)$ may be a TPC command value included in DCI (e.g., with DCI format 0_0 or DCI format 0_1) that schedules the PUSCH transmission occasion i on active UL BWP b of carrier f of serving cell c, or jointly coded with other TPC commands in a DCI format 2_2 with CRC scrambled by TPC-PUSCH-RNTI. l may be 0 or 1, for example, if the wireless device is configured with a parameter such as twoPUSCH-PC-AdjustmentStates. l may be 0, for example, if the wireless device is not configured with a parameter such as twoPUSCH-PC-AdjustmentStates and/or if the PUSCH transmission is scheduled by an RAR UL grant. $f_{b,f,c}(i,l)$ may be the PUSCH power control adjustment state l, for active UL BWP b of carrier f of serving cell c and PUSCH transmission occasion i, for example, if the wireless device is not provided with a parameter such as tpc-Accumulation. $f_{b,f,c}(i,l)$ may determined as (e.g., if the wireless device is not provided with parameter such as tpc-Accumulation):

$$f_{b,f,c}(i, l) = f_{b,f,c}(i - i_0, l) + \sum_{m=0}^{C(D_i)-1} \delta_{PUSCH,b,f,c}(m, l) \qquad \text{Equation (4)}$$

$\delta_{PUSCH,b,f,c}$ may be TPC command values that may be indicated by TPC commands in DCIs (e.g., with DCI formats 0_1, 0_0, and/or 2_2).

$$\sum_{m=0}^{C(D_i)-1} \delta_{PUSCH,b,f,c}(m, l)$$

may be a sum of TPC command values in a set $D_i$ of TPC command values (e.g., with cardinality $C(D_i)$) that the wireless device may receive between $K_{PUSCH}(i-i_0)-1$ symbols before PUSCH transmission occasion $i-i_0$ and $K_{PUSCH}(i)$ symbols before PUSCH transmission occasion i (e.g., on active UL BWP b of carrier f of serving cell c) for PUSCH power control adjustment state l. $i_0$ may be greater than 0 and may be the smallest integer for which $K_{PUSCH}(i-i_0)$ symbols before PUSCH transmission occasion $i-i_0$ is earlier than $K_{PUSCH}(i)$ symbols before PUSCH transmission occasion i. $K_{PUSCH}(i)$ may be a quantity/number of symbols, for the active UL BWP b of the carrier f of the serving cell c, after a last symbol of a corresponding PDCCH reception and before a first symbol of the PUSCH transmission, for example, if a PUSCH transmission is scheduled by a DCI format 0_0 or DCI format 0_1. $K_{PUSCH}(i)$ may be a quantity/number of $K_{PUSCH,min}$ symbols that is equal to a product of a quantity/number of symbols per slot $$\left(\text{e.g., } N_{symb}^{slot}\right)$$

and the minimum of the values provided by parameter k2 in parameter PUSCH-ConfigCommon, for example, if a PUSCH transmission is configured by a parameter such as ConfiguredGrantConfig. $f_{b,f,c}(i,l)$ may be the PUSCH power control adjustment state for active UL BWP b of carrier f of serving cell c and PUSCH transmission occasion i, for example, if the wireless device is provided with a parameter such as tpc-Accumulation. $f_{b,f,c}(i,l)$ may determined as (e.g., if the wireless device is provided with parameter tpc-Accumulation):

$$f_{b,f,c}(i,l)=\delta_{PUSCH,b,f,c}(i,l) \qquad \text{Equation (5)}$$

where $\delta_{PUSCH,b,f,c}$ absolute values may be indicated by TPC commands in DCIs corresponding to DCI formats 0_1, 0_0, and/or 2_2

Figures 26A, 26B:
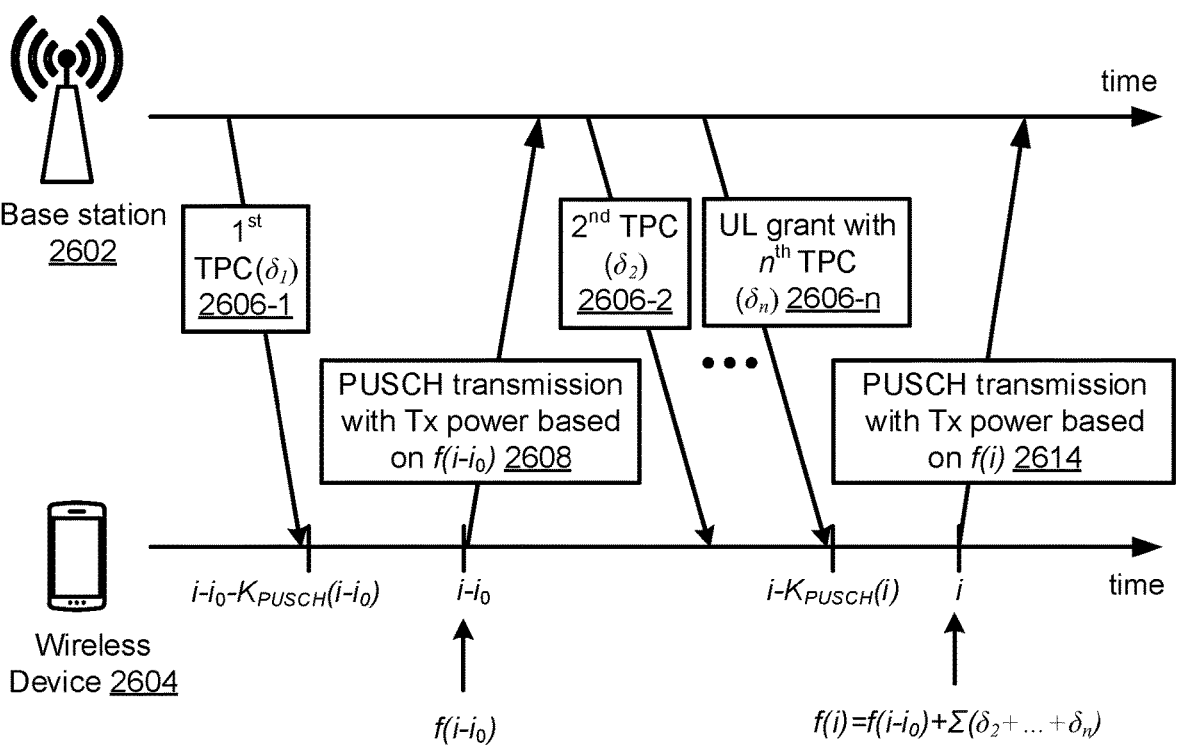
FIG. 26A shows an example method for power control.
FIG. 26B shows an example mapping table for determining a power control value.

FIG. 26A shows an example of PUSCH power control. A base station 2602 may transmit, to a wireless device 2604, a first TPC command 2606-1. The wireless device may receive the first TPC command 2606-1 at symbol $i-i_0-K_{PUSCH}(i-i_0)$. The wireless device 2604 may determine a power control adjustment state at PUSCH transmission occasion $i-i_0$, for example, based on the first TPC command 2606-1. The first TPC command 2606-1 may be in DCI with a DCI format (e.g., DCI format 0_0, 0_1, or 2_2).

FIG. 26B shows an example mapping table that may be used to determine a power control value ($\delta_{PUSCH}$), for example, based on a TPC command. $\delta_{PUSCH}$ may be −1 dB, for example, if a TPC command field is set to 0 and/or if TPC accumulation is enabled. $\delta_{PUSCH}$ may be −4 dB, for example, if a TPC command field is set to 0 and/or if TPC accumulation is not enabled. The first TPC command 2606 may be associated with a first power control value $\delta_1$.

$f(x)$ may be a power control adjustment state at PUSCH transmission occasion x. The wireless device 2604 may determine $f(x)$ based on one or more TPC commands and/or a power control adjustment state of a previous PUSCH transmission occasion before x. The base station 2602 may transmit one or more TPC commands 2606, for example, based on signal quality of a received transmissions from the wireless device 2604. The base station 2602 may transmit a TPC command indicating a positive $\delta_{PUSCH}$, for example, if signal quality of a previous received PUSCH transmission is above a threshold (e.g., high SNR value). The base station 2602 may transmit a TPC command indicating a negative $\delta_{PUSCH}$, for example, if signal quality of a previous received PUSCH transmission is below a threshold (e.g., low SNR value). The wireless device 2604 may determine a PUSCH transmission power, at the PUSCH transmission occasion x, based on $f(x)$. The wireless device 2604 may transmit a PUSCH transmission, at the PUSCH transmission occasion x, using the determined PUSCH transmission power.

The wireless device 2604 may determine a power control adjustment state at PUSCH transmission occasion $i-i_0$, $f(i-i_0)$. The wireless device 2604 may determine the power control adjustment state, for example, based on the first TPC command 2606-1 and/or a power control adjustment state of a previous PUSCH transmission occasion (e.g., before $(i-i_0)$). The wireless device 2604 may determine a power control adjustment state for a PUSCH transmission occasion i, based on one or more TPC commands 2606-2 . . . 2606-n. The one or more TPC commands 2606-2 . . . 2606-n may be received between PUSCH transmission occasion $i-i_0$ and symbol $i-K_{PUSCH}(i)$. $i_0$ may be greater than 0 and/or may be a smallest integer for which $K_{PUSCH}(i-i_0)$ symbols before PUSCH transmission occasion $i-i_0$ is earlier than $K_{PUSCH}(i)$ symbols before PUSCH transmission occasion i. $K_{PUSCH}(i)$ may be a quantity/number of symbols after a last symbol of a corresponding PDCCH reception and/or before a first symbol of a PUSCH transmission 2614, for example, if the PUSCH transmission 2614 is scheduled by DCI with a DCI format 0_0 or DCI format 0_1. $K_{PUSCH}(i)$ may be a quantity/number of $K_{PUSCH,min}$ symbols that is equal to a product of a quantity/number of symbols per slot, $$N_{symb}^{slot},$$

and a minimum of values configured by parameter k2 in parameter PUSCH-ConfigCommon, for example, if the PUSCH transmission 2614 is configured by a parameter such as ConfiguredGrantConfig.

The one or more TPC commands 2606-2 . . . 2606-n, received between the PUSCH transmission occasion $i-i_0$ and symbol $i-K_{PUSCH}(i)$, may indicate power control values $\delta_2, \delta_3, \ldots \delta_n$, respectively. The wireless device 2604 may determine a power control adjustment state for the PUSCH transmission occasion i, for example, based on the power control values (e.g., $\delta_2, \delta_3, \ldots \delta_n$) and $f(i-i_0)$, in which $f(i-i_0)$ is the power control adjustment state for the PUSCH transmission occasion $i-i_0$. The wireless device 2604 may determine the power control adjustment state for the PUSCH transmission occasion i, $f(i)$, as, for example: $f(i)=f(i-i_0)+\Sigma(\delta_2, \delta_3, \ldots \delta_n)$. The wireless device 2604 may determine a PUSCH transmission power, for the PUSCH transmission occasion i, based on $f(i)$ (e.g., by using equation (1)). The wireless device 2604 may transmit the PUSCH transmission 2614, for the PUSCH transmission occasion i, using the determined PUSCH transmission power.

$g(x)$ may be a power control adjustment state for a PUCCH transmission occasion x. The wireless device 2604 may determine $g(x)$ based on one or more TPC commands and/or a power control adjustment state of a previous PUCCH transmission occasion (e.g., before x). The base station 2602 may transmit one or more TPC commands 2606, for example, based on signal quality of a received PUCCH transmissions from the wireless device 2604. The base station 2602 may transmit a TPC command indicating a positive $\delta_{PUCCH}$, for example, if signal quality of a previous received PUCCH transmission is above a threshold (e.g., high SNR value). The base station 2602 may transmit a TPC command indicating a negative $\delta_{PUCCH}$, for example, if signal quality of a previous received PUCCH transmission is below a threshold (e.g., low SNR value). The wireless device 2604 may determine a PUCCH transmission power, for the PUCCH transmission occasion x, based on $g(x)$. The wireless device 2604 may transmit a PUCCH transmission, for the PUCCH transmission occasion x, using the determined PUCCH transmission power.

The wireless device 2604 may determine a power control adjustment state at PUCCH transmission occasion i, $g(i)$, as $g(i)=g(i-i_0)+\Sigma(\delta_{PUCCH,2}, \delta_{PUCCH,3}, \ldots, \delta_{PUCCH,n})$. $\delta_{PUCCH,2}, \delta_{PUCCH,3}, \ldots, \delta_{PUCCH,n}$ may be one or more power control values indicated in one or more TPC commands for PUCCH transmission, received between PUCCH transmission occasion $i-i_0$ and symbol $i-K_{PUCCH}(i)$. $g(i-i_0)$ may be a power control adjustment state at PUCCH transmission occasion $i-i_0$. $i_0$ may be greater than 0 and may be the smallest integer for which $K_{PUCCH}(i-i_0)$ symbols before PUCCH transmission occasion $i-i_0$ is earlier than $K_{PUCCH}(i)$ symbols before PUCCH transmission occasion i. $K_{PUCCH}(i)$ may be a quantity/number of symbols after a last symbol of a corresponding PDCCH reception and/or before a first symbol of a PUCCH transmission for the PUCCH transmission occasion i, for example, if the PUCCH transmission is based on detection, by the wireless device, of DCI with a DCI format 1_0 or DCI format 1_1. $K_{PUCCH}(i)$ may be a quantity/number of $K_{PUCCH,min}$ symbols that is equal to the product of a quantity/number of symbols per slot, $$N_{symb}^{slot},$$

and the minimum of the values provided by parameter k2 in a parameter such as PUSCH-ConfigCommon, for example, if the PUCCH transmission is not in response to or based on a detection by the wireless device of DCI with a DCI format 1_0 or DCI format 1_1. The wireless device 2604 may determine a PUCCH transmission power, for the PUCCH transmission occasion i, based on g(i). The wireless device 2604 may transmit the PUCCH transmission, for the PUCCH transmission occasion i, using the determined PUCCH transmission power.

h(x) may be a power control adjustment state for an SRS transmission occasion x. The wireless device 2604 may determine h(x) based on one or more TPC commands and/or a power control adjustment state of a previous SRS transmission occasion before x. The wireless device 2604 may determine an SRS transmission power, for the SRS transmission occasion x, based on h(x). The wireless device 2604 may transmit SRS, for the SRS transmission occasion x, using the determined SRS transmission power.

The wireless device 2604 may determine a power control adjustment state for SRS transmission occasion i, h(i), as $h(i)=h(i-i_0)+\Sigma(\delta_{SRS,2}, \delta_{SRSR,3}, \ldots, \delta_{SRS,n})$, for example, if the wireless device 2604 is not configured for PUSCH transmissions on an active UL BWP, if parameter srs-PowerControlAdjustmentStates indicates that SRS transmissions and PUSCH transmissions are associated with separate power control adjustment states, and/or if a parameter such as tpc-Accumulation is not provided. $\delta_{SRS,2}$, $\delta_{SRSR,3}, \ldots, \delta_{SRS,n}$ may be one or more power control values indicated in one or more TPC commands for SRS transmission, received between SRS transmission occasion $i-i_0$ and symbol $i-K_{SRS}(i)$. $h(i-i_0)$ may be a power control adjustment state at SRS transmission occasion $i-i_0$. $i_0$ may be greater than 0 and/or may be the smallest integer for which $K_{SRS}(i-i_0)$ symbols before SRS transmission occasion $i-i_0$ is earlier than $K_{SRS}(i)$ symbols before SRS transmission occasion i. $K_{SRS}(i)$ may be a quantity/number of symbols after a last symbol of a corresponding PDCCH triggering the SRS transmission and before a first symbol of the SRS transmission, for example, if the SRS transmission is aperiodic. $K_{SRS}(i)$ may be a quantity/number of $K_{SRS,min}$ symbols that is equal to the product of a quantity/number of symbols per slot, $$N_{symb}^{slot},$$

and the minimum of the values provided by k2 in PUSCH-ConfigCommon, for example, if the SRS transmission is semi-persistent or periodic. The wireless device 2604 may determine an SRS transmission power, for the SRS transmission occasion i, based on h(i). The wireless device 2604 may transmit the SRS transmission, for the SRS transmission occasion i, using the determined SRS transmission power.

A wireless device may transmit, to a base station, a preamble in an RA procedure (e.g., an RA procedure as shown in FIG. 12). The wireless device may repeat the preamble transmissions, for example, based on or in response to not receiving an RAR from the base station in a response window. The wireless device may determine a transmission power for each preamble transmission based on a preamble transmission counter (e.g., PREAMBLE_TRANSMISSION_COUNTER), a preamble power ramping counter (e.g., PREAMBLE_POWER_RAMPING_ COUNTER), an initial preamble target received power (e.g., preambleReceivedTargetPower which may be configured in an RRC message), a power offset value (e.g., DELTA_PREAMBLE which may be configured in an RRC message), and/or a power ramping step (e.g., PREAMBLE_POWER_RAMPING_STEP which may be configured in an RRC message). The wireless device may, for each preamble transmission, increment PREAMBLE_POWER_RAMPING_COUNTER by one and/or select a value of DELTA_PREAMBLE based on preamble format, for example, if PREAMBLE_TRANSMISSION_COUNTER is greater than one, a notification of suspending power ramping counter has not been received (e.g., from lower layers), and/or a selected SSB or selected CSI-RS is not changed from a selection associated with a last preamble transmission. The wireless device may determine a value of PREAMBLE_RECEIVED_TARGET_POWER as:

PREAMBLE_RECEIVED_TARGET_POWER=preambleReceived TargetPower+DELTA_PREAMBLE+(PRE-AMBLE_POWER_RAMPING_COUNTER-1)× PREAMBLE_POWER_RAMPING_STEP.  Equation (6)

The wireless device may determine a transmission power of a preamble, for example, based on PREAMBLE_RECEIVED_TARGET_POWER. The wireless device may be unable to complete an RA procedure successfully, for example, if PREAMBLE_TRANSMISSION_COUNTER is greater than a configured quantity/number (e.g., preambleTransMax as configured in the RRC message) and/or a response to the preamble is not received.

A wireless device may determine a transmission power for a PRACH, $P_{PRACH,b,f,c}(i)$, on active UL BWP b of carrier f of serving cell c, based on DL RS for the serving cell c in transmission occasion i as:

$$P_{PRACH,b,f,c}(i)=m \quad in\{P_{CMAX,f,c}(i)P_{PRACH,target,f,c}+ PL_{b,f,c}\}[dBm] \qquad \text{Equation (7)}$$

$P_{CMAX,f,c}(i)$ may be a configured wireless device transmission power for the carrier f of the serving cell c within a transmission occasion i, $P_{PRACH,target,f,c}$ may be a PRACH target reception power PREAMBLE_RECEIVED_TARGET_POWER, and $PL_{b,f,c}$ may be a pathloss for the active UL BWP b of the carrier f based on the DL RS associated with the PRACH transmission on the active DL BWP of the serving cell c. $PL_{b,f,c}$ may be determined/calculated by the wireless device (e.g., in dB) as (referenceSignalPower– higher layer filtered RSRP in dBm).

Wireless communications and/or systems (e.g., 3GPP, 4G, 5G and/or any other current or future wireless communication protocol) may support multiple types of services. Wireless devices (e.g., operating according to the communication protocol) may transmit different data packets for the different services. The multiple types of services may comprise, for example, at least one of: an ultra-reliable low-latency communication (URLLC); an enhanced mobile broadband service (eMBB); a machine type communication (MTC); and/or a vehicle to vehicle (or vehicle to everything) communication (V2X). A first data packet (e.g., a URLLC data packet) of a first wireless device may be multiplexed with a second data packet (e.g., an eMBB data packet) of a second wireless device (e.g., on a PUSCH resource). The first data packet may be transmitted with a first transmission format (e.g., a first numerology or a first scheduling granularity) on a first PUSCH resource. The second data packet may be transmitted with a second transmission format (e.g., a second numerology or a second scheduling granularity) on a second PUSCH resource. The first PUSCH resource may be a portion of the second PUSCH resource. The second PUSCH resource may be allocated for the second wireless device by an uplink grant indicated via a PDCCH. The first data packet of the first wireless device may be transmitted on the first PUSCH resource, for example, if the first data packet is associated with a lower latency than the second data packet. The first data packet and second data packets may be associated with respective (e.g., same or different) service types. The base station may receive the first data packet from the first wireless device on the first PUSCH resource and the second data packet from the second wireless device on the second PUSCH resource. Reception of the first data packet on the first PUSCH resource may result in reception/decoding errors at the base station, for example, if the first PUSCH resource is a portion of the second PUSCH resource (e.g., used for transmission of the second data packet from the second wireless device). The base station may wrongly detect that the second data packet from the second wireless device is a part of first data packet from the first wireless device A base station may pre-empt transmission of lower priority data (e.g., eMBB data), for example, if the lower priority data may overlap (e.g., in time and/or frequency) with the higher priority data (e.g., URLLC data). A base station may pre-empt transmission of first data corresponding to a first transmission format, for example, if the first data overlaps (e.g., in time and/or frequency) with data corresponding to a second transmission format. A base station may transmit DCI comprising fields indicating one or more uplink pre-emption indications to a wireless device (e.g., the second wireless device) or a group of wireless devices (e.g., comprising the second wireless device), indicating if one or more time/frequency resources are pre-empted (e.g., reserved for the first wireless device).

Figure 27:
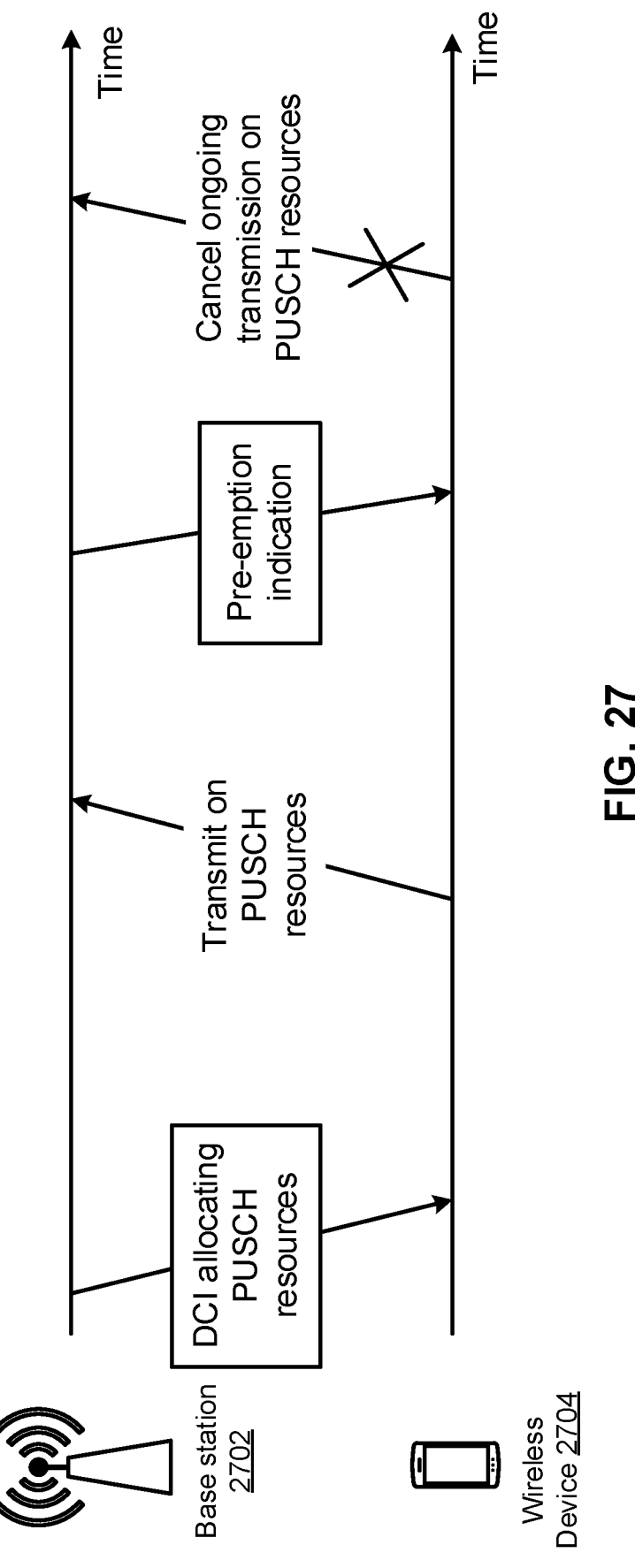
FIG. 27 shows an example of uplink pre-emption.

FIG. 27 shows an example uplink pre-emption mechanism. The uplink pre-emption mechanism may correspond to inter-wireless device pre-emption or intra-wireless device pre-emption. A base station 2702 may transmit to a wireless device 2704, first DCI comprising a first uplink grant. The uplink grant may comprise/indicate PUSCH resources for uplink transmissions. The wireless device 2704 may start sending (e.g., transmitting) a TB on the first uplink grant, for example, based on receiving the DCI. The wireless device 2704 may receive an uplink pre-emption indication from the base station. The uplink pre-emption indication may comprise a cancellation indication, a stop indication, and/or a suspend indication. The uplink pre-emption indication may indicate that at least a part of the PUSCH resources is pre-empted, and/or the wireless device 2704 may stop uplink transmission on the at least part of the PUSCH resources. 27 The wireless device 2704 may stop the ongoing uplink transmission on the at least part of the PUSCH resources, wherein the at least part of the PUSCH resources are pre-empted based on the uplink pre-emption indication, for example, based on the uplink pre-emption indication. The base station 2702 may transmit DCI comprising the uplink pre-emption indication. The DCI may be transmitted to a wireless device addressed by a C-RNTI, or be transmitted to a group of wireless devices addressed by a group RNTI. The base station 2702 may transmit a MAC CE comprising the uplink pre-emption indication. The base station 2702 may transmit a signal sequence (e.g., a CSI-RS/DMRS) comprising the uplink pre-emption indication.

The base station 2702 may transmit second DCI to a second wireless device (e.g., a URLLC wireless device), for example, in an inter-wireless device pre-emption scenario, wherein the second DCI indicates a second uplink grant comprising the at least part of the PUSCH resources allocated in the first DCI for the wireless device 2704. The second wireless device, may transmit uplink data via the second uplink grant, for example, based on/in response to receiving the second DCI. The base station 2702 may transmit second DCI to the wireless device 2704, wherein the second DCI indicates a second uplink grant comprising the at least part of the PUSCH resources allocated in the first DCI for the wireless device 2704. The wireless device 2704 may transmit uplink data (e.g., URLLC data packet) via the second uplink grant, for example based on (e.g., in response to) receiving the second DCI.

Figure 28:
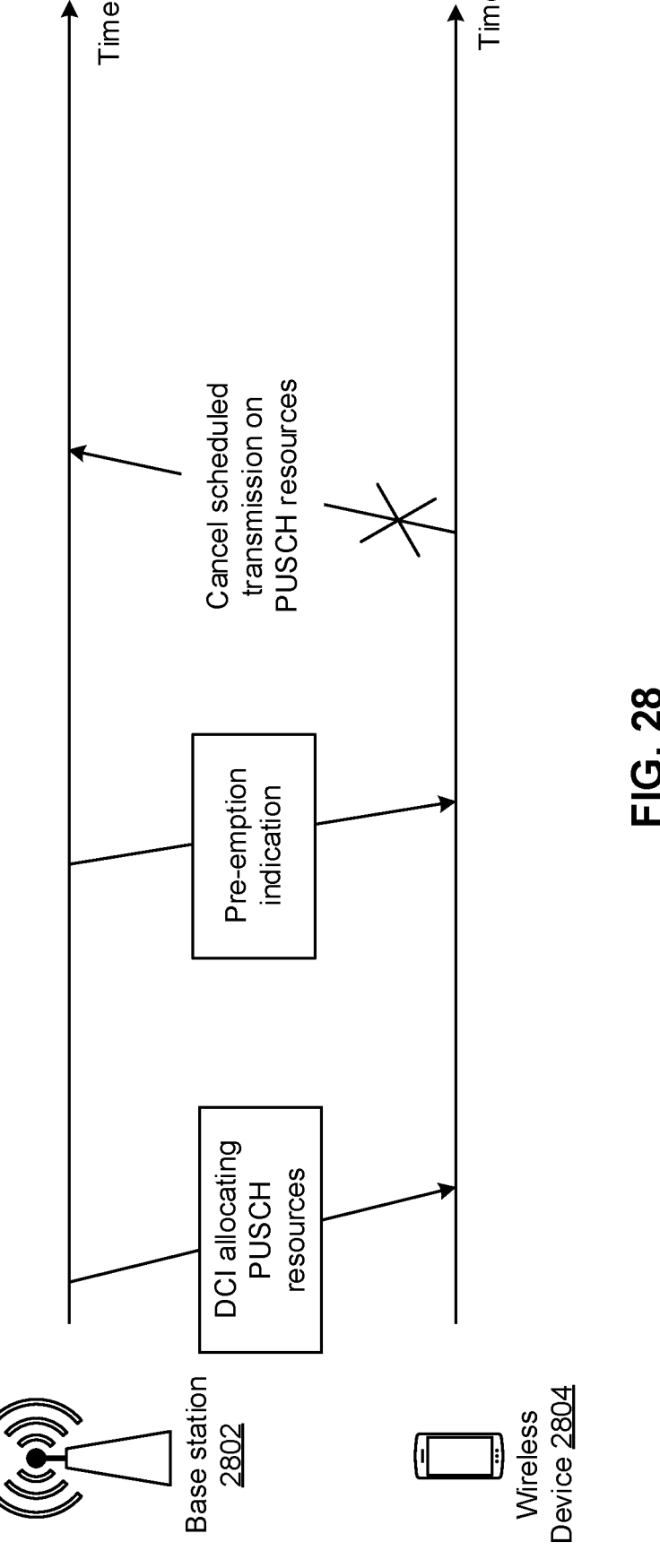
FIG. 28 shows an example of uplink pre-emption.

FIG. 28 shows an example of uplink pre-emption. A scheduled (e.g., upcoming) uplink transmission may be canceled based on an uplink pre-emption indication. A base station 2802 28 may transmit to a wireless device 2804, first DCI comprising a first uplink grant. The uplink grant may comprise PUSCH resources. The wireless device 2804 may generate a TB based on the first DCI. The wireless device 2804 may receive an uplink pre-emption indication from the base station 2802, for example, prior to starting an uplink transmission of the TB. The uplink pre-emption indication may indicate that at least a part of the PUSCH resources is pre-empted, and/or the wireless device 2804 may stop uplink transmission on the at least part of the PUSCH resources. The wireless device 2804 may stop scheduled (e.g., upcoming) uplink transmission on the at least part of the PUSCH resources, wherein the at least part of the PUSCH resources are pre-empted based on the uplink pre-emption indication. The base station 2802 may transmit DCI comprising the uplink pre-emption indication. The base station 2802 may transmit second DCI to a second wireless device (e.g., a URLLC wireless device), for example, based on (e.g., after or in response to) transmitting the uplink pre-emption indication. The second DCI may indicate a second uplink grant comprising the at least part of the PUSCH resources, where the PUSCH resources are allocated in the first DCI for the first wireless device 2804. The second wireless device may transmit uplink data via the second uplink grant, for example, based on receiving the second DCI.

Figure 29:
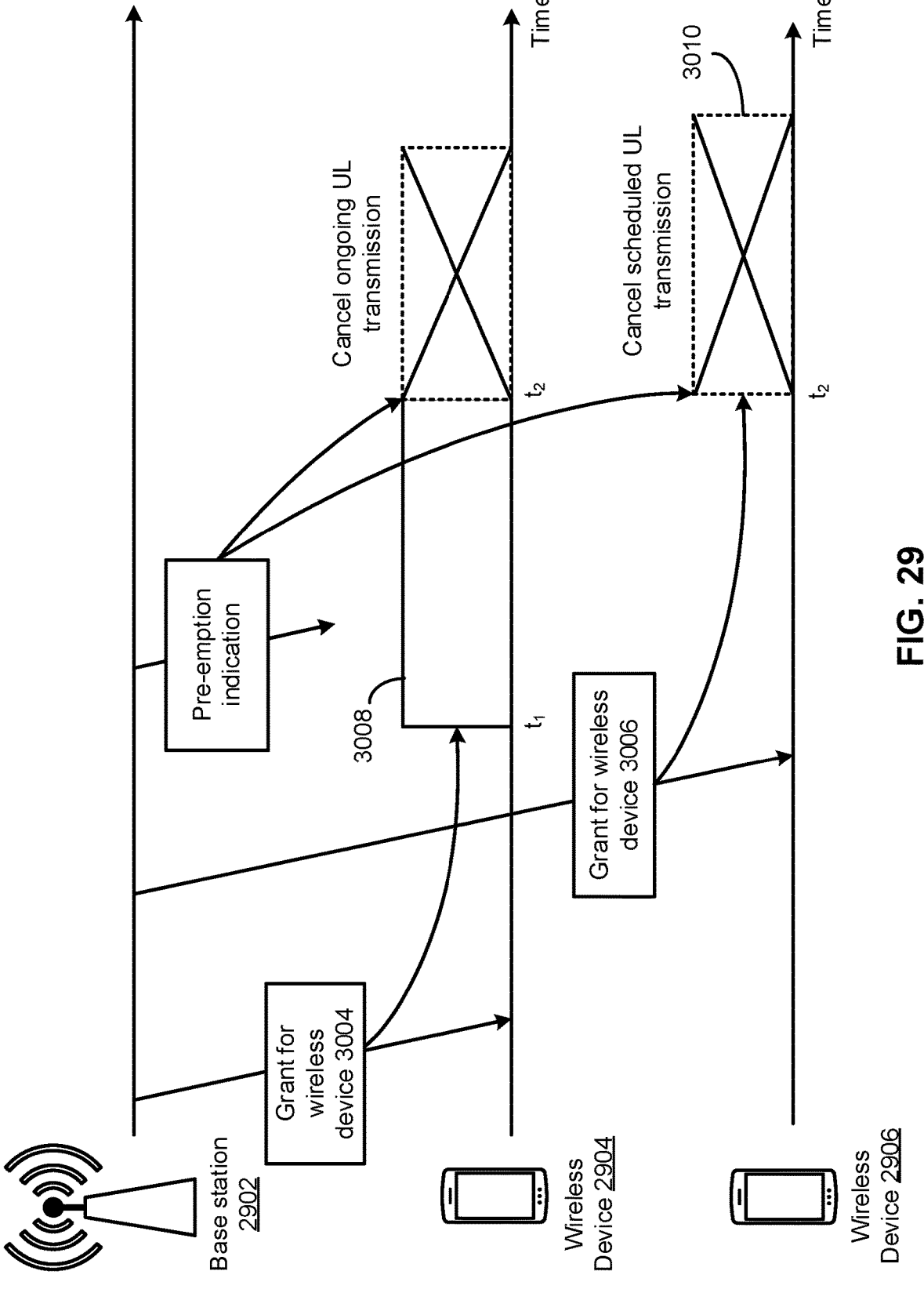
FIG. 29 shows an example of uplink pre-emption.

FIG. 29 shows an example of group uplink cancellation based on an uplink pre-emption indication. A base station 2902 may send (e.g., transmit) to a wireless device 2904, first DCI comprising a first uplink grant. The first uplink grant may comprise first PUSCH resources. The base station 2902 may send (e.g., transmit) to a wireless device 2906, second DCI comprising a second uplink grant. The second uplink grant may comprise second PUSCH resources. The base station 2902 may send (e.g., transmit) an uplink pre-emption indication to the wireless device 2904 and the wireless device 2906, for example, in a group command DCI.

At or after time $t_1$, the wireless device 2904 may send (e.g., transmit) an uplink transmission 2908 on the first uplink grant. The wireless device 2904 may receive the uplink pre-emption indication, for example, after wireless device 2904 starts the uplink transmission 2908 on the first uplink grant. The wireless device 2906 may receive the uplink pre-emption indication, for example, prior to the wireless device 2906 starting an uplink transmission on the second uplink grant.

The uplink pre-emption indication may comprise a cancellation indication, a stop indication, a suspension indication, or any other indication. The base station 2902 may transmit DCI comprising the uplink pre-emption indication. The DCI may be transmitted to a group of wireless devices (e.g., wireless device 2904 and wireless device 2906) addressed by a group RNTI.

At or after time $t_2$, the wireless device (e.g., the wireless device 2904) may stop the uplink transmission 2908, for example, based on the uplink pre-emption indication. The wireless device 2906 may be pre-empted from any uplink transmission, for example, based on the uplink pre-emption indication. The wireless device 2906 may not start the uplink transmission 2910, for example, based on the uplink pre-emption indication. The uplink pre-emption indication may indicate that any uplink transmission from the wireless device 2906 may be stopped at a first symbol that is earlier than a second symbol on which the uplink transmission 2910 is scheduled to begin.

The wireless device 2904 may stop ongoing uplink transmission 2908 on at least first part of the first uplink grant, for example, based on the uplink pre-emption indication. The wireless device 2906 may stop scheduled uplink transmission 2910 on at least second part of the second uplink grant, based on the uplink pre-emption indication. The uplink pre-emption indication may indicate that the at least first part of the first uplink grant is pre-empted, and/or the at least second part of the second uplink grant is pre-empted. The base station 2902 may transmit a third DCI to a third wireless device (e.g., a URLLC wireless device), for example, based on (e.g., after or in response to) transmitting the uplink pre-emption indication. The third DCI may indicate a third uplink grant comprising the at least first part of the first uplink grant and/or the at least second part of the second uplink grant. The third wireless device may transmit uplink data via the third uplink grant, for example, based on (e.g., after or in response) to receiving the third DCI.

A wireless device may determine a transmission power to be used for a first uplink transmission. The wireless device may determine the transmission power for the first uplink transmission, for example, based on one or more power control commands received from a base station. The wireless device may operate as described above with reference to FIG. 26A. The first uplink transmission may be based on (e.g., in response to) a first uplink grant (e.g., from the base station). The wireless device may receive (e.g., from the base station) a cancellation indication/pre-emption indication indicating cancellation of the first uplink transmission. The wireless device may receive (e.g., at a time after receiving the cancellation indication) a second uplink grant. The second uplink grant may comprise a/another power control command (e.g., from the base station) for a second uplink transmission. The wireless device may be unable to determine a transmission power to be used for the second uplink transmission. The wireless device may be unable to determine the transmission power for the second uplink transmission, for example, if the wireless device had previously cancelled the first uplink transmission. The base station may not be able to provide an accurate power control command for the second uplink grant, for example, if the first uplink transmission was cancelled.

As described herein, a wireless device may use various techniques to determine a transmission power for uplink transmission (e.g., a second uplink transmission). The wireless device may use the transmission power that is determined for a first uplink transmission to determine the transmission power for a second uplink transmission, for example, even if the first uplink transmission was cancelled. The wireless device may not use one or more power control commands to determine the transmission power for the second uplink transmission. The wireless device may not use a power control command, received prior to receiving the cancellation indication, to determine the transmission power for a new uplink transmission (e.g., the second uplink transmission). The wireless device may not use a power control command, received after receiving the cancellation indication, to determine the transmission power for the new uplink transmission. The wireless device may use the power control command, received after receiving the cancellation indication, to determine the transmission power for the second uplink transmission, for example, even if the first uplink transmission was cancelled. Various examples described herein may reduce power consumption of a wireless device, improve accuracy of power control, reduce uplink interference to other wireless devices, and/or increase uplink spectrum efficiency.

As described herein (e.g., with reference to FIG. 26), a wireless device may determine a first transmission power based on a previous power control adjustment state and a first TPC command. The wireless device may determine the first transmission power, for example, based on receiving first DCI. The first DCI may comprise a first uplink grant and/or the first TPC command. The wireless device may send/transmit a first uplink TB, for example, based on (e.g., via) the first uplink grant using the first transmission power.

The wireless device may receive an uplink pre-emption indication. The wireless device may receive the uplink pre-emption indication, for example, after receiving the first DCI and/or before performing a scheduled uplink transmission (e.g., an upcoming uplink transmission) of the first uplink TB. The wireless device may receive an uplink pre-emption indication, for example, after receiving the first DCI and/or during an ongoing transmission of the first uplink TB. The wireless device may cancel the scheduled uplink transmission and/or an ongoing transmission of the first uplink TB, for example, based on (e.g., in response to) receiving the uplink pre-emption indication.

The wireless device may receive second DCI. The second DCI may comprise a second uplink grant and/or a second TPC command. The second DCI may be for the cancelled first uplink TB or may be for a different uplink TB. The wireless device may send/transmit a second uplink TB, for example, based on the second DCI. The second uplink TB may be the same as (or substantially the same as) the first uplink TB or may be a different uplink TB. The wireless device may be unable to determine, for example, if the wireless device may assume/determine that the cancelled transmission of the first uplink TB was performed, and/or whether the wireless device may assume/determine that the cancelled transmission has not been performed. The wireless device may determine the second transmission power based on one or both of the first TPC command and/or the second TPC command, for example, if the wireless device assumes/determines the cancelled transmission of the first uplink TB was performed. The wireless device may determine the second transmission power based on the second TPC command (e.g., rather than the first TPC command), for example, if the wireless device assumes/determined that the cancelled transmission of the first uplink TB was not performed.

The wireless device, may be unable to determine a second transmission power for the second uplink TB. The wireless device may be unable to determine the second transmission power because the first TB associated with the first transmission power was cancelled. Inability of the wireless device to determine the second transmission power may result in the wireless device using a larger power than might be necessary for the second uplink TB. This may result in increased power consumption, increased uplink interference, and/or reduced uplink spectrum efficiency.

The wireless device may not use the first TPC command received in the first DCI for an uplink grant. The wireless device may use the second TPC command received in the second DCI (e.g., instead of the first TPC command received in the first DCI) for determining the second transmission power. Not using the first TPC command for determining the second transmission power may reduce the second transmission power. This may provide advantages such as reduced power consumption by the wireless device, improved accuracy of power control, reduced interference in the communication network, and/or increased uplink spectrum efficiency (e.g., as a result of the reduced interference).

The wireless device may determine/assume, for determining the second transmission power, that the first uplink TB has been sent, even if the first uplink TB was canceled. The wireless device may use the first TPC command received in the first DCI, and the second TPC command received in the second DCI, for determining the second transmission power. This may enable a wireless device to generate higher transmission powers for high priority data (e.g., URLLC data) and/or data that is being resent/retransmitted.

The wireless device may use the first TPC command received in the first DCI, and may not use the second TPC command received in the second DCI, for determining the second transmission power. Using the first TPC command and not using the second TPC command for determining the second transmission power may reduce the second transmission power. This may provide advantages such as reduced power consumption by the wireless device, improved accuracy of power control, reduced interference in the communication network, and/or increased uplink spectrum efficiency.

Figure 30:
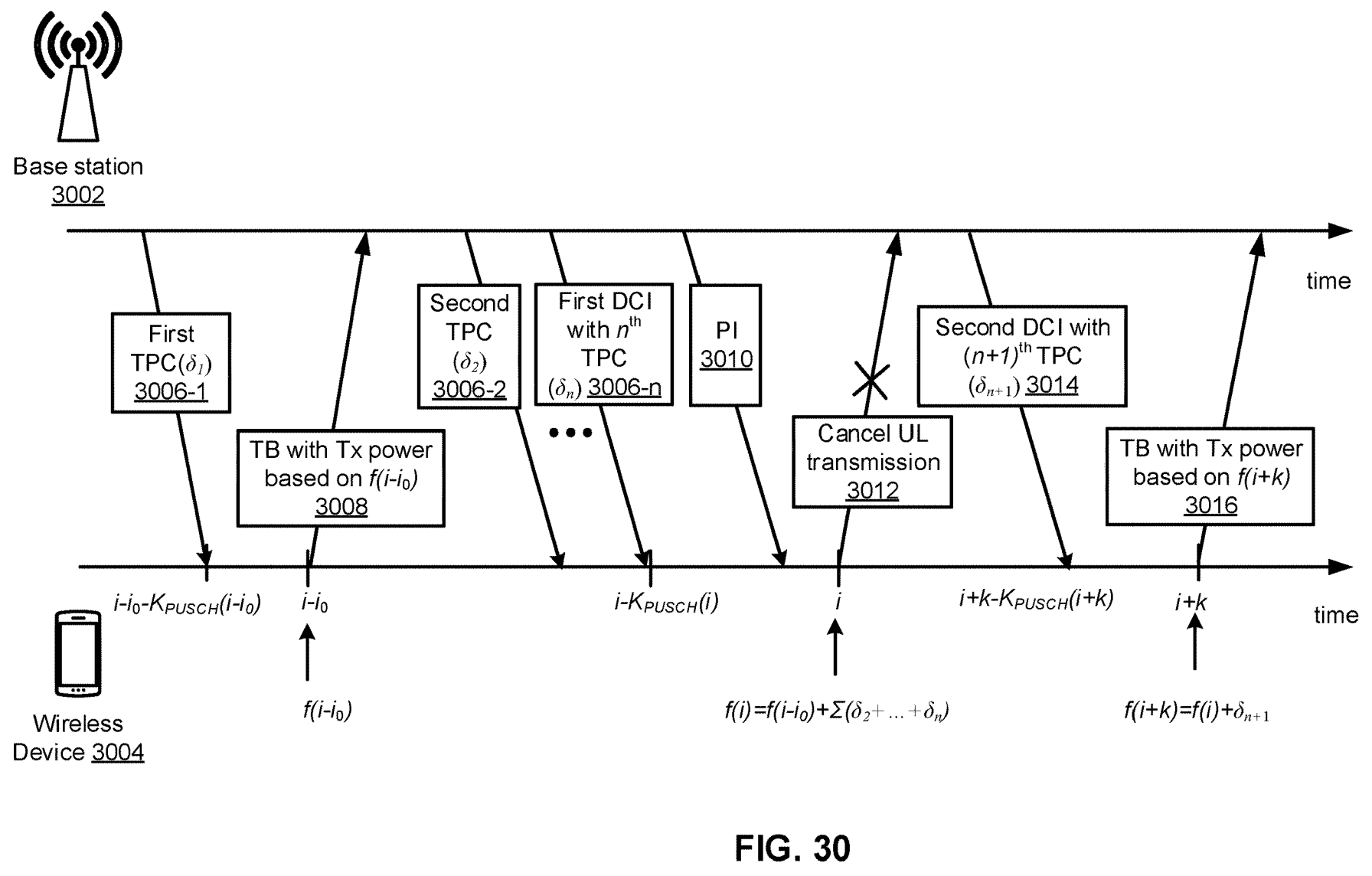

FIG. 30 shows an example of a power control mechanism that comprises uplink pre-emption. A wireless device 3004 may receive, from a base station 3002, a first TPC command 3006-1 that may be associated with a first power control value $\delta_1$. The wireless device may receive the first TPC command 3006-1 at/via symbol $i-i_0-K_{PUSCH}(i-i_0)$.

The wireless device 3004 may send (e.g., transmit), to a base station 3002 via a PUSCH, an uplink TB 3008 at/via symbol (or time/slot/minislot) $(i-i_0)$. The wireless device 3004 may determine a transmission power for transmission of the uplink TB 3008, for example, based on a power control adjustment state (e.g., $f(i-i_0)$, such as described above regarding FIG. 30) and/or one or more power control configuration parameters. The wireless device 3004 may use various techniques such as those described with reference to FIG. 26A. The power control adjustment state $f(i-i_0)$ may be determined, for example, based on a power control adjustment state of a previous PUSCH transmission and the first TPC command 3006 received at/via symbol $i-i_0-K_{PUSCH}(i-i_0)$. $K_{PUSCH}(i-i_0)$ may be a quantity/number of symbols after/following a last symbol of a corresponding PDCCH reception (e.g., a PDCCH comprising the first TPC command 3006) and/or before a first symbol of a PUSCH transmission at symbol $(i-i_0)$.

The wireless device 3004 may receive one or more TPC commands (e.g., second TPC command 3006-2, . . . $n^{th}$ TPC command 3006-$n$) after symbol $i-i_0$ and/or before symbol $i-K_{PUSCH}(i)$. The one or more TPC commands 3006-2 . . . 3006-$n$ may indicate power control values $\delta_2$ . . . $\delta_n$. The wireless device 3004 may receive first DCI comprising an uplink grant and the $n^{th}$ TPC command 3006-$n$ at symbol $i-K_{PUSCH}(i)$. The wireless device 3004 may determine a power control adjustment state for uplink transmission at/via symbol i as: $f(i)=f(i-i_0)+\Sigma(\delta_2, \delta_3, . . . \delta_n)$.

The wireless device 3004 may receive an uplink pre-emption indication 3010, for example, after receiving the first DCI. The uplink pre-emption indication 3010 may indicate that the wireless device 3004 may stop/cancel an uplink transmission 3012 (e.g., an uplink transmission based on the first DCI) on/via the uplink grant starting at symbol i. The wireless device 3004 may cancel the uplink transmission 3012 on/via the uplink grant starting at symbol i, for example, based on (e.g., in response to) receiving the uplink pre-emption indication 3010. The uplink transmission 3012 may be a scheduled (e.g., upcoming) uplink transmission or an uplink transmission that is ongoing at a time of reception, at the wireless device 3004, of the pre-emption indication 3010.

The wireless device 3004 may assume/determine that the cancelled uplink transmission 3012 has been performed, for example, based on receiving the uplink pre-emption indication 3010. The wireless device 3004 may receive, at/via symbol $i+k-K_{PUSCH}(i+k)$, second DCI comprising a second uplink grant (e.g., for a second uplink transmission at symbol $i+k$) and/or an $(n+1)$th TPC command 3014, for example, after/in response to cancelling the uplink transmission 3012 at symbol i. $K_{PUSCH}(i+k)$ may be a quantity/number of symbols after a last symbol of a corresponding PDCCH reception (e.g., the PDCCH comprising the $(n+1)$th TPC command 3014 at symbol $i+k-K_{PUSCH}(i+k)$) and/or before a first symbol of a PUSCH transmission at/via symbol $i+k$. The PUSCH transmission may comprise an uplink TB 3016. The wireless device 3004 may determine a power control adjustment state $f(i+k)$ for the PUSCH transmission at/via symbol $i+k$, for example, based on receiving the second DCI, based on using the $n^{th}$ TPC command 3006-$n$ (e.g., the power control value $\delta_n$ associated with the $n^{th}$ TPC command 3006-$n$), and/or based on using the $(n+1)$th TPC command 3014 (e.g., the power control value $\delta_{n+1}$ associated with the $(n+1)$th TPC command 3014). The wireless device 3004, may determine a power control adjustment state $f(i+k)$ for the uplink transmission at/via symbol $i+k$ as being equal to/substantially equal to $f(i)+\delta_{n+1}$, for example, based on (e.g., in response to) receiving the second DCI. The wireless device 3004 may send (e.g., transmit), via the second uplink grant, an uplink TB 3016 using a transmission power based on the power control adjustment state $f(i+k)$. The uplink TB 3016 may comprise at least a portion of the cancelled uplink transmission 3012 and/or may comprise a different transmission. The uplink TB 3016 may comprise a TB associated with the cancelled uplink transmission 3012 and/or may comprise a different TB.

A wireless device may assume/determine that an uplink transmission has been performed, even if the uplink transmission is cancelled (e.g., by an uplink pre-emption indication). This may enable the wireless device to use a same uplink power control mechanism, regardless of whether the wireless device cancels an uplink transmission or does not cancel an uplink transmission. Using a same uplink power control mechanism may simplify implementation of the wireless device and/or reduce the cost of the wireless device.

Assuming that a cancelled uplink transmission has been performed and accumulating all power control command(s) for calculation of a power control adjustment state may improve uplink spectrum efficiency.

Figure 31:
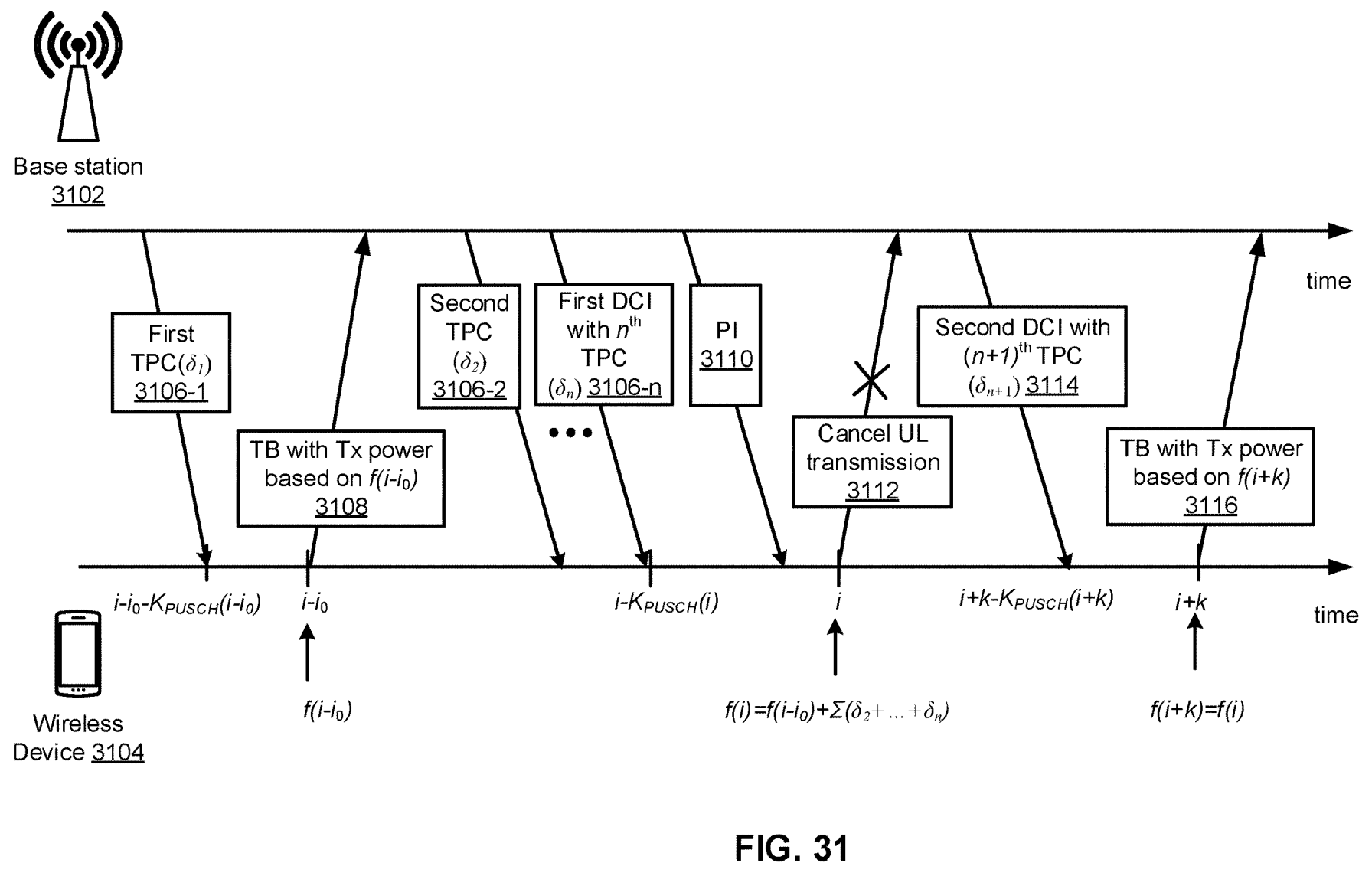

FIG. 31 shows an example of a power control mechanism that comprises uplink pre-emption. A wireless device 3104 may receive, from a base station 3102, a first TPC command 3106-1 that is associated with a first power control value $\delta_1$. The wireless device may receive the first TPC command 3106-1 at/via symbol $i-i_0-K_{PUSCH}(i-i_0)$.

The wireless device 3104 may send (e.g., transmit), to a base station 3102, an uplink TB 3108 via a PUSCH at/via symbol (or time/slot/minislot) $(i-i_0)$. The wireless device 3104 may determine a transmission power for transmission of the uplink TB 3108, for example, based on a power control adjustment state (e.g., $f(i-i_0)$ as shown in FIG. 31) and/or based on one or more power control configuration parameters. The wireless device 3104 may use various techniques such as those described with reference to FIG. 26A. The power control adjustment state $f(i-i_0)$ may be determined, for example, based on a power control adjustment state of a previous PUSCH transmission and/or the first TPC command 3106 received at/via symbol $i-i_0-K_{PUSCH}$ $(i-i_0)$. $K_{PUSCH}$ $(i-i_0)$ may be a quantity/number of symbols after a last symbol of a corresponding PDCCH reception (e.g., a PDCCH comprising the first TPC command 3106) and before a first symbol of a PUSCH transmission at symbol $(i-i_0)$.

The wireless device 3104 may receive one or more TPC commands (e.g., second TPC command 3106-2, . . . $n^{th}$ TPC command 3106-$n$) after symbol $i-i_0$ and/or before symbol $i-K_{PUSCH}(i)$. The one or more TPC commands 3106-2 . . . 3106-$n$ may indicate power control values $\delta_2$ . . . $\delta_n$. The wireless device 3104 may receive first DCI comprising an uplink grant and/or the $n^{th}$ TPC command 3106-$n$ at/via symbol $i-K_{PUSCH}(i)$. The wireless device 3104 may determine a power control adjustment state for uplink transmission at symbol i as: $f(i)=f(i-i_0)+\Sigma(\delta_2, \delta_3, . . . \delta_n)$.

The wireless device 3104 may receive an uplink pre-emption indication 3110, for example, after receiving the first DCI. The uplink pre-emption indication 3110 may indicate that the wireless device 3104 may stop/cancel an uplink transmission 3112 (e.g., an uplink transmission based on the first DCI) on/via the uplink grant starting at symbol i. The wireless device 3104 may cancel the uplink transmission 3112 on/via the uplink grant starting at symbol i, for example, based on (e.g., in response to) receiving the uplink pre-emption indication 3110. The uplink transmission 3112 may be a scheduled (e.g., upcoming) uplink transmission or an uplink transmission that is ongoing at a time of reception, by the wireless device 3104, of the pre-emption indication 3110.

The wireless device 3104 may assume/determine that the cancelled uplink transmission 3112 has been performed, for example, based on receiving the uplink pre-emption indication 3110. The wireless device 3104 may receive, at symbol $i+k-K_{PUSCH}(i+k)$, second DCI comprising a second uplink grant (e.g., for a second uplink transmission at symbol $i+k$) and an $(n+1)^{th}$ TPC command 3114, for example, after/in response to cancelling the uplink transmission 3112 at/via symbol i. $K_{PUSCH}(i+k)$ may be a quantity/number of symbols after a last symbol of a corresponding PDCCH reception (e.g., the PDCCH comprising the (n+1)th TPC command 3114 at/via symbol $i+k-K_{PUSCH}(i+k)$ and/or before a first symbol of a PUSCH transmission at/via symbol $i+k$. The PUSCH transmission may comprise an uplink TB 3116. The wireless device 3104 may determine a power control adjustment state $f(i+k)$ for the PUSCH transmission at/via symbol $i+k$, for example, based on receiving the second DCI and/or based on using the $n^{th}$ TPC command 3106-$n$ (e.g., the power control value $\delta_n$ associated with the $n^{th}$ TPC command 3106-$n$). The wireless device 3104 may determine a power control adjustment state $f(i+k)$ for the PUSCH transmission at/via symbol $i+k$, for example, based on receiving the second DCI and/or based on discarding/not using the $(n+1)^{th}$ TPC command 3114 (e.g., the power control value $\delta_{n+1}$ associated with the $(n+1)^{th}$ TPC command 3114). The wireless device 3104 may determine $f(i+k)$ as being equal to/substantially equal to $f(i)$, for example, by discarding/not using the $(n+1)^{th}$ TPC command. The wireless device 3104 may send (e.g., transmit), via the second uplink grant, an uplink TB 3116 with a transmission power based on the power control adjustment state $f(i+k)$. The uplink TB 3116 may comprise at least a portion of the cancelled uplink transmission 3112 and/or may comprise a different transmission. The uplink TB 3116 may comprise a TB associated with the cancelled uplink transmission 3112 and/or may comprise a different TB.

A wireless device may assume/determine that an uplink transmission has been performed, even if the uplink transmission is cancelled (e.g., by an uplink pre-emption indication). A wireless device may ignore a power control command (e.g., a TPC command), for example, that is received after receiving the uplink pre-emption indication. Ignoring the power control command may enable a more accurate control of transmission power and/or may reduce possibility of using excessive transmission power. This may provide advantages such as reduced power consumption of a wireless device, reduced interference to communications at other wireless devices, improved uplink spectrum efficiency, and/or improved data throughput in a communication network.

Figure 32:
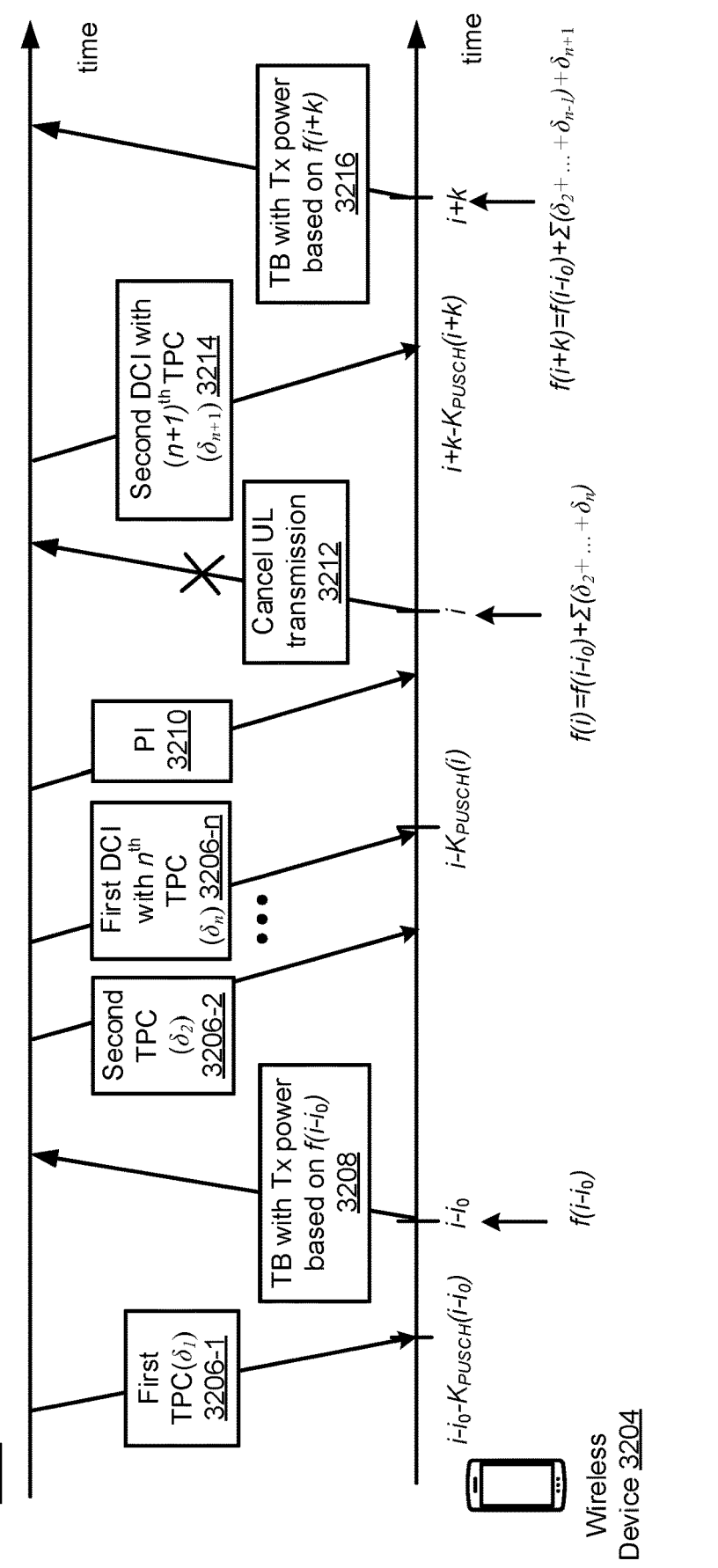
FIG. 32 shows an example of power control using uplink pre-emption.

FIG. 32 shows an example of power control. Power control may comprise uplink pre-emption. A wireless device 3204 may receive, from a base station 3202, a first TPC command 3206-1 that is associated with a first power control value $\delta_1$. The wireless device may receive the first TPC command 3206-1 at/via symbol $i-i_0-K_{PUSCH}(i-i_0)$.

The wireless device 3204 may send (e.g., transmit), to a base station 3202, an uplink TB 3208 via a PUSCH at/via symbol (or time/slot/minislot) $(i-i_0)$. The wireless device 3204 may determine a transmission power for transmission of the uplink TB 3208, for example, based on a power control adjustment state (e.g., $f(i-i_0)$ as shown in FIG. 32) and/or based on one or more power control configuration parameters. The wireless device 3204 may use various examples such as those described with reference to FIG. 26A. The power control adjustment state $f(i-i_0)$ may be determined, for example, based on a power control adjustment state of a previous PUSCH transmission and/or the first TPC command 3206 received at/via symbol $i-i_0-K_{PUSCH}$ $(i-i_0)$ $K_{PUSCH}$ $(i-i_0)$ may be a quantity/number of symbols after a last symbol of a corresponding PDCCH reception (e.g., a PDCCH comprising the firstTPC command 3206) and/or before a first symbol of a PUSCH transmission at/via symbol $(i-i_0)$.

The wireless device 3204 may receive one or more TPC commands (e.g., second TPC command 3206-2, . . . $n^{th}$ TPC command 3206-$n$) after symbol $i-i_0$ and/or before symbol $i-K_{PUSCH}(i)$. The one or more TPC commands 3206-2 . . . 3206-$n$ may indicate power control values $\delta_2$ . . . $\delta_n$. The wireless device 3204 may receive first DCI comprising an uplink grant and/or the $n^{th}$ TPC command 3206-$n$ at/via symbol $i-K_{PUSCH}(i)$. The wireless device 3204 may determine a power control adjustment state for uplink transmission at symbol i as: $f(i)=f(i-i_0)+\Sigma(\delta_2, \delta_3, \ldots \delta_n)$.

The wireless device 3204 may receive an uplink pre-emption indication 3210, for example, after receiving the first DCI. The uplink pre-emption indication 3210 may indicate that the wireless device 3204 may stop/cancel an uplink transmission 3212 (e.g., an uplink transmission based on the first DCI) on the uplink grant starting at symbol i. The wireless device 3204 may cancel the uplink transmission 3212 on/via the uplink grant starting at/via symbol i, for example, based on (e.g., in response to) receiving the uplink pre-emption indication 3210. The uplink transmission 3212 may be a scheduled (e.g., upcoming) uplink transmission and/or an uplink transmission that is ongoing at a time of reception, by the wireless device 3204, of the pre-emption indication 3210.

The wireless device 3204 may receive, at/via symbol $i+k-K_{PUSCH}(i+k)$, second DCI comprising a second uplink grant (e.g., for a second uplink transmission at symbol $i+k$) and/or an $(n+1)^{th}$ TPC command 3214, for example, after/in response to cancelling the uplink transmission at/via symbol i. $K_{PUSCH}(i+k)$ may be a quantity/number of symbols after a last symbol of a corresponding PDCCH reception (e.g., the PDCCH comprising the $(n+1)^{th}$ TPC command 3214 at/via symbol $i+k-K_{PUSCH}(i+k)$ 32) and/or before a first symbol of a PUSCH transmission at/via symbol $i+k$.

The wireless device 3204 may determine a power control adjustment state $f(i+k)$ by using the $(n+1)^{th}$ TPC command 3214 and/or the power control value $\delta_{n+1}$ associated with the $(n+1)^{th}$ TPC command 3214, and not using the $n^{th}$ TPC command 3206-$n$ (the power control value $\delta_n$ associated with the $n^{th}$ TPC command 3206-$n$). The wireless device 3204 may determine the power control adjustment state $f(i+k)$ for the PUSCH transmission at/via symbol $i+k$, for example, based on receiving the second DCI and/or based on using/applying the $(n+1)^{th}$ TPC command 3214 (e.g., the power control value $\delta_{n+1}$ associated with the $(n+1)^{th}$ TPC command 3214). The wireless device 3204 may determine a power control adjustment state $f(i+k)$ for the PUSCH transmission at/via symbol $i+k$, for example, based on receiving the second DCI and/or based on discarding/not using the $n^{th}$ TPC command 3206-$n$ (e.g., the power control value $\delta_n$ associated with the $n^{th}$ TPC command 3206-$n$). The wireless device 3204 may determine $f(i+k)$ as being equal to or substantially equal to $f(i-i_0)+\Sigma(\delta_2, \delta_3, \ldots \delta_{n-1})+\delta_{n+1}$. The wireless device 3204 may send (e.g., transmit), via the second uplink grant, an uplink TB 3216 with a transmission power based on the power control adjustment state $f(i+k)$. The uplink TB 3216 may comprise at least a portion of the cancelled uplink transmission 3212 and/or may comprise a different transmission. The uplink TB 3216 may comprise a TB associated with the cancelled uplink transmission 3212 and/or may comprise a different TB.

A wireless device may ignore a power control command (e.g., a TPC command), for example, that is received before receiving the uplink pre-emption indication. Ignoring the power control command may enable a more accurate control of transmission power and/or may reduce a possibility of using excessive transmission power. This may provide advantages such as reduced power consumption of a wireless device, reduced interference to communications at other wireless devices, improved uplink spectrum efficiency, and/or improved data throughput in a communication network.

A wireless device may use one or more power control operations/examples (e.g., such as described with reference to FIGS. 30-32) to determine a transmission power. The wireless device may select a power control mechanism, for example, based on an indication from the base station and/or features/properties associated with transmitted data (e.g., a TB).

Figure 33:
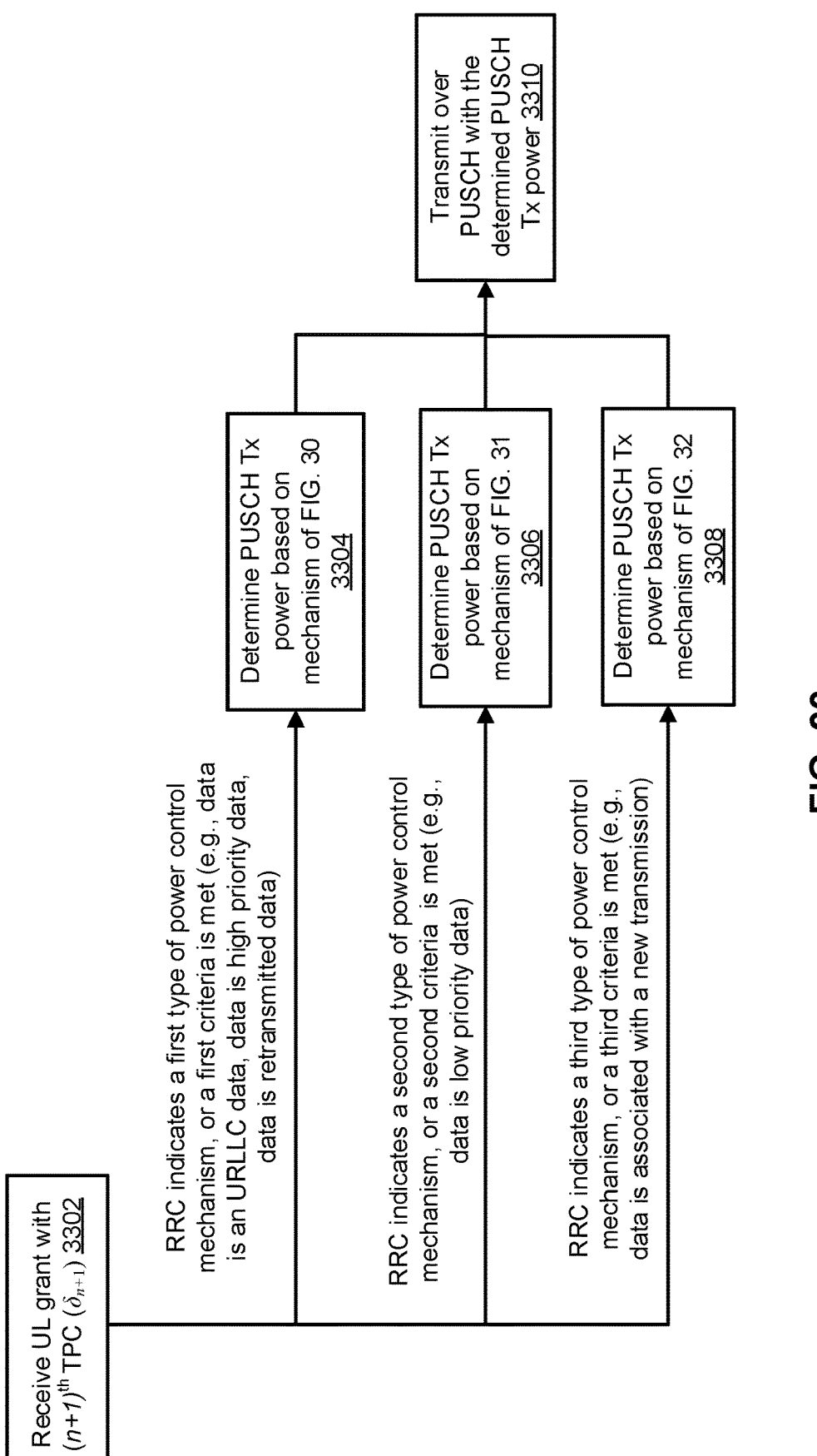
FIG. 33 shows an example procedure for determination of a transmission power.

FIG. 33 shows an example procedure for determination of a transmission power. The determination of a transmission power may be performed by a wireless device. At step 3302, a wireless device may receive an uplink grant. The uplink grant may comprise a power control command (e.g., an $(n+1)^{th}$ TPC command such as described above with reference to FIGS. 30-32). The wireless device may send/transmit data based on (e.g., in response to) the uplink grant. The wireless device may send/transmit a TB, for example, using a transmission power that may be determined based on a power control operation/example described herein. The wireless device may select a power control operation, for example, based on receiving a control message (e.g., an RRC message) from the base station and/or based on one or more other criteria.

At step 3304, the wireless device may use a first power control operation to determine a PUSCH transmission power (e.g., such as described above with reference to FIG. 30). The wireless device may use a first power control operation to determine the PUSCH transmission power, for example, if the RRC message indicates a first type of power control mechanism, if the data is retransmitted data, and/or if the data is high priority data (e.g., URLLC data). At step 3306, the wireless device may use a second power control operation to determine the PUSCH transmission power (e.g., such as described above with reference to FIG. 31). The wireless device may use the second power control operation to determine the PUSCH transmission power, for example, if the RRC message indicates a second type of power control mechanism and/or if the data is a low priority data (e.g., URLLC data). At step 3308, the wireless device may use a third power control operation to determine the PUSCH transmission power (e.g., such as described above with reference to FIG. 32). The wireless device may use the third power control operation to determine the PUSCH transmission power, for example, if the RRC message indicates a third type of power control operation and/or if the data is associated with a new transmission (e.g., the data is not retransmitted data). At step 3310, the wireless device may send/transmit data via a PUSCH based on (e.g., using) the determined PUSCH transmission power.

Examples described with reference to FIGS. 30-33, may be applied/used for PUCCH transmissions, SRS transmissions, and/or other transmissions. Such examples may be applied/used, for example, if an uplink pre-emption indication is received by a wireless device. A wireless device may cancel an upcoming (e.g., scheduled) and/or an ongoing PUCCH transmission and/or SRS transmission, for example, based on (e.g., in response to) receiving an uplink pre-emption indication.

The wireless device may assume/determine that the cancelled PUCCH transmission and/or SRS transmission has been performed, for example, to determine a transmission power of a next PUCCH transmission, a next SRS transmission, and/or a next other type of transmission. The wireless device may determine a transmission power for the next PUCCH transmission, the next SRS transmission, and/or the next other type of transmission, for example, based on a previous power control adjustment state and/or a power control command received after receiving the uplink pre-emption indication (e.g., such as described above with reference to FIG. 30). The wireless device may not use one or more power control commands to determine a transmission power for the next PUCCH transmission, the next SRS transmission, and/or the next other transmission. The wireless device may determine a transmission power for the next PUCCH transmission, the next SRS transmission, and/or the next other transmission, for example, based on a previous power control adjustment state and not based on a power control command received after receiving the uplink pre-emption indication (e.g., such as described above with reference to FIG. 31). The wireless device may determine a transmission power for the next PUCCH transmission, the next SRS transmission, and/or the next other transmission, for example, based on a previous power control adjustment state and not based on a power control command received before the uplink pre-emption indication (e.g., such as described above with reference to FIG. 32).

A wireless device may perform a contention-based or contention-free RA procedure. The wireless device may send (e.g., transmit) one or more preambles to a base station (e.g., as shown in FIG. 12), for example, as part of a contention-based or contention-free RA procedure. The wireless device may receive an uplink pre-emption indication, for example, if sending (e.g., during transmission of) one or more preambles to the base station. The wireless device may stop and/or cancel a preamble transmission, for example, based on receiving an uplink pre-emption indication. The wireless device may assume/determine that the cancelled preamble transmission has been performed. The wireless device may increment a preamble transmission counter (e.g., PREAMBLE_TRANSMISSION_ COUNTER) and/or increment a preamble power ramping counter (e.g., PREAMBLE_POWER_RAMPING_COUNTER), for example, based on determining/assuming that the cancelled preamble transmission has been performed. The wireless device may determine whether to repeat a preamble transmission, for example, based on the incremented preamble transmission counter and/or based on a configured preamble transmission quantity/number (e.g., preambleTransMax), such as described above. The wireless device may determine a preamble transmission power for a next preamble transmission based on the incremented preamble power ramping counter (e.g., such as described above with reference to FIGS. 30-32). This may simplify power control of a wireless device for the RA procedure.

A wireless device may receive an uplink pre-emption indication. The wireless device may receive the uplink pre-emption indication, for example, if the wireless device sends (e.g., during transmission of) one or more preambles to the base station. The wireless device may stop and/or cancel a preamble transmission, for example, based on receiving an uplink pre-emption indication. The wireless device may determine (e.g., assume) that the cancelled preamble transmission has been performed. The wireless device may skip monitoring a PDCCH for a response to the preamble transmission, and/or the wireless device may start a retransmission of the preamble at a next RACH resource, for example, based on (e.g., in response to) stopping the preamble transmission.

A wireless device may perform a contention-based or contention-free RA procedure. The wireless device may send/transmit preambles to a base station (e.g., as shown in FIG. 12), for example, as part of a contention-based or contention-free RA procedure. The wireless device may receive an uplink pre-emption indication, for example, if the wireless device sends (e.g., during transmission of) one or more preambles to the base station. The wireless device may stop and/or cancel a preamble transmission, for example, based on receiving the uplink pre-emption indication. The wireless device may not update/increment a preamble transmission counter (e.g., PREAMBLE_TRANSMISSION_ COUNTER) and/or a preamble power ramping counter (e.g., PREAMBLE_POWER_RAMPING_COUNTER), for example, based on receiving the uplink pre-emption indication and/or stopping/cancelling the preamble transmission. The wireless device may determine whether to repeat a preamble transmission based on the unchanged preamble transmission counter and/or a configured preamble transmission quantity/number (e.g., preambleTransMax), such as described above. The wireless device may determine a preamble transmission power for a next preamble transmission based on the unchanged preamble power ramping counter (e.g., such as described above with reference to FIGS. 30-32). This may reduce power consumption of a wireless device in an RA procedure, for example, if the wireless device receives an uplink pre-emption indication.

A wireless device may perform a PUSCH transmission, for example, based on a type 1 configured grant or a type 2 configured grant. A base station may send/transmit, to a wireless device, one or more configuration parameters (e.g., configuredGrantConfig), for example, for PUSCH transmissions based on a type 1 configured grant. The one or more configuration parameters may indicate a semi-statically configured PUSCH resource allocation (e.g., for type 1 configured grant). The one or more configuration parameters may comprise, for example, at least one of: a time domain allocation parameter (e.g., timeDomainAllocation) indicating a combination of a start symbol (e.g., a starting symbol), a length and/or PUSCH mapping type; a frequency domain allocation parameter (e.g., frequencyDomainAllocation) indicating a frequency domain resource allocation; an MCS and TBS value (e.g., mcsAndTBS); a frequency hopping parameter (e.g., frequencyHoppingOffset); and/or one or more reference signal and antenna port configuration parameters (e.g., antennaPort, dmrs-SeqInitialization, precodingAndNumberOfLayers, and/or srs-ResourceIndicator). A wireless device may determine PUSCH resources based on the one or more configuration parameters and uplink grant (e.g., received on DCI), for example, for PUSCH transmissions based on a type 2 configured grant. The DCI may be addressed to CS-RNTI.

A wireless device may send a PUSCH transmission with/using a configured grant, for example, based on a transmission periodicity. A wireless device may receive an RRC message (e.g., comprising configuredGrantConfig) that may indicate, for example, transmission periodicity, a quantity/number of repetitions (K), and/or a redundancy version (RV) sequence. The wireless device may send/transmit K repetitions of a TB, for example, based on the RV sequence. The transmission periodicity, the quantity/number of repetitions, and the RV sequence may be indicated, for example, by parameters periodicity, repK, and repK-RV, respectively.

Figure 34:
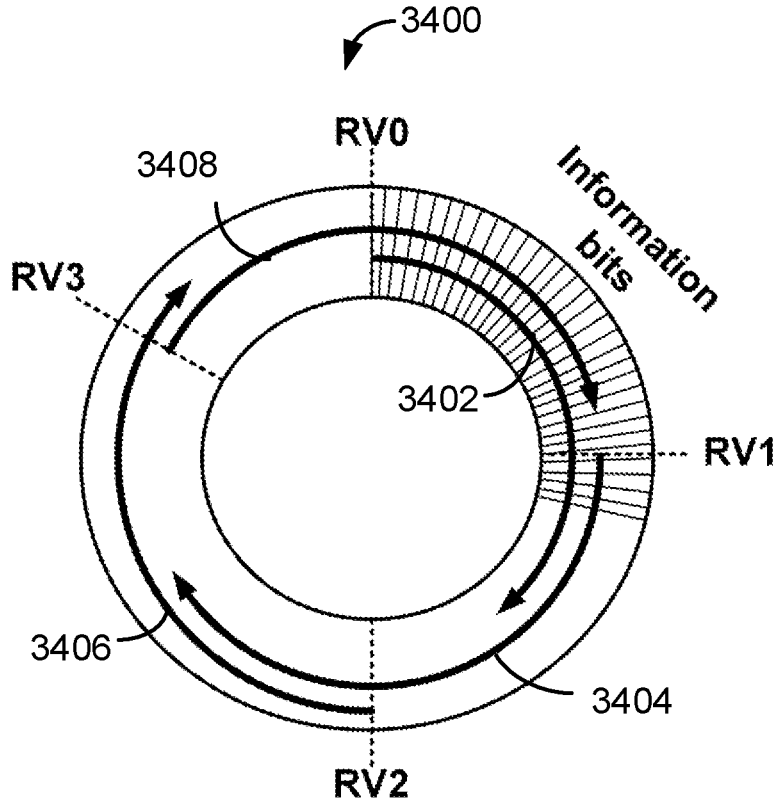
FIG. 34 shows an example of a transmission based on redundancy versions (RVs) of an encoded data unit.

FIG. 34 shows an example of a transmission based on RVs of an encoded data unit. A distribution of bits (e.g., an encoded data unit) may be used in different RVs of a TB. Each RV for a TB 3400 may comprise at least some bits of the TB 3400 and/or may be associated with a corresponding RV value (e.g., RV 0, RV 1, RV 2, RV 3). Bits 3402 may correspond to the TB 3400 with/using RV 0, bits 3404 may correspond to the TB 3400 with/using RV 1, bits 3406 may correspond to the TB with/using RV 2, bits 3408 may correspond to the TB with/using RV3. Bits 3402 may comprise at least some, all, or mostly information bits. Bits 3408 may comprise at least some, all, or mostly check bits.

A wireless device may receive an uplink grant. The wireless device may transmit multiple repetitions of a TB, for example, based on the uplink grant. Each repetition of the TB may be associated with a different RV value (e.g., RV 0, RV 1, RV 2, RV 3). An order of transmission of the repetitions may be indicated in/by an RV sequence parameter (e.g., repK-RV).

An RV value of a TB for an $n^{th}$ transmission occasion among K repetitions (e.g., where n=1, 2, . . . , K) may be a $(mod(n-1,4)+1)^{th}$ value of a configured RV sequence (e.g., indicated by repK-RV). A wireless device may send (e.g., transmit) the TB with the RV value that is the $(mod(n-1, 4)+1)^{th}$ value of the configured RV sequence, for example, at/via the $n^{th}$ transmission occasion among the K repetitions. A wireless device may send (e.g., transmit) a TB with/using RV 0 at a first transmission occasion (e.g., n=1), the TB with/using RV 2 at a second transmission occasion (e.g., n=2), the TB with/using RV 3 at a third transmission occasion (e.g., n=-3), and the TB with/using RV 1 at the fourth transmission occasion (e.g., n=4), for example, if the configured RV sequence is {0, 2, 3, 1}.

The wireless device may start an initial transmission of a TB at/via a first transmission occasion of the K repetitions, for example, if the configured RV sequence is {0, 2, 3, 1}. The wireless device my start an initial transmission of a TB at/via any of the transmission occasions of the K repetitions that are associated with RV=0, for example, if the configured RV sequence is {0,3,0,3}. The wireless device my start an initial transmission of a TB at/via any of the transmission occasions of the K repetitions, for example, if the configured RV sequence is {0,0,0,0}, except a last last transmission occasion if K=8. The repetitions may be terminated, for example, after transmitting K repetitions, or at the last transmission occasion among the K repetitions within the periodicity and at the symbol from which another PUSCH with the same HARQ process is scheduled by DCI format 0_0 or 0_1, whichever is earlier. The wireless device may or may not be configured with a time duration for the transmission of K repetitions that is larger than a time duration determined by the periodicity.

The wireless device may repeat the TB across the repK consecutive slots by using a same symbol allocation in each slot. A wireless device may not transmit on a slot associated with a multi-slot PUSCH transmission, for example, if the wireless device determines that symbols of the slot are downlink symbols.

A PUSCH aggregation factor parameter (e.g., pusch-AggregationFactor) may provide a quantity/number of transmissions of a TB within a bundle of a dynamic grant. A wireless device (e.g., a MAC entity of the wireless device) may be configured with PUSCH repetition (e.g., pusch-AggregationFactor>1). HARQ retransmissions may follow within a bundle, for example, based on/after an initial transmission (e.g., pusch-AggregationFactor−1). A parameter (e.g., repK) may provide a quantity/number of transmissions of a TB within a bundle of a configured uplink grant. A wireless device (e.g., a MAC entity of the wireless device) may be configured with a value of repK that is greater than 1. HARQ retransmissions may follow within a bundle, for example, based on/after the initial transmission. Bundling operation may rely on the HARQ entity for both dynamic grant and configured uplink grant. The bundling operation may rely on the HARQ entity for invoking the same HARQ process for each transmission that is part of the same bundle. HARQ retransmissions may be triggered within a bundle, for example, with or without waiting for feedback from previous transmission according to the PUSCH aggregation factor (e.g., for the dynamic grant) and/or the repK parameter (e.g., for the configured uplink grant). Each transmission within a bundle may be a separate uplink grant, for example, after the initial uplink grant within a bundle is delivered to the HARQ entity.

A sequence of redundancy versions, for each transmission within a bundle of a dynamic grant, may be determined based on an indicator in a DCI. A sequence of redundancy versions, for each transmission within a bundle of a dynamic grant, may be determined based on a configuration parameter (e.g., repK-RV) in an RRC message.

Figure 35:
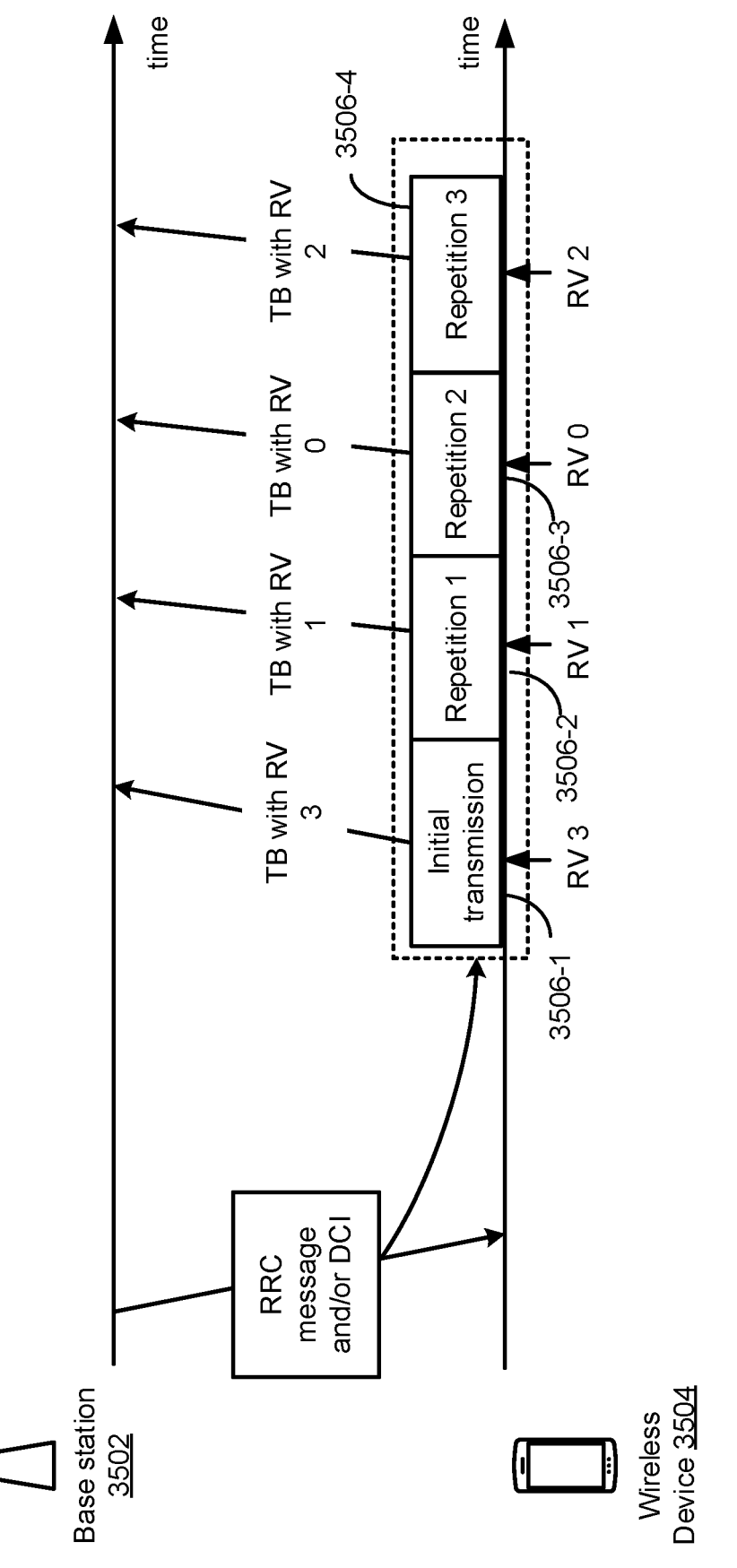
FIG. 35 shows an example uplink transmission corresponding to a configured grant.

FIG. 35 shows an example uplink transmission corresponding to a configured grant. The configured grant may be a type 1 configured grant (e.g., based on RRC) or a type 2 configured grant (e.g., based on RRC and DCI). A base station 3502 may transmit, to a wireless device 3504, an RRC message and/or DCI indicating configuration parameters of the configured grant. The configuration parameters may indicate a repetition quantity/number K (e.g., repK) and/or an RV sequence (e.g., repK-RV). K may be 4 and/or the configured RV sequence may be {3, 1, 0, 2} (e.g., as shown in FIG. 35). The RV sequence may be {0, 3, 0, 3}, or {0, 3, 1, 2}, or any sequence as configured by the RRC message. The wireless device 3504 may perform an initial transmission of a TB with/using RV 3 on a first PUSCH transmission occasion 3506-1, a first repetition transmission of the TB with/using RV 1 on a second PUSCH transmission occasion 3506-2, a second repetition transmission of the TB with/using RV 0 on a third PUSCH transmission occasion 3506-3, and a third repetition transmission of the TB with/using RV 2 on a fourth PUSCH transmission occasion 3506-4.

A wireless device may perform uplink transmissions in a first transmission occasion (e.g., a first PUSCH transmission occasion), for example, based on an uplink grant (e.g., a configured grant). The wireless device may receive a cancellation indication/uplink pre-emption indication, for example, during/before the uplink transmissions in the first transmission occasion. The wireless device may stop and/or cancel the uplink transmissions, for example, based on receiving the uplink pre-emption indication. The wireless device may be unable to determine contents of uplink transmissions in a next transmission occasion (e.g., a next PUSCH transmission occasion) following/after the first transmission occasion. The wireless device may have difficulty in determining whether the wireless device should treat the cancelled PUSCH transmission as having been performed, having not been performed, or having been performed/not performed based on one or more criteria. In at least some systems, a base station and a wireless device may not be aligned with respect to contents of the uplink transmissions in the next transmission occasion. This may result in reduced uplink spectrum efficiency, increased data transmission delay, and/or increased power consumption of a wireless device.

As described in examples herein, contents of uplink transmissions in a next transmission occasion following a first transmission occasion may be specified. A wireless device may send (e.g., transmit), in a next transmission occasion, data (e.g., a TB) corresponding to a cancelled uplink transmissions in a first transmission occasion. The wireless device may send, in the next transmission occasion, the cancelled uplink transmissions. The wireless device may cancel transmission of first data (e.g., a TB with a first RV value) in the first transmission occasion. The wireless device may send different data (e.g., the TB with another RV value) in the next transmission occasion. The base station may be aware of transmissions, by the wireless device, in the next transmission occasion and accordingly process the data received in the next transmission occasion. The base station may be aware of an RV value of a TB to be sent by the wireless device, for example, in the next transmission occasion. This may align a base station and a wireless device with respect to contents of uplink transmissions that follow uplink pre-emption which may provide advantages such as improved uplink spectrum efficiency, reduced data transmission delay, and/or reduced power consumption of a wireless device.

FIG. 36 shows an example of uplink transmission that comprises uplink pre-emption. A base station 3602 may send (e.g., transmit), to a wireless device 3604, an RRC message and/or DCI corresponding to a configured grant. The RRC message may comprise one or more configuration parameters (e.g., configuredGrantConfig) indicating a semi-statically configured PUSCH resource allocation. The one or more configuration parameters may comprise at least: a time domain allocation parameter (e.g., timeDomainAllocation) indicating a combination of a start symbol (e.g., a starting symbol), a length, and/or PUSCH mapping type; a frequency domain allocation parameter (e.g., frequencyDomainAllocation) indicating a frequency domain resource allocation; an MCS and TBS value (e.g., mcsAndTBS); a frequency hopping parameter (e.g., frequencyHoppingOffset); and/or one or more reference signal and antenna port configuration parameters (e.g., antennaPort, dmrs-SeqInitialization, precodingAndNumberOfLayers, and/or srs-ResourceIndicator). The wireless device 3604 may send (e.g., transmit) one or more TBs based on the one or more configuration parameters. The wireless device 3604 may transmit the one or more TBs, with or without waiting for a subsequent message from the base station 3602. The wireless device 3604 may transmit the one or more TBs without waiting for a subsequent message, for example, for a type 1 configured grant. The wireless device 3604 may determine PUSCH resources based on the one or more configuration parameters and an uplink grant received in DCI, for example, for a type 2 configured grant.

The wireless device 3604 may perform PUSCH transmission, with a transmission periodicity, via a type 1 UL grant and/or a type 2 configured grant. The transmission periodicity (e.g., periodicity) may be indicated in an RRC message (e.g., configuredGrantConfig). The wireless device 3604 may send (e.g., transmit) a TB, for example, based on a quantity/number of repetitions (e.g., K) and a redundancy version sequence. The quantity/number of repetitions K and the redundancy version sequence may be indicated in the RRC message, for example, by parameters such as repK and repK-RV. An RV value of a TB for an $n^{th}$ transmission occasion among K repetitions (e.g., where n=1, 2, . . . , K) may be a $(mod(n-1,4)+1)^{th}$ value of a configured RV sequence (e.g., indicated by repK-RV). The wireless device 3604 may transmit the TB with/using an RV value that is $(mod(n-1,4)+1)^{th}$ value of the configured RV sequence, for example, for the $n^{th}$ transmission occasion among the K repetitions.

The base station 3602 may configure (e.g., using an RRC message) an RV sequence (e.g., RV sequence {3, 1, 0, 2}). Time slots 3608 may correspond to different transmission occasions. The wireless device 3604 may determine that an initial transmission at the first transmission occasion/first slot 3608-1 (e.g., n=1) may be a TB with RV 3. The wireless device 3604 may receive an uplink pre-emption indication 3606, for example, before starting/during an initial transmission of the TB with RV 3 at the first transmission occasion/the slot 3608-1 among K repetition. The wireless device 3604 may cancel the initial transmission of the TB with/using RV 3 in the slot 3608-1. The wireless device 3604 may assume/consider that the canceled initial transmission of the TB with RV3 has been performed. The wireless device 3604 may maintain the RV sequence for the other slots 3608-2, 3608-3, and 3608-4, for example, based on assuming/considering that the canceled initial transmission of the TB with/using RV 3 has been performed. The wireless device 3604 may send (e.g., transmit) a first repetition of the TB with/using RV 1 in a second slot (e.g., slot 3608-2), a second repetition of the TB with/using RV 0 in a third slot (e.g., slot 3608-3), and a third repetition of the TB with/using RV 2 in a fourth slot (e.g., slot 3608-4).

The wireless device 3604 may perform a similar procedure, for example, if the wireless device 3604 receives the pre-emption indication 3606 in any other slot 3608. The wireless device 3604 may receive the pre-emption indication 3606, for example, after the wireless device finishes the initial transmission of the TB with/using RV 3 in slot 3608-1 and/or before the wireless device starts the first repetition of the TB with/using RV 1 in slot 3608-2. The wireless device 3604 may cancel the first repetition of the TB with/using RV 1 in slot 3608-2, for example, based on/in response to the pre-emption indication 3606. The wireless device 3604 may assume/consider that the first repetition of the TB with/using RV 1 has been performed. The wireless device may maintain the RV sequence for the other slots 3608-3 and 3608-4, for example, based on assuming/considering that the canceled first transmission of the TB with/using RV 1 has been performed.

A wireless device may maintain an original RV sequence (e.g., as specified by an RRC message) by assuming/considering that a cancelled transmission of a TB with a RV has been performed. The wireless device may consider the cancelled transmission of the TB with the RV has no impact on other repetitions of the TB. The wireless device may use other slots to send the TB with other RV values which may improve resource utilization. Maintaining the original RV sequence, regardless of whether or not the wireless device cancels an uplink transmission of a RV, may align the base station with the wireless device regarding which RV will be transmitted in a transmission occasion, for example, if the wireless device mis-detects a cancellation indication. Maintaining the original RV sequence, regardless of whether or not the wireless device cancels an uplink transmission of a RV, may provide advantages such as simplifying system design of the wireless device, improving uplink spectrum efficiency, reducing transmission latency, and/or reducing cost of the wireless device.

FIG. 37 shows an example of uplink transmission using an uplink pre-emption indication. A base station 3702 may send (e.g., transmit), to a wireless device 3704, an RRC message and/or DCI corresponding to a configured grant. The RRC message may comprise one or more configuration parameters (e.g., configuredGrantConfig) indicating a semi-statically configured PUSCH resource allocation, (e.g., as described with reference to FIG. 36).

The base station 3702 may configure (e.g., using an RRC message) an RV sequence (e.g., RV sequence {0, 3, 1, 2}). Time slots 3708 may correspond to different transmission occasions. The wireless device 3704 may determine that an initial transmission at/via the first transmission occasion/first slot 3708-1 (e.g., n=1) may be a TB with RV 0. The wireless device 3704 may receive an uplink pre-emption indication 3706, for example, before starting/during an initial transmission of the TB with/using RV 0 at the first transmission occasion/the slot 3708-1 among K repetitions. The wireless device 3704 may cancel the initial transmission of the TB with RV 0 in the slot 3708-1, for example, based on receiving the uplink pre-emption indication 3706. The wireless device 3704 may shift the RV sequence, based on receiving the uplink pre-emption indication 3706. The wireless device 3704 may shift the transmissions to future slots based on shifting the RV sequence.

The wireless device may start the initial transmission of the TB with RV 0 in a next/future slot (e.g., slot 3708-2), for example, based on receiving the pre-emption indication 3706 and cancelling the initial transmission of the TB with RV 0 in the slot 3708-1. The wireless device 3704 may send (e.g., transmit) the initial transmission of the TB with/using RV 0 in a second slot (e.g., slot 3708-2), a first repetition of the TB with/using RV 3 in a third slot (e.g., slot 3708-3), and a second repetition of the TB with/using RV 1 in a fourth slot (e.g., slot 3708-4), for example, based on shifting the RV sequence.

The wireless device 3704 may perform a similar procedure, for example, if the wireless device 3704 receives the pre-emption indication 3706 in any other slot 3708. The wireless device 3704 may receive the pre-emption indication 3706, for example, after the wireless device 3704 finishes the initial transmission of the TB with/using RV 0 in slot 3708-1, and/or before the wireless device starts the first repetition of the TB with/using RV 3 in slot 3708-2. The wireless device 3704 may cancel the first repetition of the TB with/using RV 3, for example, based on/in response to the pre-emption indication 3706. The wireless device may send (e.g., transmit) first repetition of the TB with/using RV 3 at a next transmission occasion (e.g., at the slot 3708-3).

A wireless device may shift an original RV sequence (e.g., as specified by an RRC message). The wireless device may shift the original RV pattern, for example, based on cancelling an uplink transmission of a TB. Shifting the RV sequence (e.g., based on the cancellation) may enable the wireless device to send the TB (e.g., in a next slot) even if the pre-emption indication 3706 cancels that the transmission of the TB in a current slot. Shifting the RV sequence (e.g., based on the cancellation) may enable the wireless device to send the TB (e.g., in a next slot) with RV 0 (e.g., comprising system bits) if the pre-emption indication 3706 cancels that the transmission of the TB of RV 0 in a current slot. This may provide advantages such as improved reception probability of a TB at a base station, reduced transmission latency, and/or improved resource utilization.

A wireless device may determine whether to maintain the RV sequence (e.g., as described with reference to FIG. 36) or shift the RV sequence (e.g., as described with reference to FIG. 37). The wireless device may determine whether to maintain the RV sequence or shift the RV sequence, for example, based on a cancelled RV value and/or a next RV value. The wireless device may assume/determine that a cancelled transmission of a TB with/using an RV value has been performed, for example, if the RV value (e.g., 3) is greater than a next RV value (e.g., 0, 1, or 2) in a configured RV sequence. The wireless device may maintain the RV sequence and send (e.g., transmit) the TB with/using a next RV value (e.g., 0, 1, or 2) at a next PUSCH transmission occasion, for example, based on assuming/determining that a cancelled transmission of a TB with/using the RV value has been performed.

An RV value corresponding a cancelled TB (e.g., 0) may be smaller than a next RV value (e.g., 1, 2, or 3) in the configured RV sequence. The wireless device may shift the RV sequence and/or send (e.g., transmit) the cancelled TB with/using the RV value (e.g., 0) at a next PUSCH transmission occasion, for example, if the RV value of the cancelled TB is smaller than the next RV value (e.g., 1, 2, or 3) in the configured RV sequence.

FIG. 38 shows an example uplink transmission using uplink pre-emption. A base station 3802 may send (e.g., transmit), to a wireless device 3804, an RRC message and/or DCI corresponding to a configured grant. The RRC message may comprise one or more configuration parameters (e.g., configuredGrantConfig) indicating a semi-statically configured PUSCH resource allocation (e.g., as described above with reference to FIG. 36).

The base station 3802 may configure (e.g., using an RRC message) an RV sequence (e.g., RV sequence {0, 3, 1, 2}). Time slots 3808 may correspond to different transmission occasions. The wireless device 3804 may determine that an initial transmission at the first transmission occasion/first slot 3808-1 (e.g., n=1) may be a TB with/using RV 0. The wireless device 3804 may receive an uplink pre-emption indication 3806, for example, before starting/during an initial transmission of the TB with RV 0 at the first transmission occasion/the slot 3808-1 among K repetitions. The wireless device 3804 may cancel the initial transmission of the TB with/using RV 0 in the slot 3808-1, for example, based on receiving the uplink pre-emption indication 3806. The wireless device 3804 may cancel a first repetition of the TB with/using RV 3 in a second slot (e.g., slot 3808-2), a second repetition of the TB with/using RV 1 in a third slot (e.g., slot 3808-3), and a third repetition of the TB with/using RV 2 in a fourth slot (e.g., slot 3808-4), for example, based on receiving the uplink pre-emption indication 3806.

The wireless device 3804 may perform a similar procedure as described above, for example, if the wireless device 3804 receives the pre-emption indication 3806 in any other slot 3808. The wireless device 3804 may receive the pre-emption indication 3806, for example, after the wireless device 3804 finishes the initial transmission of the TB with/using RV 0, and/or before the wireless device 3804 starts the first repetition of the TB with/using RV 3. The wireless device 3804 may cancel the first repetition of the TB with/using RV3, for example, based on/in response to receiving the pre-emption indication 3806. The wireless device 3804 may cancel the remaining repetitions of the TB (e.g., the second repetition of the TB with/using RV 1 and the third repetition of the TB with/using RV 2).

A wireless device may cancel an initial transmission of a TB and/or all repetitions of a TB within a transmission periodicity, for example, based on receiving a pre-emption indication. Cancelling the initial transmission and/or all repetitions may provide advantages such as reduced uplink transmission power consumption and/or reduced interference to communications corresponding to other wireless devices.

A wireless device may receive first DCI, wherein the first DCI comprises a first uplink radio resource and/or a first TPC command. The wireless device may determine a first power of transmission of a transport block, for example, based on the first TPC command. The wireless device may receive second DCI indicating that the first uplink radio resource is pre-empted. The wireless device may drop the transmission of the transport block, for example, based on/in response to receiving the second DCI. The wireless device may receive third DCI, wherein the third DCI comprises a second uplink radio resource and/or a second TPC command. The wireless device may send the transport block via the second uplink radio resource with a transmission power that is determined based on the first power and the second TPC command.

A wireless device may receive first DCI, wherein the first DCI comprises a first uplink radio resource and a first TPC command. The wireless device may determine a first power of transmission of a transport block based on the first TPC. The wireless device may receive second DCI indicating that the first uplink radio resource is pre-empted. The wireless device may drop the transmission of the transport block, for example, based on/in response to receiving the second DCI. The wireless device may receive third DCI, wherein the third DCI comprises a second uplink radio resource and a second TPC command. The wireless device may determine a second power of retransmission of the transport block based on the first power. The second power may (or may not) be equal to the first power. The wireless device may send the transport block, on the second uplink radio resource, with a power value based on the second power.

A wireless device may receive configuration parameters corresponding to a configured grant. The configuration parameters may indicate a first uplink transmission occasion (e.g., associated with a first RV value) and a second uplink transmission occasion (e.g., associated with a second RV value). The wireless device may receive DCI comprising an uplink pre-emption indication. The uplink pre-emption may indicate that an uplink radio resource is pre-empted. The wireless device may drop a transmission of an uplink transport block with the first RV value, for example, based on/in response to receiving the DCI and/or based on the uplink radio resource overlapping the first uplink transmission occasion. The wireless device may send the uplink transport block with the second RV value, for example, based on/in response to receiving the DCI and the uplink radio resource not overlapping with the second uplink transmission occasion.

A wireless device may perform a method comprising multiple operations. The wireless device may receive configuration parameters indicating a redundancy version (RV) sequence associated with a configured grant for transmission of a transport block. The wireless device may determine, based on the RV sequence and for each transmission occasion of consecutive transmission occasions, an RV for the transport block. The wireless device may receive downlink control information indicating that an uplink radio resource is pre-empted. The wireless device may cancel, based on the uplink radio resource overlapping with a first transmission occasion of the consecutive transmission occasions, a transmission, scheduled via the first transmission occasion, of a first RV for the transport block. The wireless device may transmit, via a second transmission occasion of the consecutive transmission occasions and based on the uplink radio resource not overlapping with the second transmission occasion, a second RV for the transport block.

The wireless device may also perform one or more additional operations. The configuration parameters may indicate the first transmission occasion and the second transmission occasion. The uplink radio resource may comprise at least one of: a quantity of symbols; or a quantity of resource blocks. The first transmission occasion may be associated with: a starting symbol for transmission using the configured grant; a transmission length indicating a quantity of symbols for transmission using the configured grant; and a quantity of resource blocks for transmission using the configured grant. The downlink control information may comprise at least one of: group common downlink control information addressed to a group of wireless devices comprising the wireless device, or wireless device-specific downlink control information associated with the wireless device. The wireless device may receive downlink control information indicating an activation of the configured grant. The downlink control information indicating an activation of the configured grant may be received with cyclic redundancy check (CRC) bits that are scrambled by a radio network temporary identifier (RNTI) dedicated for the activation of the configured grant. The RNTI dedicated for the activation of the configured grant may be configured via one or more radio resource control messages. The downlink control information indicating an activation of the configured grant may be received with cyclic redundancy check (CRC) bits that are scrambled by a radio network temporary identifier (RNTI) dedicated for pre-emption indication. The RNTI dedicated for the pre-emption indication may be configured via one or more radio resource control messages. The uplink radio resource overlapping with the first transmission occasion may comprise one or more symbols of the uplink radio resource overlapping one or more symbols of the first transmission occasion. The uplink radio resource overlapping with the first transmission occasion may comprise one or more resource blocks of the uplink radio resource overlapping one or more resource blocks of the first transmission occasion. The wireless device may receive one or more radio resource control messages comprising configuration parameters indicating associations between one or more pre-emption indicators and one or more uplink radio resources, wherein the one or more uplink radio resources may comprise the uplink radio resource, and wherein based on the associations, each of the one or more pre-emption indicators, corresponding to one of the one or more uplink radio resources, indicates if the one of the one or more uplink radio resources is pre-empted. The downlink control information indicating that an uplink radio resource is pre-empted may comprise the one or more pre-emption indicators, wherein a pre-emption indicator of the one or more pre-emption indicators, corresponding to the uplink radio resource, indicates the uplink radio resource is pre-empted if the pre-emption indicator is set to a first value. The downlink control information indicating that an uplink radio resource is pre-empted may comprise the one or more pre-emption indicators, wherein a pre-emption indicator of the one or more pre-emption indicators, corresponding to the uplink radio resource, indicates the uplink radio resource is not pre-empted if the pre-emption indicator is set to a second value. The uplink radio resource being pre-empted may indicate that the wireless device is not allowed to transmit on the uplink radio resource. The first RV for the transport block may be associated with a first RV value of the RV sequence and the second RV for the transport block may be associated with a second RV value of the RV sequence. The wireless device may transmit, via the third transmission occasion and based on the uplink radio resource not overlapping with a third transmission occasion of the consecutive transmission occasions, the first RV for the transport block.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the downlink control information. A computer-readable medium may store instructions that, when executed, cause performance of the described method, additional operations and/or include the additional elements.

A wireless device may perform a method comprising multiple operations. The wireless device may receive configuration parameters indicating: a first transmission occasion associated with a first redundancy version (RV) for a transport block, and a second transmission occasion associated with a second RV for the transport block. The wireless device may receive downlink control information indicating that an uplink radio resource is pre-empted. The wireless device may cancel, based on the radio resource overlapping with the first transmission occasion, a transmission of the first RV for the transport block scheduled for transmission via the first transmission occasion. The wireless device may transmit, via the second transmission occasion and based on the radio resource not overlapping with the second transmission occasion, the first RV for the transport block.

The wireless device may also perform one or more additional operations. The wireless device may transmit using a configured grant. The configuration parameters may indicate a third transmission occasion associated with a third RV for the transport block. The wireless device may transmit, via the third transmission occasion and based on the uplink radio resource not overlapping with the third transmission occasion, the second RV for the transport block. The wireless device may cancel, based on the uplink radio resource not overlapping with the third transmission occasion, a transmission of the third RV for the transport block scheduled for transmission in the third transmission occasion. The uplink radio resource may comprise at least one of: a quantity of symbols; or a quantity of resource blocks. The first transmission occasion may be associated with: a starting symbol for transmission using a configured grant; a transmission length indicating a quantity of symbols for transmission using a configured grant; and a quantity of resource blocks for transmission using a configured grant. The uplink radio resource overlapping with the first transmission occasion may comprise one or more symbols of the uplink radio resource overlapping one or more symbols of the first transmission occasion. The uplink radio resource overlapping with the first transmission occasion may comprise one or more resource blocks of the uplink radio resource overlapping one or more resource blocks of the first transmission occasion.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the downlink control information. A computer-readable medium may store instructions that, when executed, cause performance of the described method, additional operations and/or include the additional elements.

A wireless device may perform a method comprising multiple operations. The wireless device may receive configuration parameters of a configured grant, wherein the configuration parameters indicate: a first transmission occasion associated with a first RV for a transport block, and a second transmission occasion associated with a second RV for the transport block. The wireless device may receive downlink control information indicating that an uplink radio resource is pre-empted. The wireless device may, based on the uplink radio resource overlapping with the first transmission occasion, cancel: a first transmission of the first RV for the transport block via the first transmission occasion, and a second transmission of the second RV for the transport block via the second transmission occasion.

The wireless device may also perform one or more additional operations. The wireless device may transmit using a configured grant. The uplink radio resource may or may not overlap with the second transmission occasion. The uplink radio resource may comprise at least one of: a quantity of symbols; or a quantity of resource blocks. The first transmission occasion may be associated with: a starting symbol for transmission using a configured grant; a transmission length indicating a quantity of symbols for transmission using a configured grant; and a quantity of resource blocks for transmission using a configured grant. The uplink radio resource overlapping with the first transmission occasion may comprise one or more symbols of the uplink radio resource overlapping one or more symbols of the quantity of symbols of the first transmission occasion. The uplink radio resource overlapping with the first transmission occasion may comprise one or more resource blocks of the uplink radio resource overlapping one or more resource blocks of the quantity of resource blocks of the first transmission occasion.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the downlink control information. A computer-readable medium may store instructions that, when executed, cause performance of the described method, additional operations and/or include the additional elements.

A wireless device may perform a method comprising multiple operations. The wireless device may receive first downlink control information (DCI) comprising: a first uplink radio resource, and a first transmission power control (TPC) command. The wireless device may receive second DCI indicating that the first uplink radio resource is pre-empted. The wireless device may cancel, based on receiving the second DCI, a transmission of a transport block. The wireless device may receive third DCI, wherein the third DCI comprises a second uplink radio resource and a second TPC command. The wireless device may determine, based on the second TPC command and one or more power control configuration parameters, a power of transmission of a transport block. The wireless device may transmit, via the second uplink radio resource and using the determined power of transmission, the transport block.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first DCI. A computer-readable medium may store instructions that, when executed, cause performance of the described method, additional operations and/or include the additional elements.

A wireless device may perform a method comprising multiple operations. The wireless device may receive first downlink control information (DCI) comprising: a first uplink radio resource, and a first transmission power control (TPC) command. The wireless device may receive second DCI indicating that the first uplink radio resource is pre-empted. The wireless device may cancel, based on receiving the second DCI, a transmission of a transport block. The wireless device may receive third DCI, wherein the third DCI comprises a second uplink radio resource and a second TPC command. The wireless device may determine, based on the first TPC command and one or more power control configuration parameters, a power of transmission of a transport block. The wireless device may transmit, via the second uplink radio resource and using the determined power of transmission, the transport block.

Systems, devices and media may be configured with the method. A wireless device may comprise one or more processors; and memory storing instructions that, when executed, cause the wireless device to perform the described method, additional operations and/or include the additional elements. A system may comprise a wireless device config-ured to perform the described method, additional operations and/or include the additional elements; and a base station configured to send the first DCI. A computer-readable medium may store instructions that, when executed, cause performance of the described method, additional operations and/or include the additional elements.

FIG. 39 shows example elements of a computing device that may be used to implement any of the various devices described herein, including, e.g., the base station 120A and/or 120B, the wireless device 110 (e.g., 110A and/or 110B), or any other base station, wireless device, or com-puting device described herein. The computing device 3900 may include one or more processors 3901, which may execute instructions stored in the random-access memory (RAM) 3903, the removable media 3904 (such as a Univer-sal Serial Bus (USB) drive, compact disk (CD) or digital versatile disk (DVD), or floppy disk drive), or any other desired storage medium. Instructions may also be stored in an attached (or internal) hard drive 3905. The computing device 3900 may also include a security processor (not shown), which may execute instructions of one or more computer programs to monitor the processes executing on the processor 3901 and any process that requests access to any hardware and/or software components of the computing device 3900 (e.g., ROM 3902, RAM 3903, the removable media 3904, the hard drive 3905, the device controller 3907, a network interface 3909, a GPS 3911, a Bluetooth interface 3912, a WiFi interface 3913, etc.). The computing device 3900 may include one or more output devices, such as the display 3906 (e.g., a screen, a display device, a monitor, a television, etc.), and may include one or more output device controllers 3907, such as a video processor. There may also be one or more user input devices 3908, such as a remote control, keyboard, mouse, touch screen, microphone, etc. The computing device 3900 may also include one or more network interfaces, such as a network interface 3909, which may be a wired interface, a wireless interface, or a combi-nation of the two. The network interface 3909 may provide an interface for the computing device 3900 to communicate with a network 3910 (e.g., a RAN, or any other network). The network interface 3909 may include a modem (e.g., a cable modem), and the external network 3910 may include communication links, an external network, an in-home net-work, a provider's wireless, coaxial, fiber, or hybrid fiber/coaxial distribution system (e.g., a DOCSIS network), or any other desired network. Additionally, the computing device 3900 may include a location-detecting device, such as a global positioning system (GPS) microprocessor 3911, which may be configured to receive and process global positioning signals and determine, with possible assistance from an external server and antenna, a geographic position of the computing device 3900.

The example in FIG. 39 may be a hardware configuration, although the components shown may be implemented as software as well. Modifications may be made to add, remove, combine, divide, etc. components of the computing device 3900 as desired. Additionally, the components may be implemented using basic computing devices and com-ponents, and the same components (e.g., processor 3901, ROM storage 3902, display 3906, etc.) may be used to implement any of the other computing devices and compo-nents described herein. For example, the various compo-nents described herein may be implemented using comput-ing devices having components such as a processor executing computer-executable instructions stored on a computer-readable medium, as shown in FIG. 39. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node con-figurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capa-bility(ies) depending on wireless device category and/or capability(ies). A base station may comprise multiple sec-tors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be imple-mented in a computer-usable data and/or computer-execut-able instructions, such as in one or more program modules, executed by one or more computers or other devices. Gen-erally, program modules include routines, programs, objects, components, data structures, etc. that perform particular tasks or implement particular abstract data types when executed by a processor in a computer or other data pro-cessing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A wireless device comprising:
one or more processors; and
memory storing instructions that, when executed by the one or more processors, cause the wireless device to:
  receive a radio resource control (RRC) message comprising configuration parameters indicating:
    a number of repetitions of a transport block (TB) associated with a configured grant for transmissions of the TB via a number of consecutive slots comprising a first slot and a second slot; and
    a redundancy version (RV) sequence for the number of repetitions of the TB;
  determine, based on the RV sequence:
    a first RV value associated with a first transmission of the TB in the first slot; and
    a second RV value associated with a second transmission of the TB in the second slot;
  receive a downlink control information (DCI) comprising a cancelation indication indicating that an uplink radio resource is pre-empted;
  in response to receiving the DCI and the uplink radio resource overlapping with the first slot, drop the first transmission of the TB with the first RV value; and
  transmit the TB with the second RV value, wherein the uplink radio resource does not overlap with the second slot.

2. The wireless device of claim 1, wherein the configuration parameters indicate, for each slot of the number of consecutive slots of the configured grant:
  a starting symbol for each transmission using the configured grant;
  a transmission length indicating a quantity of symbols for each transmission using the configured grant; and
  one or more resource blocks for each transmission using the configured grant.

3. The wireless device of claim 2, wherein the RV sequence comprises a plurality of RV values comprising the first RV value and the second RV value, wherein the first RV value is different from the second RV value.

4. The wireless device of claim 3, wherein the uplink radio resource comprises at least one or more resource blocks in the first slot, wherein the one or more resource blocks of the uplink radio resource overlap the one or more resource blocks of the configured grant in the first slot.

5. The wireless device of claim 4, wherein the uplink radio resource comprises at least one or more resource blocks in the second slot, wherein the at least one or more resource blocks do not overlap the one or more resource blocks of the configured grant in the second slot.

6. The wireless device of claim 4, wherein the DCI is a group common DCI addressed by a group radio network temporary identifier (RNTI) for the cancelation indication.

7. The wireless device of claim 6, wherein the uplink radio resource comprises at least one or more resource blocks in the first slot, wherein the one or more resource blocks of the uplink radio resource overlap the one or more resource blocks of the configured grant in the first slot.

8. The wireless device of claim 7, wherein the uplink radio resource comprises at least one or more resource blocks in the second slot, wherein the at least one or more resource blocks do not overlap the one or more resource blocks of the configured grant in the second slot.

9. The wireless device of claim 4, wherein the instructions further cause the wireless device to repeat the TB across the number of consecutive slots applying the same symbol allocation in each slot.

10. The wireless device of claim 9, wherein the instructions further cause the wireless device to omit the transmission on the slot in response to the wireless device determining symbols of a slot allocated for PUSCH as downlink symbols.

11. A wireless device comprising:
one or more processors; and
memory storing instructions that, when executed by the one or more processors, cause the wireless device to:
   receive a radio resource control (RRC) message comprising configuration parameters indicating:
      a number of repetitions of a transport block (TB) associated with a configured grant for transmissions of the TB via a number of consecutive slots comprising a first slot and a second slot; and
      a redundancy version (RV) sequence for the number of repetitions of the TB;
   determine, based on the RV sequence:
      a first RV value associated with a first transmission of the TB in the first slot; and
      a second RV value associated with a second transmission of the TB in the second slot;
   receive a downlink control information (DCI) comprising a cancelation indication;
   drop, based on the cancelation indication and in the first slot, the first transmission of the TB with the first RV value; and
   transmit, in the second slot, the TB with the second RV value.

12. The wireless device of claim 11, wherein the configuration parameters indicate, for each slot of the number of consecutive slots of the configured grant:

a starting symbol for each transmission using the configured grant;
a transmission length indicating a quantity of symbols for each transmission using the configured grant; and
one or more resource blocks for each transmission using the configured grant.

13. The wireless device of claim 12, wherein the RV sequence comprises a plurality of RV values comprising the first RV value and the second RV value, wherein the first RV value is different from the second RV value.

14. The wireless device of claim 13, wherein the cancelation indication indicates that uplink radio resource is preempted in the first slot.

15. The wireless device of claim 14, wherein the uplink radio resource comprises at least one or more resource blocks in the first slot, wherein the one or more resource blocks of the uplink radio resource overlap the one or more resource blocks of the configured grant in the first slot.

16. The wireless device of claim 15, wherein the uplink radio resource comprises at least one or more resource blocks in the second slot, wherein the at least one or more resource blocks do not overlap the one or more resource blocks of the configured grant in the second slot.

17. The wireless device of claim 15, wherein the DCI is a group common DCI addressed by a group radio network temporary identifier (RNTI) for the cancelation indication.

18. The wireless device of claim 17, wherein the configured grant, based on being a type 2 configured grant, is activated by a second DCI, wherein the second DCI is different from the DCI comprising the cancelation indication.

19. The wireless device of claim 17, wherein the uplink radio resource comprises at least one or more resource blocks in the first slot, wherein the one or more resource blocks of the uplink radio resource overlap the one or more resource blocks of the configured grant in the first slot.

20. The wireless device of claim 19, wherein the uplink radio resource comprises at least one or more resource blocks in the second slot, wherein the at least one or more resource blocks do not overlap the one or more resource blocks of the configured grant in the second slot.

* * * * *